(12) United States Patent
Migdal et al.

(10) Patent No.: US 6,205,243 B1
(45) Date of Patent: Mar. 20, 2001

(54) SYSTEM AND METHOD FOR RAPID SHAPE DIGITIZING AND ADAPTIVE MESH GENERATION

(75) Inventors: Alexander A. Migdal; Michael Petrov; Alexei Lebedev, all of Princeton, NJ (US)

(73) Assignee: Viewpoint Corp., New York, NY (US)

( * ) Notice: Subject to any disclaimer, the term of this patent is extended or adjusted under 35 U.S.C. 154(b) by 0 days.

(21) Appl. No.: 09/493,715

(22) Filed: Jan. 28, 2000

Related U.S. Application Data

(63) Continuation of application No. 08/620,689, filed on Mar. 21, 1996, now Pat. No. 6,044,170.

(51) Int. Cl.[7] .................................................... G06K 9/62
(52) U.S. Cl. ...................... 382/154; 356/376; 250/559.23
(58) Field of Search ..................................... 382/106, 154, 382/276, 285, 286; 348/42, 128; 356/376, 394; 345/425, 419; 250/559.23, 559.31

(56) References Cited

U.S. PATENT DOCUMENTS

| | | | |
|---|---|---|---|
| 4,653,104 | * 3/1987 | Tamura | 382/154 |
| 4,965,665 | * 10/1990 | Amir | 382/154 |
| 5,164,793 | * 11/1992 | Wolfersberger et al. | 356/376 |
| 6,044,170 | * 3/2000 | Midgal et al. | 382/154 |

* cited by examiner

Primary Examiner—Bhavesh Mehta
Assistant Examiner—Ishrat Sherali
(74) Attorney, Agent, or Firm—Kenyon & Kenyon

(57) ABSTRACT

System and method for rapid collection of data points and construction of a computer model based on a multi-resolution mesh to describe the surface contours and color of an object. The system collects data by projecting shapes of light against the object and collecting (from a position of triangulation relative to the light projector) images of the light as it reflects from the object. The system and method of the present invention are comprised of a multiple laser stripe generation process to project a number of light shapes against the object, the collection of one or more reflected laser stripes in a single image of an images collector to gather sufficient information to reproduce points on the surface of the object. The system compresses the data associated with collected points, which allows for accurate values for the contours of the object to subpixel accuracy. A multi-resolution analysis, which maintains more points to resolve fine details and removes points to further smooth regions of the objects, leads to significant data compression. The adaptive mesh, consisting of the connection of polygonal finite elements, is automatically generated by the system and is comprised to create multi-resolution meshes at different tolerances. The system and method of the present invention is portable, processes rapidly enough to take 3-D images of animate objects, can be implemented using commercially available equipment, and produces accurate models of objects.

53 Claims, 21 Drawing Sheets

SYSTEM AND METHOD FOR RAPID SHAPE DIGITIZING AND ADAPTIVE MESH GENERATION

This application is a continuation of prior application Ser. No. 08/620,689, filed Mar. 21, 1996, now U.S. Pat. No. 6,044,170.

FIELD OF THE INVENTION

This invention relates to computer-aided three dimensional ("3D") 3D scanning and measuring systems, in particular to a rapid system and method for measuring and reproducing objects by shape digitizing and adaptive mesh generation.

BACKGROUND OF THE INVENTION

Speed, accuracy, and portability have been recurrent and difficult to achieve goals for devices that scan, measure or otherwise collect data about 3D objects for purposes such as reproduction. With the advent of computers, such devices have useful application in many fields, such as digital imaging, computer animation, topography, reconstructive and plastic surgery, dentistry, architecture, industrial design, anthropology, biology, internal medicine, milling and object production, and other fields. These computer-aided systems obtain information about an object and then transform the shape, contour, color, and other information to a useful, digitized form.

The technology currently available for shape digitizing falls into two distinct but related groups: mechanical systems and optical systems. All systems within those two general categories struggle with the basic criteria of speed, accuracy, and portability in measuring and generating information about an object.

A mechanical system acquires data about an object through the use of a probe that has a sensitive tip. The mechanical system scans an object by manually moving its probe tip across the object's surface and taking readings. Generally, the probe connects to a mechanical arm, and the system tracks the probe's position in space using angle measuring devices as the arm moves. The system calculates the position of the probe with coordinates known from the angle measuring devices.

Although mechanical systems scan with generally high accuracy, the rate at which a mechanical system acquires data is relatively slow and can take several hours for scanning and digitizing. A typical mechanical system measures only one point at a time and can digitize only small, solid objects.

As an alternative to mechanical systems, there are several types of optical object shape digitizers which fall into two basic categories: systems based on triangulation and alternative systems. A triangulation system projects beams of light on an object and then determines three-dimensional spatial locations for points where the light reflects from the object. Ordinarily, the reflected light bounces off the object at an angle relative to the light source. The system collects the reflection information from a location relative to the light source and then determines the coordinates of the point or points of reflection by triangulation. A single dot system projects a single beam of light which, when reflected, produces a single dot of reflection. A scan line system sends a plane of light against the object which projects on the object on a line and reflects as a curvilinear-shaped set of points describing one contour line of the object. The location of each point in that curvilinear set of points can be determined by triangulation.

Some single dot optical scanning systems use a linear reflected light position detector to read information about the object. In such systems a laser projects a dot of light upon the object. The linear reflected light position detector occupies a position relative to the laser which allows the determination of a three dimensional location for the point of reflection. A single dot optical scanner with a linear reflected light position detector can digitize only a single point at a time. Thus, a single dot optical scanning system, like the mechanical system described above, is relatively slow in collecting a full set of points to describe an object. Single dot optical scanners are typically used for applications such as industrial engineering. The digitizing speed is usually slow and is limited by the mechanics of the scanning system, i.e., the moving and positioning of the light beam. However, accuracy of these systems can be high. A scanning head can be mounted on a high-precision, but costly, positioning system to take a digitized image of the object's shape with generally good accuracy. However, because of the high cost, slow speed, and lack of flexibility, single dot optical scanners find generally only limited application.

Scan line systems offer one solution to the speed time bottleneck of single point triangulation system. Those systems typically employ a 2D imager, such as a charged coupled device (CCD) camera, for signal detection. The systems project a light plane (i.e., a laser stripe) instead of just one dot and then read the reflection of multiple points depicting the contour of an object at a location that is a distance from the CCD camera and from which the position can be triangulated. Some embodiments of the scan line-type system attach the CCD camera to a rotating arm or a moving platform. During scanning, either the object moves on a known path relative to the camera and laser, or the camera and laser, together, move around the object. In any case, such systems usually depend on this type of fixed rotational movement and typically use a bulky, high-precision mechanical system for positioning. Because of the use of mechanical positioning devices, resealing flexibility can be very limited, e.g., a scanner designed for objects the size of a basketball may not be useful for scanning apple-sized objects.

Some laser stripe triangulation systems currently available are further limited because the laser stripe stays at a fixed angle relative to the camera and the system makes its calculations based on the cylindrical coordinates of its rotating platform. The mathematical simplicity in such a projection system complicates the hardware portion of these devices as they typically depend on the rotational platform mentioned. Also, the simplified geometry does not generally allow for extremely refined reproduction of topologically nontrivial objects, such as objects with holes in them (e.g., a tea pot with a handle). Full realization of triangulation scanning with a non-restrictive geometry has not been achieved in the available devices.

The laser stripe triangulation systems currently available are also burdened by factors that place upper limits on scanning speed. The laser stripe triangulation systems which use a rotational platform are constrained by the speed at which the platform or arm can rotate the object without moving or shaking it. Some systems take 15 or so seconds to complete a 360° scan. A target object, such as a person or an animal, may have difficulty staying still for such a scan time. Another speed limitation is that the laser stripe triangulation systems typically can only generate one light stripe per camera image. As laser stripe triangulation systems generate a single laser stripe and project that stripe upon the object, the CCD camera captures an image of the stripe in a frame image—one laser stripe per CCD camera frame. Thus, the collection of laser information in some systems is subject to the speed limitations of the camera.

Additionally, for those optical triangulation systems employing a computer, there is the further problem of processing the incoming data. The CCD camera typically outputs frames of picture information at a rate of 30 or more frames per second. Each frame is composed of a two dimensional frame matrix of pixels and contains, for example, 640×480 pixel values of light intensity information. Thus, laser stripe triangulation systems must sort through many megabytes of information. These systems typically require very powerful computers and have sizeable memory requirements. In addition, they take a relatively long time to process the incoming CCD information into a viable set of points concerning the object. The points created can depict the object, but the system that create them are also limited in that they typically do not achieve a sophisticated model of the object.

Apart from optical triangulation systems (single dot or scan line systems), there are alternative optical scanning systems which present a scanning solution different from those employing triangulation techniques. Range meters and multi-camera systems are among those categorized as "alternative" systems. Range meter systems typically use an infrared pulsed laser and mechanical scanning techniques to project a dot laser across an object and then measure the phase delay of the reflected signal. As range meter systems typically incorporate a single dot method of data collection, they generally have the speed limitations that are intrinsic to single-point scanners. Additional accuracy problems occur because depth coordinates are not sufficiently accurate, such that in some systems, when an object is large, ghosts can appear on the scan.

Another type of alternative scanning system is a stereoscopic system which uses several CCD cameras located at known distances from each other. The captured images are processed with a pattern recognition system which maps the various points of an object captured by the cameras, thereby obtaining the shape/contour information. One advanced stereoscopic system uses 16 CCD cameras. Although each camera in such a system has a small exposure time, it takes several minutes to analyze the data for each scan. This can cause the system to delay, sometimes up to six minutes per scan. In this type of system, the device must also project a special grid on an object to obtain reference points for gluing a complete 3D picture. In addition, accuracy is sometimes a problem because stereoscopic scanning relies on light reflecting properties. The systems make assumptions based on Lambertian reflecting properties to determine resolution surface features of the scanned objects. Different surfaces can dictate different results for the same object.

Thus, for devices that scan, measure or otherwise collect data about an object, it would be a substantial advance if a scanner could be created that could rapidly gather highly accurate data concerning a 3D object. It would also be an advance if the device could rapidly process the data in a fashion that did not require a large computing system (and allow for portable embodiments), and after computing, create a descriptive model from the data points collected about the object.

SUMMARY OF THE INVENTION

The present invention comprises a high speed, accurate and portable system and method for rapidly measuring objects and processing the shape, contour, color and other data it collects for display, graphic manipulation, model building—such as through adaptive mesh generation—and other uses. Because the basic information about the object is obtained and processed in rapid fashion, the invention is particularly suited to scan and measure objects which cannot easily stay motionless, such as people or animals. The mechanical and data processing features of the present invention permit the collected data to be processed with high accuracy. Those features also allow for embodiments that are portable and less costly than prior systems.

The invention provides a system for rapidly scanning an object with a geometric light shape (such as a laser stripe), recording the shape of the reflected points of light by means of an image collector (such as a camera), and, by a triangulation technique that does not depend on the fixed direction of the light source relative to the camera, reconstructing the 3D shape of the object through a computer using the data points collected from the reflection of the laser stripes. With the collected data points, a user can, inter alia, create, display and manipulate an image of the 3D object on a computer, physically reproduce the object (through computer controlled milling machines and stereolithography), compress the data for easy transmission (such as over the Internet), or use the data in graphic manipulation systems (such as in 3D video animators). The invention includes a model building algorithm which provides multi-resolution analysis and adaptive mesh generation, leading to significant compression of the digital shape information, which for most objects will be order of magnitude compression.

Another aspect of the present invention is its ability to generate multiple geometric shapes, such as laser stripes, within a single collected image (such as in a single camera frame) and intelligently process that information to describe the object. The present invention achieves speed in acquiring 3D shape and contour data by projecting several laser stripes on an object during a single camera exposure. Each captured image will contain a set of reflected data points describing a shape that follows a contour line of the object. The use of multiple laser stripe generation per frame creates the difficulty of distinguishing the point of set of contour line points from another set within the captured image. Depending upon the reflection points each laser stripe creates, instances will occur when it would be difficult, without an inventive scheme, to determine those data points corresponding to a particular laser stripe.

To overcome this problem, the present invention employs one or more light sources and positioners, a computer and computer program elements to reliably identify the reflected points from different laser stripes. The computer synchronizes the light positioners with the camera and controls the light stripe positioning. The speed of the light positioners is much higher than the image taking rate of most commonly used CCD cameras, which have a typical frame rate of 30 frames a second and a typical shutter speed of $1/100$ second. Thus, in an embodiment using a camera as the image collector, the computer, during a single camera frame capture sequence, can move a laser stripe to several different positions. The following is an example of how the scanning procedure can be performed.

In the system of multiple shape scanning presented by this invention, the computer begins with a predetermined left and right boundary of an image space of a desired scanning area determined by autocalibration. After synchronizing the image capturing cycle of the image collector with the light positioning function, the computer positions a light shape (such as a laser stripe) on the object so that the data points reflecting from laser stripe lie approximately at a center point within the left and right boundaries of the image space. The image collector then takes a first image to collect a set of data points reflecting from the first laser stripe. The computer will create center line information from those data points.

Using this collected information, the computer can divide the frame area into two distinct intervals. During a second image, the computer initially positions a light shape, such as a laser stripe, for a determined time at a position within the left-half interval. Then the computer rapidly positions a laser stripe in the middle of the right-half interval and holds that position for a determined time. Thus, the second image captured has two laser stripes—each line consisting of a collection of data points collecting the reflections of the two laser stripe projections.

When multiple lines occur in a single image the difficult task is to discern those data points which correspond to a particular laser stripe. Because the image space was divided into two interval regions in the first image, the set of computer program elements can quickly differentiate the data points.

The multiple line scanning system of the present invention continues so that, for example, during a third image, the computer will subdivide the left and right regions of the image space and direct the light positioner to project laser stripes in the additional sub-regions. The process of dividing the image space proceeds until the required speed of the light positioner and the stability of the optical signal reach their practical limits, (e.g., with typically available equipment a system could obtain approximately 10 scanning positions in a single camera image with a single laser source and light positioner). Once the maximum or desired number of multiple line divisions are in place for a single image, the computer can shift the entire set of multiple lines across the scanned object to capture additional shape/contour information about the scanned object in a next image, and continue the process until the whole surface of the object is covered in great detail or, alternatively, until sufficient data has been gathered.

The present invention provides a further aspect related to rapid processing by providing a system to compress the video camera information as it is input to the computer. In an embodiment of the present invention employing a camera as an image collector, a large amount of video signal information (bytes converted from analog signals) comes to the computer memory (e.g., a rate of approximately 10 megabytes/second (black-and-white) and 30 megabytes/second (color)). The present invention provides a system which rapidly processes the information by compressing the image information and keeping from each image only the information about the reflected data points collected from the positioned laser stripes.

Instead of storing megabytes of information, the data compression system of the present invention reduces the raw data down to only a few kilobytes depending upon the application. As data arrives, the computer applies an "on the fly" test as it first comes into a memory buffer, with the computer rejecting pixel values that fail the test. The compacted data allows for easier, speedier processing and alleviates the need for massive computing power to complete the scanning process. A currently available personal computer is all that is necessary to implement the data gathering system of the present invention.

The present invention also provides features that allow for more accurate measurement of the object and better display of its image. One feature provided is a system to eliminate "noise" from the image information and determine the most accurate 3D spatial location of any reflection data point on the object to the degree of "subpixel accuracy". The image of the data point created by a laser stripe reflection can be three or more pixels wide, but the most intense portion of the point will be located in only a portion of a pixel. The invention refines the collected data points to subpixel accuracy by locating the most likely center of the data point according to calculation heuristics.

Another feature of the present invention in performing shape digitization is to obtain only the essential information when collecting shape data and color information about an object. In the present invention, it is not necessary in obtaining shape data to process full color information during scanning. The present invention features the ability in an exemplary embodiment to intake laser stripe scanning information about an object with an electronic camera, and to capture that information in black and white or through a single color port, such as the red. The present invention provides that color information about the object can be separately gathered apart from the collection of data points by laser stripe scanning and later matched and used with the three-dimensional data points.

The invention comprises hardware elements, including computer hardware elements, and computer software elements. A further aspect of the present invention is that it allows for embodiments which are portable (and not limited to any specific background) and can also be implemented using equipment available to the common consumer.

BRIEF DESCRIPTION OF THE DRAWINGS AND APPENDICES

DETAILED DESCRIPTION

A. Hardware Elements

Figure 1:
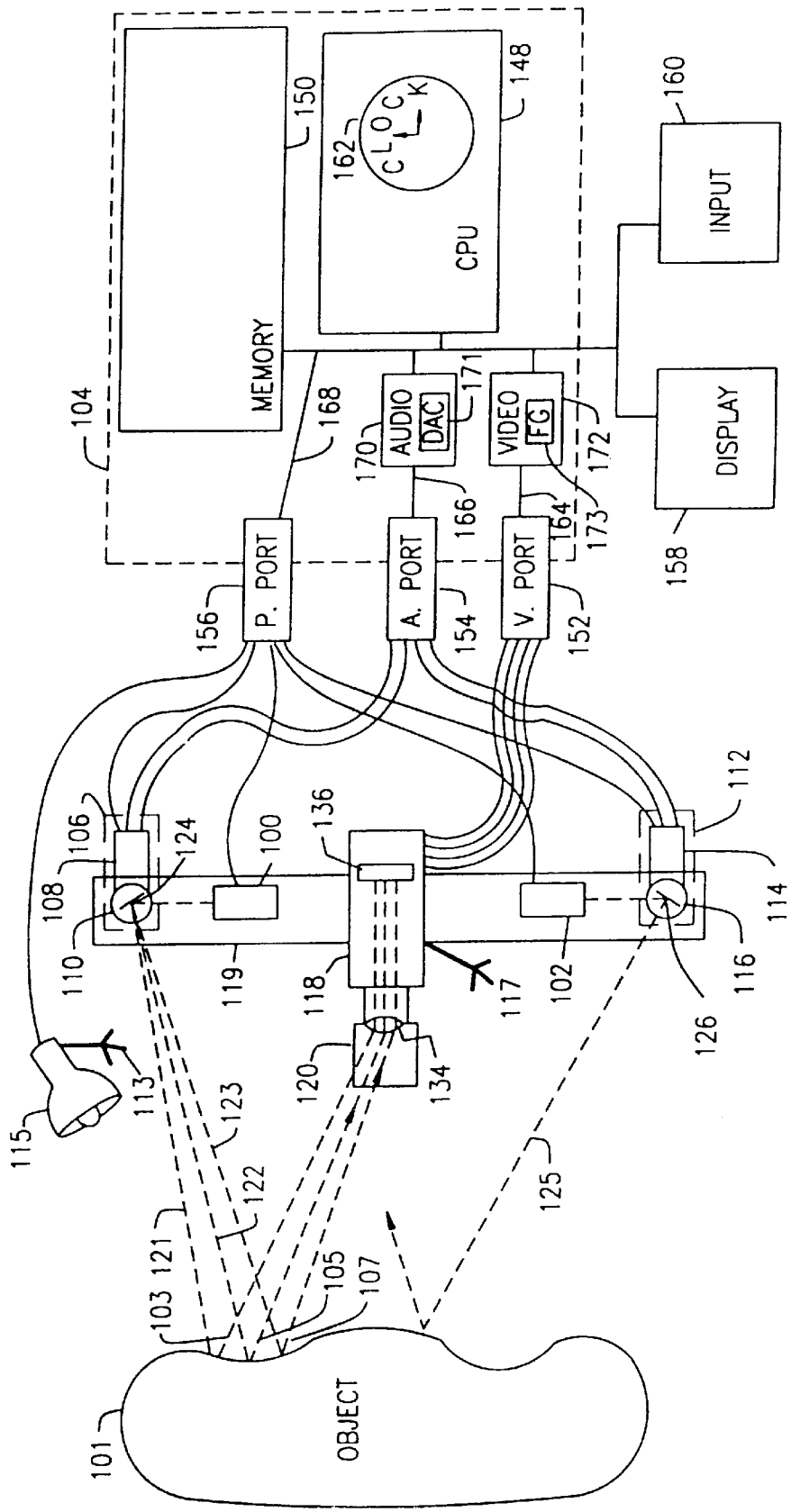
FIG. 1 Depicts an exemplary computer hardware configuration to implement of the present invention.

FIG. 1 depicts an exemplary configuration of hardware elements implementing the system and method of the present invention. It is noted at the outset that the invention can be implemented using many different configurations of equipment, and, as such, the invention is not limited to the embodiment depicted in FIG. 1. For example, other embodiments using different hardware element configurations are set forth in FIGS. 15a–d. Additional embodiments can be implemented using the teachings of the present invention.

i. Light Generator

Referring to FIG. 1, the invention provides that a light generator 100 be used to create beams of light that are directed toward an object 101 and project the shapes of light (such as the laser stripes) used to scan the object. In the exemplary embodiment of FIG. 1, the light generator 100 is a diode laser stripe generator, which is a type of laser that outputs a flat plane of light. When directed toward the object, the plane of light intersects the object 101 in a line that projects as a laser stripe and creates points of reflection, which describe a contour of the object's shape. Diode laser-stripe generators are commercially available and typically comprise a standard diode laser and a single lens attachment to the diode laser.

In the exemplary embodiment of FIG. 1, the present invention can employ many different types of diode lasers. The laser must generate sufficient light yet be safe and cost effective. The cost of the diodes used in the lasers depends upon their power. For example, five milliwatt (mW) diodes currently cost only a few dollars, while 100 mW diodes cost more than a thousand dollars. Another factor in the choice depends on the necessary safety requirements. For example, if the embodiment required a configuration to scan a sensitive part of a person's body, a particular diode laser must be selected so that the body part will not be damaged by exposure to the laser stripe during the scan.

Although diodes currently available having 5 to 50 mW power are sufficient for application in the 3D scanning system according to the present invention, higher diode power enables the 3D scanning system to scan remote target objects better and also allows the system to generate a greater number of laser stripe positions within a given image. Accordingly, although some exemplary embodiments of the scanning system might best incorporate a low power diode laser stripe generator, in certain circumstances a higher power diode laser stripe generator might be preferable because it would provide greater scanning power.

Referring to the embodiment shown in FIG. 1, it is possible to have a configuration of the present invention that would include more than one light generator. The present invention provides that two or more light generators could be used to scan according to the multiple-line method. FIG. 1 depicts such an embodiment, as it shows a second light generator 102, which is also a diode laser stripe generator. In that embodiment, both light generators 100 and 102 would be coupled to and operate in conjunction with a controller 104, such as a computer, to create laser stripes.

ii. Light Positioner

In addition to the light generators 100, 102, the system of FIG. 1 also incorporates light positioners 106, 112 to place light plane projections (e.g. 121, 122, 123, 125) and project laser stripes in different locations about the object (e.g. positions 103, 105, 107 and 109). In an exemplary embodiment, the scanning system of the present invention uses a mechanical galvanometric scanner as the light positioner 106. A galvanometric scanner comprises a scanner motor 108 attached to a rotating mirror 110. The scanner motor is coupled to and is directed by the controller 104, such as the computer, to rotate the mirror to specific positions at a high rate of speed. The motor uses electrical voltage signals to move and correspondingly position the mirror. By directing the output of the light generator (e.g., 100) toward the mirror 110 of the light positioner 106, the laser light can then be rapidly aimed as a plane of light to different positions on the object to create different laser stripes. The mirror's 110 movement is controlled by different signals of voltages input to the scanner motor 108, each different voltage signal corresponding to a specific laser stripe position assignment.

In an exemplary embodiment, the model 6800H galvanometric scanner, manufactured by Cambridge Technologies, Inc., provides a fast and precise way to position laser stripes and can serve as the light positioner 106. It provides approximate microradian ($\mu$rad) positioning precision and can be switched to any desired position assignment at a rate of approximately 1000 positions per second. The controller 104 directs the mirror rotation through the output of a directed set of voltage assignments. Just as the exemplary embodiment uses two light generators 100, 102, it will also use the second light positioner 112 to direct the light output of the second light generator 102. In the exemplary embodiment, the second light positioner 112 is also a galvanometric scanner comprised of a second motor 114 (coupled to the controller 104) and second mirror 116.

Other light positioners may be viable alternatives for directing the laser light, including an acousto-optical scanner, in which the laser beam projections are deflected by acoustic waves produced by an acousto-modulator crystal. Although currently, the positioning speed of the acousto-optical scanner can be higher than that of the mechanical galvanometric scanner, the set of available deflection positions are typically fewer and the price is typically higher than the mechanical galvanometric scanner.

iii. Image Collector

As laser stripes are projected on the object during the scanning process by either the single or multiple line scanning technique, the present invention provides that an image collector 118 capture images of the data points which reflect from laser stripes and describe the object's shape and contour. In an exemplary embodiment of FIG. 1, the present invention utilizes a charged coupled device (CCD) camera as the image collector 118 to record the data point reflection. In the exemplary embodiment, the image collector 118 (e.g., camera) collects images of pixels. One standard image is a matrix 640×480 pixels in dimension with each pixel being comprised to register a reading of light intensity. Cameras can be comprised to output the collected image in single frames or in multiple smaller units called fields. Cameras generally output light intensity readings for pixels as analog signals following either the National Television Standards Committee (NTSC) format or the European PAL format. An image "frame" for an NTSC standard camera comprises two interlaced image fields, one field comprising the odd horizontal pixel values of 640×480 matrix (thus, a submatrix of 640×240 pixel values) and a second field comprising the even horizontal line pixel values (thus, a second submatrix of 640×240 pixel values). One camera suitable for an embodiment of the present invention is a broadcast quality 3-CCD color NTSC camera XC-003 made by Sony.

An alternative embodiment provides that a black and white camera is used to collect data about the object. One advantage in such an embodiment is cost, since a black-and-white camera generally costs significantly less than a color camera. In the exemplary embodiment of FIG. 1, the image collector 118 is a black-and-white camera, such as the black-and-white XC77 camera made by Sony (although many different brands of cameras of similar type are also suitable). Typical black-and-white cameras have the same or better resolution than color cameras, so in scanning the black-and-white camera achieves the same shape resolution as the color camera and outputs less information to process. In an embodiment using a black-and-white camera as the image collector 118, the object's color information can be obtained with the use of a filter 120, such as the RGB FASTfilter made by Displaytech, Inc. The filter 120 attaches to the black-and-white camera and switches between color filters, e.g., three true colors: red, green and blue, within 100 μsec. Both the image collector (e.g. black-and-white camera) 118 and the filter 120 are coupled to the controller 104.

Currently the scanning quality in embodiments of the scanning system according to the present invention is partially related to the finite frame size and pixel resolution of the camera. The NTSC standard is one primary protocol of electronic image transfer and it limits resolution to 640×480 pixels per frame and frame rate to 30 frames, or 60 fields, per second. Although the optimal image resolution of the camera varies with the chosen application, the present invention makes it possible to plot and process the shape data for most applications on computer equipment that has resolution similar or equal to NTSC standard format. However, by using cameras and display systems with better resolution, the system and method of the present invention can achieve higher resolution scans.

iv. Orientation for Three-Dimensional Point Reconstruction

To orient the light generators 100, 102, light positioners 106, 112 and the image collector 118, the exemplary embodiment of FIG. 1 provides a frame 119. FIG. 1 depicts the relationship of the hardware devices to the frame 119.

The present invention provides that the separation along the frame 119 between the image collector 118 on the one hand, and the light generator and positioner (e.g., 106, 100) on the other hand, take different dimensions depending on the scanning situation. For example, in an exemplary configuration of a 20 mW diode laser stripe generator, a Cambridge model 6800H galvanometric scanner, and a black and white Sony XC77 camera, the distance along the frame between the camera and the laser source when scanning an object similar in size to a person's head from a location roughly two feet from the object would be in a range from 15 to 40 cm. The separation between the camera and light positioners 106, 112 determines the size of the frame 119 for the scanning system. The present invention provides that the frame can be adjustable to allow a change of distance between the image collector and the light positioner. The frame can be positioned in relation to the object using a device 117 such as a tripod, or it could be held by hand.

Figure 2:
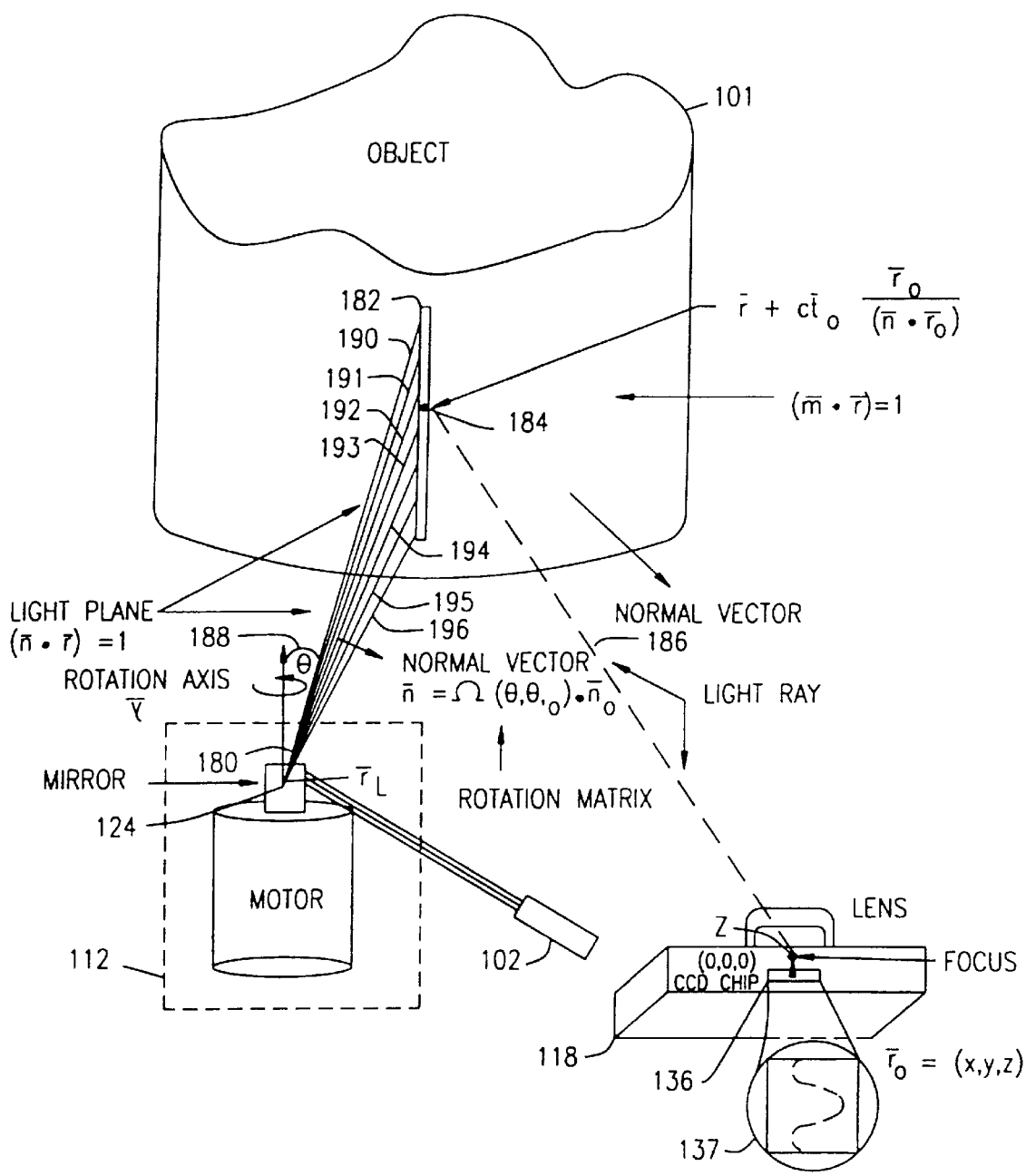
FIG. 2 Depicts an exemplary gathering of three-dimensional data for a point on an object by the light generator, light positioner and image collector according to the present invention.

As stated above, the present invention scans and collects three dimensional data about the object through a triangulation technique. FIG. 2 provides an exemplary depiction of the collection of three dimensional data by triangulation for a point on the object 101 according to the present invention. In triangulation, the present invention projects a plane of light 180, comprising beams of light 190–196 against the object 101. (See also 121, 122, 123, 125 in FIG. 1) Such a plane of laser light originates from a light generator such as the light generator 102 from FIG. 1. The plane of light 122 is directed to the object 101 by a light positioner such as the light positioner 112 from FIG. 1, which, in the case of the galvanometric scanner, deflects the plane of light toward the object 101. From a point of deflection 124, the plane of light 188 travels directly to the object and intersects the object along a laser stripe 182. Light from various points along the laser stripe reflects at an angle from the laser stripe position and moves toward an image collector device such as the image collector 118 from FIG. 1.

The image collector 118 is located at a distance from the point of deflection 124. From that image collector location the reflected points from the laser stripe describe a shape which reveals a contour of the object (See, e.g., 137). As light beams from the reflected points from the laser stripe travel, their images will be collected through the lens 134 of the image collector 118. The light will then travel to a light collector 136 inside the camera. The exemplary light collector 136 is comprised of a CCD chip with a two-dimensional matrix of pixels (such as a 640×480 matrix described above). The intensities of the reflection of the stripe of light 122 will register in a number of CCD chip pixels, according to the contour shape of the object as described in the reflected data points of the laser stripe. Those reflected points are a curvilinear set of points that describe a contour of the object 101 and an image of the reflections and they will be captured in the light collector 136 (e.g., 137). The camera exposes the light collector 136 for a given exposure time and then outputs light intensity value readings for the submatrix field of pixels, odd or even. The image of the laser stripe as it reflects from the surface is output as a number of (x,y) pixel matrix intensity values corresponding to the image of the reflection (e.g., 137).

Referring again to FIG. 1, the controller 104 directs the placement of the laser stripes and the capture of reflected data points as follows. According to the present invention for single line or multiple line scanning: in a single line scan, the controller directs the light generators 100, 102 and the light positioners 106, 112 such that only one laser stripe is generated per camera image; in a multiple line scan, many laser stripes are generated and their points of reflection captured in a single camera image. The controller 104 uses the data points found in the camera images to compute a set of three dimensional, X, Y, Z relational coordinate s by a non-cylindrical coordinate triangulation technique.

FIG. 2 shows the basic relationships of triangulation according to the present invention. Every point on the laser stripe 182 which is visible from the camera and at the same time is lighted by the light plane 180, can be found as an intersection of a plane with the line. The plane of projected laser stripe can be described as:

$$(n.r)=1,$$

where $n=(n_x, n_y, n_z)$ is some 3D vector, depending on the angle of rotation (e.g., 188) of the light positioner 112, and r is the position n of a point under consideration (e.g., point 184).

The line of light passing through the 2D point (x,y) on the light collector 136 (the CCD chip pixel matrix) located at a distance z from the focal point of the camera lens is described by an equation:

$$r = r0$$

where r0=(X,Y,Z) is the 3D coordinate of the screen point in a frame with the origin at the camera lens focal point, and c is the parameter describing the locus of points on the line extending from the focal point r=0 and passing through the point r=r0.

Solving the above two equations yields:

$$c = 1/(n.r0)$$

so that $$r = r0/(n.r0)$$

The value r is the three dimensional coordinate for the point 184 on the object.

v. Light Source for Color Collection

On some occasions, scanning with laser stripe generation occurs in a dark location or in a location with low light. To collect color and other information concerning an object, it may be necessary to illuminate the object with a light source such as a room light. FIG. 1 provides a light source 115, which as an exemplary embodiment is a commercially available room light. The light source is coupled to the controller 104 and the controller 104 is comprised to turn the light source 115 on and off. In addition, the light source could be mounted on a device 113, such as a tripod, or alternatively, it could be attached to the frame 119. Apart from the low light scanning situations, the present invention provides for scanning higher intensity lighting situations by using a daylight filter which is incorporated in the filter 120.

vi. Controller

In addition to the hardware elements described above, the invention provides a computer configuration comprising a number of hardware and software elements as the controller 104. The computer processing environment can be any environment that supports asynchronous and synchronous scheduling of processes, such as, for example, the processing of video information by direct memory access (DMA) transfer.

An example of a computer hardware configuration suitable for implementing the present invention is set out in FIG. 1. The figure describes a computer as the controller 104 comprised of a central processing unit (CPU) 148 which is coupled to a memory 150. The CPU 148 is further coupled to a plurality of ports by a bus architecture, each port being an external connector on the controller 104 and used to couple the controller 104 to peripheral devices, (e.g., the light generators 100, 102, light positioner 106, 112, image collector 118, filter 120, and light source 115). Each port is coupled to the CPU 148 by a plurality of channels 164, 166, 168. In the exemplary embodiment of FIG. 1 there is a first port 152, such as a video port, a second port 154, such as an audio port and a third port 156, such as a parallel port. In addition, the CPU 148 is coupled to a display device 158, such as a monitor, and an input device 160, such as keyboard. The CPU 148 functions and controls the connected elements with an operating system (which is incorporated within the CPU 148) and the programmed elements described below. The CPU 148 further comprises and is coupled to a clock device 162, which accurately marks time. In an exemplary embodiment, a commercially available computer, such as one of the "PowerPC" brand computers sold by the Apple Computer Company, or a PC using an Intel Pentium™ processor, or a graphics workstation such as the one sold by the Silicon Graphics, Inc. under the trade name "Indy" could be employed as a controller 104 to implement the present invention. For further information concerning those processors and their operating systems the reader is referred to the following publications which are hereby expressly incorporated by reference: *Indy Manual*, Silicon Graphics, Inc. (Mountain View, Calif.); *Inside Macintosh*, Vol. 6, Addison Wesley Publishing Company (Reade, Mass.).

vii. Audio Controller

The CPU 148 in the exemplary embodiment is further coupled to an audio controller 170 and a video controller 172. As described above, the motor of the galvanometric scanner can be controlled by a set of voltage signals. The CPU 148 can generate those voltage signals with an audio board which can serve as the audio controller 170. An audio controller board comprises the hardware and programmed elements of a digital-to-analog converter (DAC) 171 that enables digital commands to be output as a set of analog voltage assignments (e.g., 108, 114). The audio boards in computers currently available typically have 16-bit digital-to-analog converters, which generally match the precision of the galvanometric scanners used in the exemplary embodiments and thus enable the audio controller board to be used in controlling the galvanometric scanners. A typical DAC outputs voltage signals at a very high rate of speed. For an exemplary embodiment, the Indy brand computer sold by Silicon Graphics is comprised of a DAC that can output signals at 60,000 signals per second. Such an output capacity can be tailored to control the motor of a scanner (e.g., 108, 112) which can move to specific positions, for example, in $\frac{1}{1000}$th of a second for a galvanometric scanner. In the exemplary embodiment the audio controller 170 is coupled to the second port 154 by the plurality of channels 166. In the exemplary embodiment employing a plurality of light positioners as in FIG. 1, specific channels of the audio port can be used to control specific light positioners. In the exemplary embodiment depicted in FIG. 1, the right galvanometric scanner is coupled to a right channel of the audio port and the left galvanometric scanner is coupled to a left channel of the audio port (second port 154). As the CPU 148 outputs digital position assignments to direct the positioning of the laser stripes, audio controller will accept the digital assignment values, convert them to analog signals and output them to the light positioner.

viii. Video Controller

In addition to its coupling to the audio controller 170, the CPU 148 is also coupled to a video controller 172. The video controller 172 comprises a frame grabber 173 which enables the controller to accept collected images of video information and process it. As the image collector 118 outputs frames of data concerning the object 101, the controller 104 must process that information to achieve a data set that can describe the object 101. In an exemplary embodiment, the video controller 172 is coupled to the video port (first port 152). The frame grabber 173 of the video controller 172 augments the video controller 172 with hardware circuitry and program instructions to monitor the channels 164 of the first port 152, such as the video port, and to receive incoming image data signals to arrive in analog (e.g., NTSC) format. The frame grabber 173 can be enabled to process the video signals, which arrive as either fields or frames of information. In an exemplary embodiment, the frame grabber 173 of the video controller 172 should have a resolution that matches or exceeds the resolution of the image collector, e.g., the 640×480 pixel resolution of a CCD camera. As the image signals arrive, the frame grabber 173 time stamps the arrival of the incoming frame or field, collects the incoming pixel information, and collects any other information coming from the camera, such as the field sequence (i.e., whether a field is an odd or even interleaf), the duration of the transmission and other electrical parameters, such as burst. Then, the frame grabber 173 makes a dedicated analog to digital conversion of the data. As long as the CCD camera and computer are turned on, the frame grabber 173 of the video controller 172 will accept the analog signals from the camera and convert the image into digitized pixel values. However, the frame grabber 173 will not send that digitized information into the memory 150 until enabled by the CPU 148. Otherwise, the frame grabber 173 will drain the information and collect another frame or field.

When enabled by the CPU 148, the frame grabber 173 writes the field or frame of information to a designated location in memory 150 using, for example, the process of direct memory access (DMA) transfer. For DMA transfer capability, the frame grabber 173 of the video controller 172 is comprised of circuitry, such as a dedicated microprocessor, that transfers data from the video port (first port 148) to the memory 150 without using a substantial amount of the CPU 148 processing cycles. Although in DMA transfer the frame grabber 173 does use the CPU 148 to move information into memory (via the system bus) and thus the frame grabber 173 may periodically utilize CPU 148 cycles, data is generally transferred much faster than using the CPU 148 to transfer every byte of information. As depicted in FIG. 1, the image collector 118 is coupled to the video port of the computer (i.e., first port 152), and the frame grabber 173 is configured to monitor the channels of that port for incoming video data. As will be described below, the controller 104 will direct the light positions, following either the single line or multiple line scanning process, as the camera operates to collect and output data to the controller 104.

In addition to the control of the light positioners 106, 112 and the image collector 118, FIG. 1 also shows the connections that enable the controller 104 to direct the function of the other hardware components. In an exemplary embodiment, the third port 156 is a parallel port and used to provide commands to control functions such as: (a) turning on and off the light generators 100, 102; (b) turning on and off and switching the color filter nodes of the color filter 120; and (c) turning on and off the light source 115 (when necessary to collect color information). For the actuation of the light source, a high-voltage, high-current, solid-state relay is used. An exemplary embodiment parallel port (third port 156) has eight (8) parallel, digital lines, any one of which can be activated by the CPU 148. In controlling the light generators 100, 102, the digital signals are transmitted from the parallel port (third port 156) and received by TTL buffers, amplified by an emitter follower, and subsequently retransmitted to micro-relays which actuate the chosen component.

B. Programmed Elements

Figure 3A:
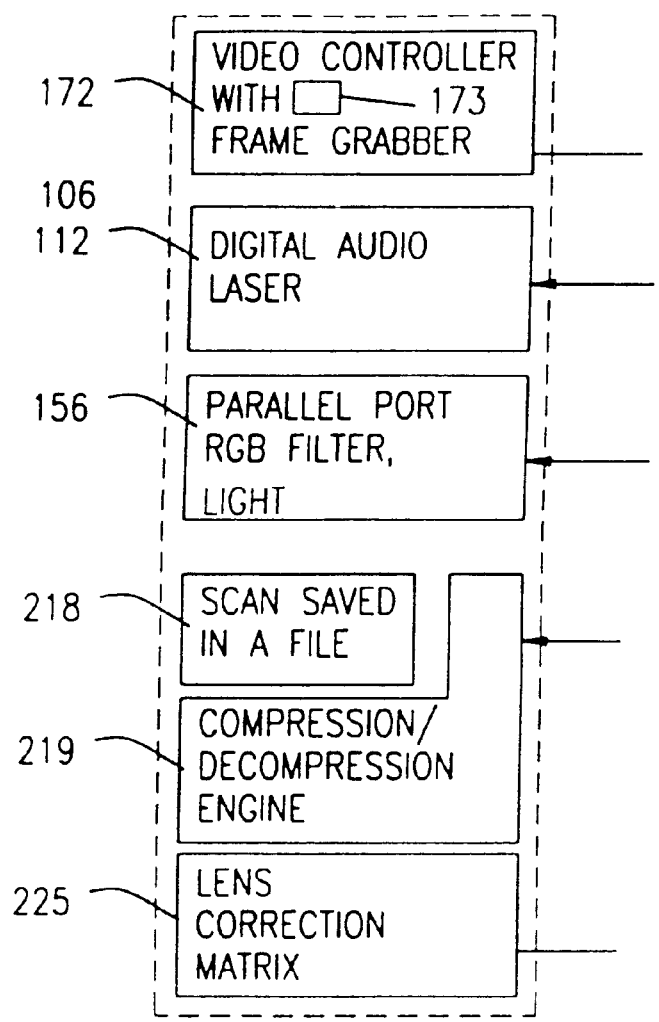
FIG. 3 Depicts an exemplary general overview of the programmed elements of the present invention.
Figure 3B:
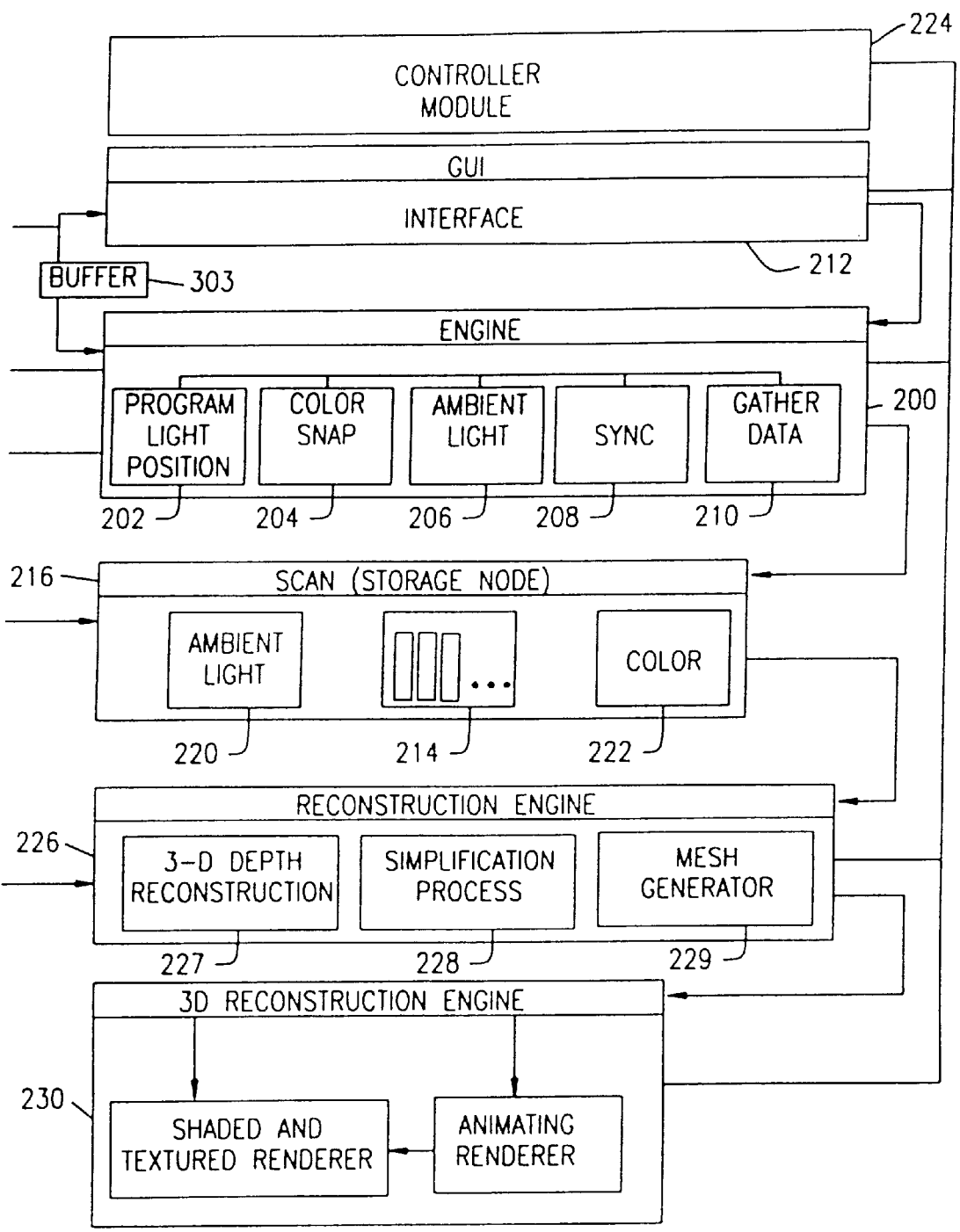

In addition to the hardware elements described above, the present invention comprises a number of programmed elements, program modules and data storage elements to execute three general operational phases: a data collection phase (which can be configured for either single line or multi-line scanning); a reconstruction phase (to refine the gathered data and generate a set of three dimensional points and an adaptive mesh model to describe the object); and a data use phase (to use the generated model for one of several different purposes, such as creating a graphic image of the object). The programmed elements depicted in FIG. 3 provide an exemplary set of modules for such functions.

i. Engine

For scanning operations, the present invention provides an engine 200 to execute the basic functions of gathering data concerning the object. In an exemplary embodiment, the engine 200 executes the basic procedures of: 1) creating a list of voltage position assignments that will program the light positioner(s) 106, 108 to position laser stripes according to either the single line or multiple line scanning technique; 2) collecting color information concerning the object 101; 3) collecting a reading of the ambient light in the scanning area; 4) synchronizing the output of the laser stripe position assignments to the image outputting cycle of the camera; and 5) gathering and processing the images of laser stripe data according to the data compression and subpixel accuracy determination technique of the present invention. In a program light position process 202, the engine 200 provides a set of instructions that enables the CPU 148 to generate a buffer full of voltage position assignments that, when output, will move the light positioners 106, 112 to specific position locations according to the single line or multiple line scanning technique. In an exemplary embodiment in which the light positioners 106, 112 are galvanometric scanners, the engine 200 in the light position control process 208 outputs a set of voltage assignments which, when translated to audio signals by the DAC 171 of the audio controller 170 (FIG. 1), rotate the mirrors 110, 116 to specific positions (and correspondingly direct the laser beam at specific angles corresponding to the voltage position assignments). When using a single line scan process, the engine 200 outputs a set of voltage assignments which will keep the position of the laser stripe in only one fixed position during a camera image producing cycle. In a multiple line scanning process, the engine 200 outputs a set of voltage position assignments that will position the laser stripes repeatedly over a number of set positions during the camera's image producing cycle. The process is set out in detail below. To execute the output of signals, the engine 200 uses an interface 212 to output the buffer of position assignments to the audio controller 170.

ii. Synchronizing Function

Before outputting the buffer of single or multiple line position assignments mentioned above, the CPU 148 is comprised to synchronize the beginning of the programmed sequence of signals to the image taking cycle of the image collector 118. To execute this process, the engine 200 provides a sync function 208 which synchronizes the movement of the light stripe to the image production cycle of the image collector, such as the camera.

A camera, as an exemplary image collector, outputs images at a set speed (e.g. 30 frames a second or 60 fields a second). Within this image producing cycle, the shutter of the camera will generally be open for a shorter time (e.g., 1/100 of a second). The sync function 208 determines a synchronization schedule with the camera so that the data collected in the frames after synchronization can be associated with specific laser stripe position assignments. After the system has been synchronized, the engine 200 can output the buffer of laser stripe position assignments. The next N images output (fields or frames) will correspond to images captured from those N sets of position assignments in the buffer.

iii. Data Gathering

The engine 200 also comprises a data gathering process 210 to capture and compare the images of captured information as it arrives in the controller. During the scanning phase, the image collector 118 (e.g., camera) operates to collect images of the object as the laser stripes reflect from the object's surface. In an exemplary embodiment, the camera outputs that information, as it comes to the controller 104 (FIG. 1) through a first port 152 (e.g., video port). The camera is coupled to the port 152 which is, in turn, coupled to the video controller 172. Video signals corresponding to frames or fields of collected data arrive as signals in an analog (e.g., NTSC) format. As they arrive, the frame grabber 173 of the video controller 172 gathers the signals and converts them from analog to digital format. When the engine 200 has synchronized the laser stripe position control process with the image taking process of the camera, the CPU 2 will signal the frame grabber 173 to output those frames of information to designated locations in a memory buffer 303. The frame grabber 173 sends the time stamped frame information via the DMA transfer to locations in the memory buffer 303, as described above.

As frames or fields of information arrive in the memory buffer 303, a data gathering process 210 performs several processing steps for each frame or field unit. First, it compresses the data. The data gathering process 210 performs a systematic, rapid data compression which substantially reduces the amount of video information which must be later processed. With any scan, a large amount of video signal information (bytes converted from signal information) arrives in the memory buffer 303. The data gathering process 210 provides a rapid process to compress the frame information, keeping only information about the laser stripe positions in each frame. The data gathering process applies a test to determine whether an x screen pixel value for a given y horizontal screen line contains laser stripe intensity information. If the x,y pixel value passes the test, it is kept for further processing; otherwise it is disregarded.

For each image collected (field or frame) the data gathering process 210 will create a matrix of y values, each y value corresponding to a horizontal line of a (e.g. 640×480) frame of pixel values output by the camera. Each y value in the matrix will contain a set of x coordinates of pixels that have laser intensity values.

Another step in the data gathering process 210 is to refine that collection of data points to a set of points computed to "subpixel accuracy." This invention provides that although the image of a laser beam can be several pixels wide, the most intense portion of the beam will be located in only a portion of a pixel. For a given laser stripe at a given angle, the most accurate reproduction of the object will be provided by determining where the most intense portion of the beam hits the object. Light noise, such as laser reflections and refractions, creates an initial set of laser data spread over a set of pixel widths. The present invention provides a refining step in the data gathering process for pinpoint determination of the most intense position of the light beam. By this refining step, the data gathering process 210 determines the screen location of the most intense portion of the laser beam and then eliminates all the remaining pixel readings for that laser stripe, thereby refining each x,y point in the data set to subpixel accuracy.

The result, after compression and subpixel accuracy determination, is a compact set of accurate, two dimensional data points. For each output camera image there is a corresponding x,y matrix in which y coordinates (representing each horizontal video screen line) will have associated with them a set of x coordinates for each data point captured in a given screen image. In a single line scan, there will be at most one x value per y screen line. In the multiple line scan there can be many x values for each y. The matrix of x,y intensity values for each collected image is stored in a location 214 in a data storage node 216.

In a further step the data gathering process 210 associates a laser stripe position assignment with the collected points so that three dimensional X,Y,Z values to describe the object can be later generated for each x,y screen value. As described above, referring to FIG. 2, a given camera image 137 contains a set of pixel points giving laser intensity readings. With a single line scan, a given image will contain only a set of points corresponding to a single laser stripe projection (e.g., 180) on the object 101. The points which reflect from that laser stripe form the contouring line which describes the object's shape (e.g., 137). The plane of light creating the contour (e.g., 180) is directed to the object by a laser stripe position assignment, which is a voltage signal output by the controller 104 which positions the mirror of the scanner to direct the light at a specific angle theta 188. For the multiple line scan, there can be many different laser stripes projected on the object during the capture of a single image and, correspondingly, there can be many different angles associated with a given image of data points in multiple line scanning. In processing images, the data gathering process 210 creates a list of the laser stripe position assignments and associate the angles corresponding to each laser stripe position assignment to the specific collected data points. In the multiple line process, angle association is difficult, unless there is some way to distinguish between collected data points. The present invention provides such a method. The process of that angle reconciliation is described below.

The final output of the data collection process is a set of matrices 214 showing, for each laser stripe, the collected x,y screen locations (computed to subpixel accuracy) of the points of reflection collected from the projected laser stripe. In the exemplary embodiment employing a galvanometric scanner, a value representing an angle theta (e.g., 188) will also be associated with the collected x,y screen points such that for each angle used in laser stripe position assignments, there is a set of (x, y) screen points to associated to a specific angle. After the completion of the data collection process, the matrix and associated angles can be further compressed for storage by a compression engine 219 and then written to a file 218. From there the data is ready for the 3D reconstruction phase processing.

iv. Ambient Light Function

In addition to collecting data points concerning the object from laser stripe reflection, the engine 200 is also comprised to collect color and ambient light information concerning the object and its light setting. Ambient light is a reading of the general light intensity of the surrounding area where the object is being scanned. In the exemplary embodiment of FIG. 1, the filter 120 is comprised with a daylight filter setting through which the filter passes only laser wavelengths. In this fashion scanning can be performed in daylight and normal lighting conditions. Otherwise low light conditions are presumed, although not required. To collect ambient light, the engine 200, in an ambient light function 206, controls the light generators 100, 102 to turn them off or (in an alternative embodiment) controls the light positioners 106, 112 to direct the light planes (e.g., 121, 125) to an off-screen position. As the camera outputs frames, the CPU 148 waits until the light beam is off (or off-screen) and then signals the frame grabber 173 to send one or more images (frames or fields). The ambient light function 206 then gathers that information into a matrix of screen pixel intensity values, an ambient light matrix 220. In an exemplary embodiment, that ambient light matrix 220 is used by the data gathering process 210, for example, in the test to compress the laser light generated data points.

v. Color Snap Function

Referring again to FIG. 3, the engine 200 also collects frames of color information concerning the object. The engine 200, in a color snap function 204, signals a light source 115 (if necessary), such as a room lamp, to illuminate the object 101 and gathers the color information in a series of frames. In the exemplary embodiment of a system using a black-and-white camera and a color filter 120, the color snap function 204 collects data while controlling the different color filter settings, red, green, and blue. The color snap function 204 also processes those incoming frames of color information and outputs a matrix of color values 222, such as a 640×480 matrix. The color matrix (as well as the ambient light matrix) can be saved in the file 218 with the collected laser point data. Later (for example, in the data use phase), the color information can be used with the set of reconstructed data points to create a full-color image of the object.

vi. Controller Module

To perform the basic data gathering phase functions, a controller module 224 works with the engine 200. The controller module 224 provides the interface between the user and the engine 200 to execute a specific scan. To perform a scan, the controller module 224 employs the interface 212 to set flags, semaphores and other controls for the management of the image collector 118, color filter 120, light source 115 and light positioners 106, 112.

vii. 3D Reconstruction

The controller module 224 further schedules the 3D reconstruction and data use phases. In the reconstruction phase, the present invention provides a 3D reconstruction engine 226. The 3D reconstruction engine 226, in a 3D reconstruction process 227, uses the raw scan data and computes, based on the found (x,y) pixel points and associated angles, a set of three-dimensional (X,Y,Z) points which represent points on the surface of the object. Given the known laser angles and other known distances as described above, the computer can quickly compute X,Y,Z values for each x,y pixel point based on triangulation techniques.

In computing the three-dimensional X,Y,Z points, the present invention allows for the retention of the original x,y data points. For each set of x,y pixel points corresponding to a given laser stripe, there is a corresponding data structure, a vector set comprised to hold the three-dimensional X,Y,Z values that describe the object. In an exemplary embodiment, each vector set is a dynamically allocated matrix of three-dimensional points. To compute the three-dimensional X,Y,Z values for each pixel point, the reconstruction engine 226, in the 3D reconstruction process 227, follows the triangulation procedure described above (see FIG. 2).

In generating the three-dimensional coordinates, the present invention provides that the reconstruction process 227 further refines the data to better 3D accuracy through a correction matrix 225. The present invention recognizes that distortions in the collected laser beam information can result from problems with the image collector 118, such as, for example, from the curvature of the camera lens. In a one-time calibration procedure, the camera is placed perpendicular to a flat wall and at a known distance to it. A computer configured according to the present invention invokes a laser calibration function to scan lines on the wall and to compute a set of three-dimensional points for those lines using the reconstruction technique of the present invention. By comparing the reconstructed X,Y,Z points to the (known) X,Y,Z points, the present invention generates a specific correction matrix for the image collector. The calibration procedure is described below.

viii. Data Simplifying Process

In a further 3D reconstruction phase process, the 3D reconstruction engine 226 invokes a data simplification process 228 to remove redundant points and provide significant compression for the vector set of computed three dimensional points. The process works with the generated set of data points found from each laser stripe, such that the input is the list of computed X,Y,Z points for a given laser stripe ordered by Y. Although each Y position value will not necessarily have a corresponding X,Y,Z value, each set of data points generally contains many points. When scanning certain objects, such as a person's face, there are areas in any scan line, such as along the person's cheek, where, when sorted by Y, many of the X,Z values for adjacent points are similar, if not identical.

Many of these redundant data points can be eliminated according to the simplification process 228 of the present invention. However, at the same time, simplification of the data set according to the present invention will not remove the subtleties of an object, such as the shape of the lips or eyes in the case of a person's face. The simplification process 228 of the present invention provides a system for compressing data which achieves multi-resolution of detail, depending upon the feature. The simplification process uses a tolerance criteria as a test to eliminate redundant points in the data set. The present invention provides that the tolerance criteria can be varied as well, thus providing an ability to create multi-resolution data sets of differing general resolution. The different sets can be generated to suit the need of the user, depending on the quality of refinement needed in the application. The processing of the simplification process 228 is described in greater detail below.

ix. Mesh Generator

Once redundant points are removed from the collected data points, the data set can be transformed into a model by a mesh generation process 229. The mesh generation process 229 seeks to connect the set of data points into a closely knit set of geometric objects, such as triangles, quadrangles or some mixture of shapes. One feature of the mesh generation process of the present invention is its ability to use data sets of different tolerances and build meshes of different resolution qualities. For example, a medical application may require a fine quality mesh, while a basic design application may only require a simple mesh. Data simplification creates different data sets with different tolerances. The mesh generation process can take these data sets of varying simplicity and create meshes for all of them, and in addition, provide a model in which the resolution level can vary across the model. For example, as described above, in creating a model from a data set describing a human head, the eye on a person's face will have more mesh resolution than the cheek. From the basic set of collected data points, the present invention provides that data simplification can be used for both high and low resolution purposes, and the mesh generation procedure 229 provides the ability to generate multi-resolution models for both purposes. The processing of the mesh generator 229 is described below.

x. Data Use Functions

After the post-processing phase, the present invention provides that the newly constructed three-dimensional data be used for different purposes, such as for the display and manipulation of the object's image on the computer.

A 3D rendering engine 230 as shown in FIG. 3 incorporates procedures to display a image based on the 3D information. To create a fully rendered visual image based on the 3D scan information even with a modeling system such as adaptive meshing, it is necessary to generate a set of all points making the image. However, the set of points collected is not the set of all points; it is only the set of data points found by laser stripe reflections. Thus, in creating a full image, there is a problem of generating many missing points. The missing points can be generated by interpolation, based on the known points. The present invention provides that the display module incorporate a "stitch" algorithm, which, through interpolation of nearby points, will create the missing (X,Y,Z) points. Using information stored from the color matrix 222, the computer can also display a full color image of the object. Further, using the ambient light matrix 220 the 3D rendering engine 230 can create images that incorporate synthetic lighting and texture mapping.

C. Programmed Element Processing

Figure 4:
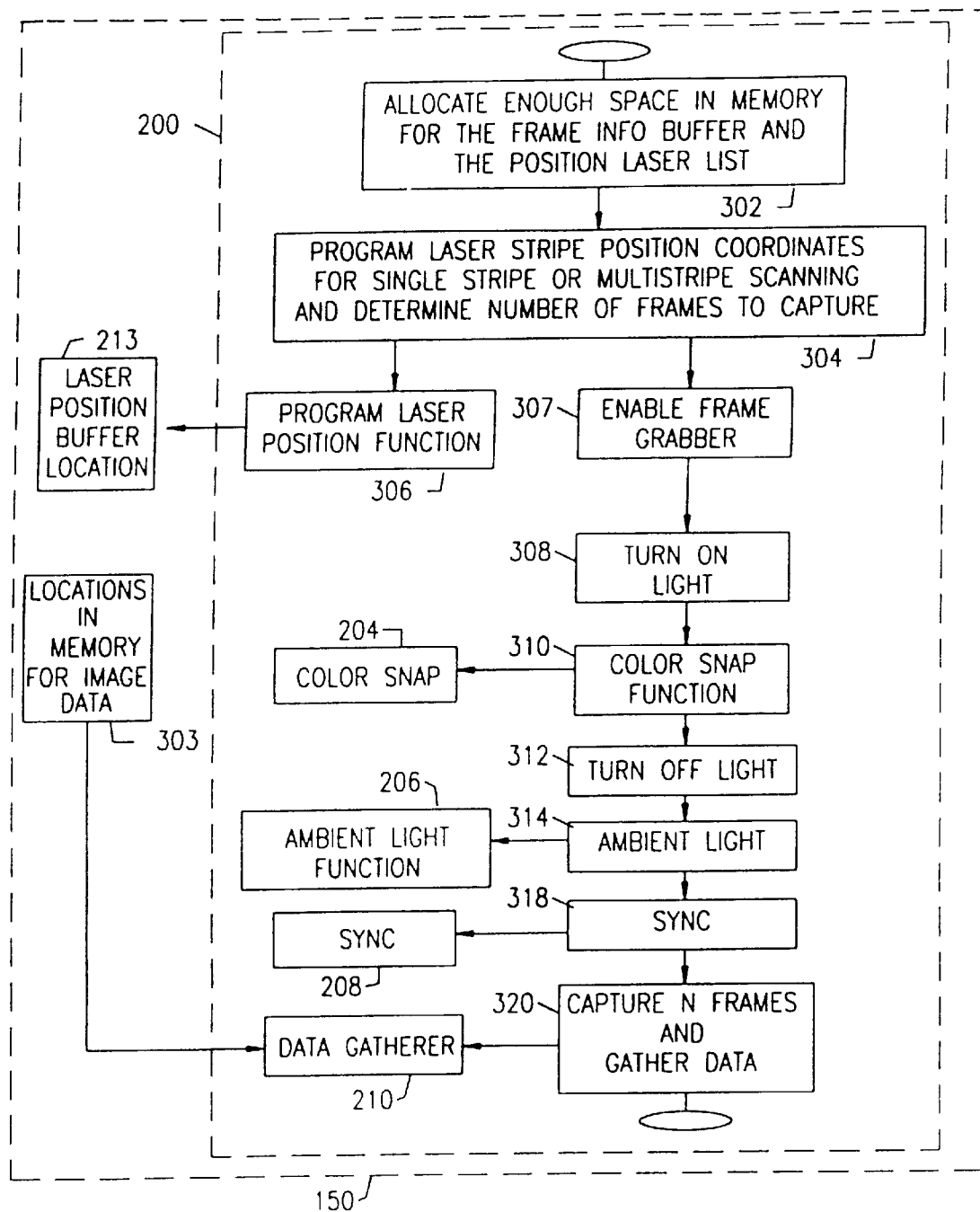
FIG. 4 Depicts an exemplary overall process flow of the engine of the present invention.

With the hardware and programmed elements described above, the present invention gathers, digitizes and manipulates information concerning an object. To execute the data gathering process, the controller module 224 calls the engine 200 to obtain the file of raw data concerning the object 218. FIG. 4 depicts the overall process flow of an exemplary engine 200 according to the present invention.

i. Engine Processing

Engine processing begins in step 302 as the engine 200 directs the CPU 148 to allocate enough space in the memory buffer 213 for voltage assignments for line positioning and in the memory buffer 303 for incoming camera images. In the exemplary embodiment, the voltage assignments used to position the laser stripes are kept in a designated memory buffer 213. Also, the incoming frames or fields information from the image collector 118 are moved by the frame grabber 173 in DMA transfer to specific, dedicated memory buffer locations 303. In step 302 the CPU 148 makes an allocation for the voltage assignments and a storage allocation for a number of image fields or frames that the system must carry in the buffer 303. In this step 302, the engine 200 will also set up for DMA transfers by sending to the video controller 172 the specifics of the dedicated DMA image locations 303 and size of the buffer allocation. At this point in the process, frames or fields of information are arriving in the computer and are being processed by the frame grabber 173. However, the frame grabber 173 will not output an image of data to any location in the buffer 303 until directed to by the engine 200.

In step 304 the CPU 148 programs the set of voltage assignments that the engine 200 will use to position laser stripes in scanning by calling the program laser position function 306. This function 306 receives as parameters minimum and maximum scanner voltage position values which represent the maximum and minimum positions that the light positioners 106, 112 can take in positioning the laser stripes such that the laser stripe will appear in a camera image. All position values between the minimum and maximum are "on screen" positions. All values outside of that predetermined minimum and maximum are "off screen" positions. The maximum and minimum values are predetermined and correspond to the left and right sides of the camera's viewing field.

ii. Program Light Position Assignment

For a single line scan, the program light position function 306 will create a set of position assignments for a set of N images that will be taken during scanning. For example, in an exemplary single line scan embodiment following the NTSC format, 60 camera fields of scan information can be taken. For a single line scan, the voltage assignment position values are determined by interpolation. There are many different interpolation methods available to achieve a set of angle assignments for a single line scan. One exemplary method is to rotate the scanner motor in fixed incremental movements for N frame steps starting from a minimum position. To create these values, the program laser position function 306 in a single line embodiment executes a processing loop for N frames, calculating voltage assignment values based on some step value starting from a minimum and maximum point, such as for i=0 to n−1 steps pos−min+(max−min)*i/n−1

Figure 5A:
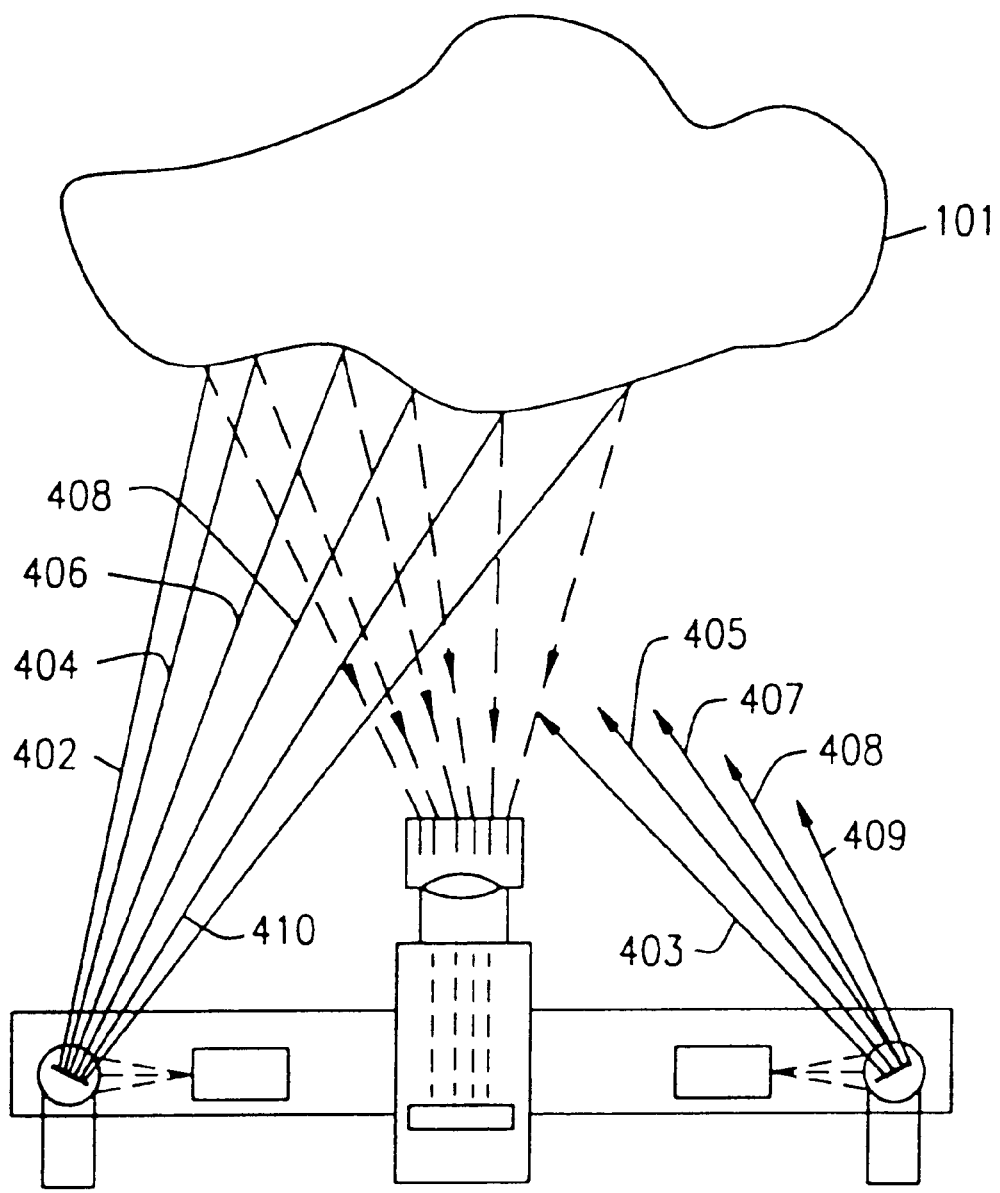
FIG. 5a Depicts an exemplary set of scan line position assignments for a single line scan according to the present invention.

FIG. 5a depicts the line sequence generated for N frames using the incremental line approach. In FIG. 5a the controller of FIG. 1 104 has outputted a plurality of voltage assignments that incrementally moves the light positioner of FIG. 1 112 by a known amount. Each voltage assignment directs the beams of light to a new position 402, 403, 404, 405, 406, 407, 408, 409, 410, etc. Each directed light plane projects a corresponding laser stripe on the object 101. Data points reflect from the object and their images collect in the camera. In this method the distance between the planes of light increases slightly as the scan proceeds. After the program laser position process 306 determines each incremental position value, the process then files the voltage position assignment in the buffer 213 with sufficient position assignment values, such that after synchronization, the scanner will hold that laser position for the duration of the camera's image producing cycle. In an embodiment employing more than one light source and positioner (e.g., FIG. 1, 102, 112), the program light position process 202 will also compute related position values for the other light position devices and store them.

For a multiple line scan, the present invention provides a different process to compute the light stripe position assignments. Multiple line scanning, according to the present invention, provides that the light plane be directed to many positions during the capture of a single frame or field image. The present invention provides that the laser position assignments be directed and carefully controlled so that reflected data points can be identified and associated with laser stripes that fall within a specific interval. There are many different schemes by which the engine 200 can generate voltage position assignments that will allow for multiple line scanning.

Figure 5B:
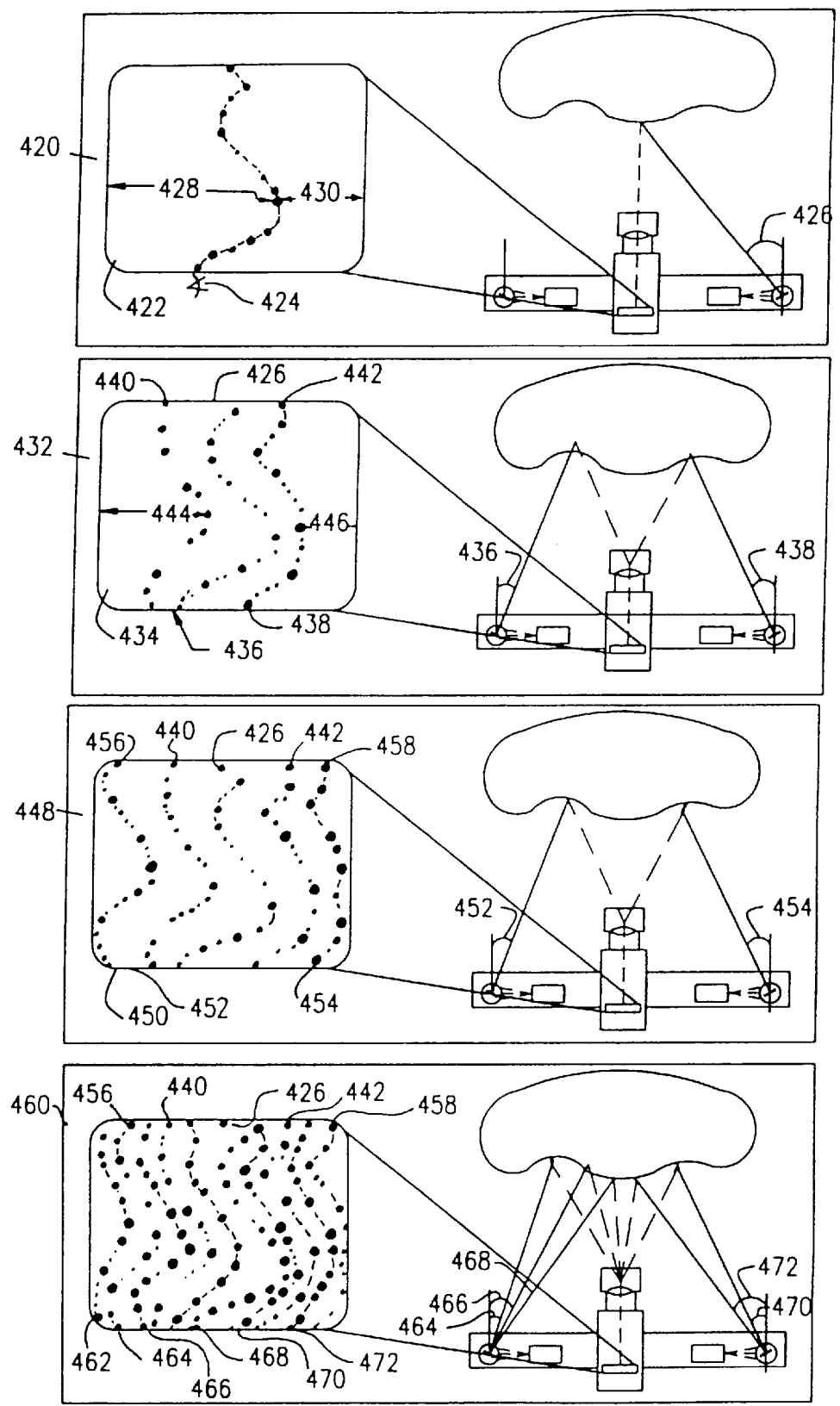
FIG. 5b Depicts an exemplary set of steps in a multiple line scan according to the present invention.

FIG. 5b depicts one exemplary method for generating multiple scan line position assignments according to the present invention. In step 420, the technique provides that the engine 200 generate (for a first image 422) a single, first position assignment 424, giving only a single laser stripe for that first image 422. The points reflected from this laser stripe will be generated into a reference line 426 for later multiple scan line generation. From this reference line 426 and the first position assignment 424, the invention provides that the screen is subdivided into two intervals. All position assignments on one side of the first position assignment will fall into a first interval 428, and all position assignments on the other side of the first position assignment will fall into a second interval 430.

In a next step 432, the present invention provides that the engine 200 output two position assignments for a second image 434. A first second position assignment 436 will assign a light plane to a location within the first interval 428; a second second frame position assignment 438 will assign a light plane to a location within the second interval 430. The second image 434 shows a collection of related data points. In certain instances it may be difficult to associate a particular position assignment to a particular point. However, by using the reference line 426 obtained from the first image 422, the points collected in the second image 436 can be accurately associated with a specific light position assignment.

The collection of points generated in the second frame image 434 can be used as reference lines 440, 442 to generate further multiple line scans. The first second position assignment 436 and the second second position assignment 438 create two new intervals to explore. All the position assignments from the left side of the screen to the first second position assignment 436 fall in a third interval area 444. All the position assignments from the second second assignment 438 to the right side of the screen fall into a fourth interval 446. In a third step 448, the engine 200 outputs two additional position assignments for a third image 450. A first third position assignment 452 provides a position within the third interval 444. A second third position assignment 454 gives a position assignment within the fourth interval 446. The points generated in the third image 450 can be associated to specific data points by the reference lines 440, 442 generated by the previous second image 434. Those points will also become reference lines 456, 458 for the next multiple line scan frame.

In this exemplary embodiment, the process of multiple laser stripe generation continues by two lines per frame, until the total number of lines generated equals the maximum number of lines that the system can generate within a single frame. That maximum number depends upon a number of factors, such as, for example, the strength of the lasers used in the system, the numbers of lasers used in the system, and the type of image collector used (e.g., sensitivity of CCD camera). Once the maximum number of lines has been reached, the system can generate that number of lines per image by using the previously generated points as references and, shifting in step-wise fashion the angle assignment positions of the previously generated positions.

For example, in the exemplary embodiment depicted in FIG. 5b, the maximum number of lines that the system can generate for a frame is five lines. Upon reaching this maximum number, the present invention will then begin to output the maximum number of lines in each new frame by the process of shifting. In next step 460, the engine 200 will generate new position assignments 464, 466, 468, 470, 472, in a fourth image 462. To generate those new position assignments, the engine 200 need only take the previous five position assignments and then shift them (right or left) by a stepping factor. The fourth image 462 will reflect a set of points corresponding to five laser position assignments, 464, 466, 468, 470 and 472. To assign specific laser stripe positions to the collected points, the engine 200 will use the previously found reference lines 456, 440, 426, 446 and 458 to assign each newly generated point a specific angle position assignment.

Figure 5C:
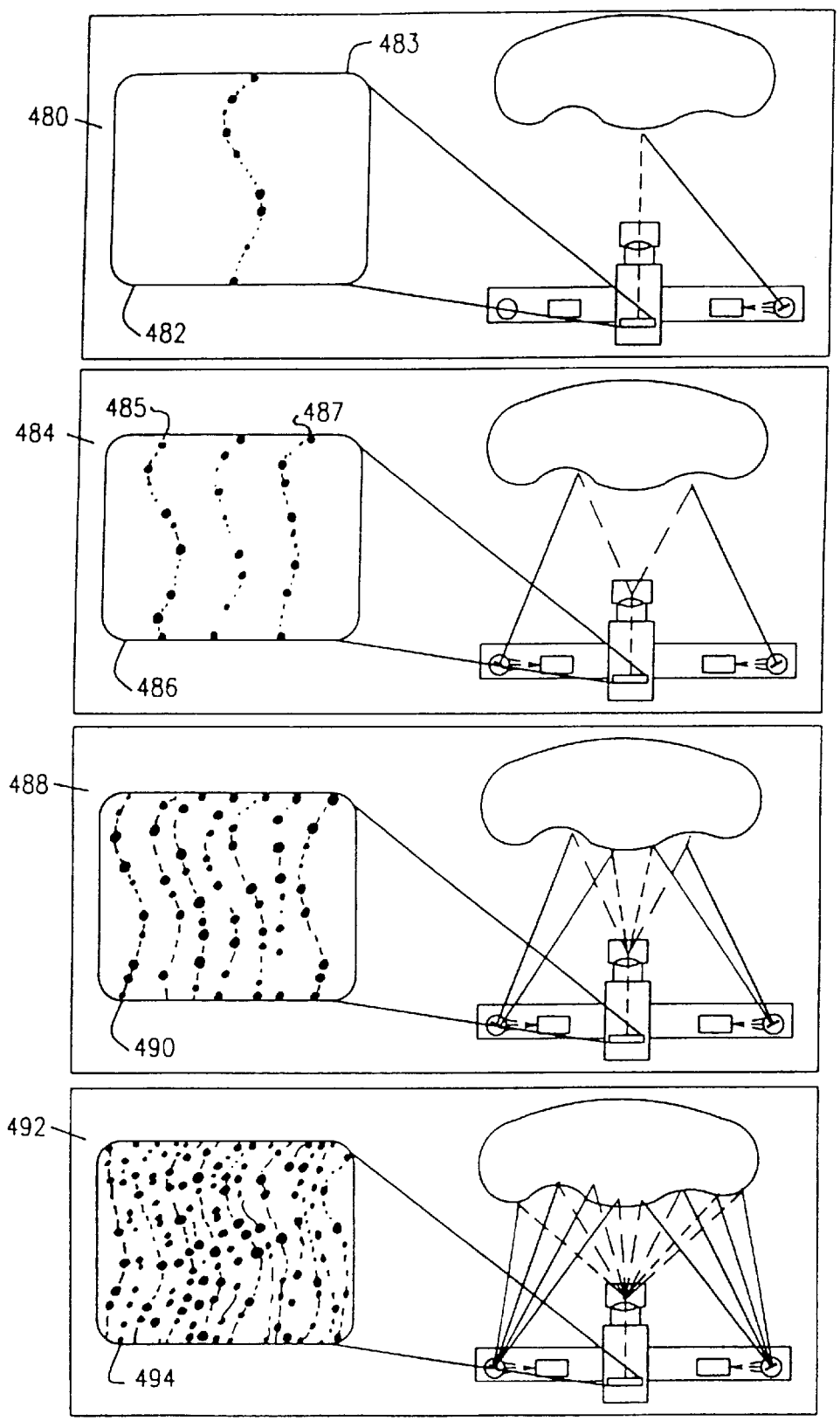
FIG. 5c Depicts an alternative exemplary set of steps in a multiple line scan according to the present invention.

It is also possible to generate multiple scan lines in pyramidal fashion, although the pyramid method requires more data storage and computer processing. FIG. 5c provides a basic overview of the pyramidal system. This technique of the present invention provides that in step 480 the engine 200 generate a first light stripe and gathers a first frame 482 containing only the single stripe as a reference or guide line 483. The engine 200 will then subdivide the screen space into two intervals based on that reference line. In step 484, the engine 200 generates two laser beams for the second video image 486. The first line generated will be directed to a position on one side of the reference line 483. The second line will be directed to a position on the opposite side of the reference line, such that the data points collected from the two lines in the second frame can be meaningfully associated with a correct and corresponding laser stripe position assignment. The two newly generated points become additional reference lines 485 and 487. With three lines generated, the engine 200 in step 488 generates four lines for the next image 490. The process continues in step 492 (8 lines, 16 lines, etc.) until, again, the system exhausts the upper limits of the laser device and scanner movement. Once that upper limit has been reached, the process of multiple line scanning can continue again by shifting those reference lines by a stepping factor.

Figure 6:
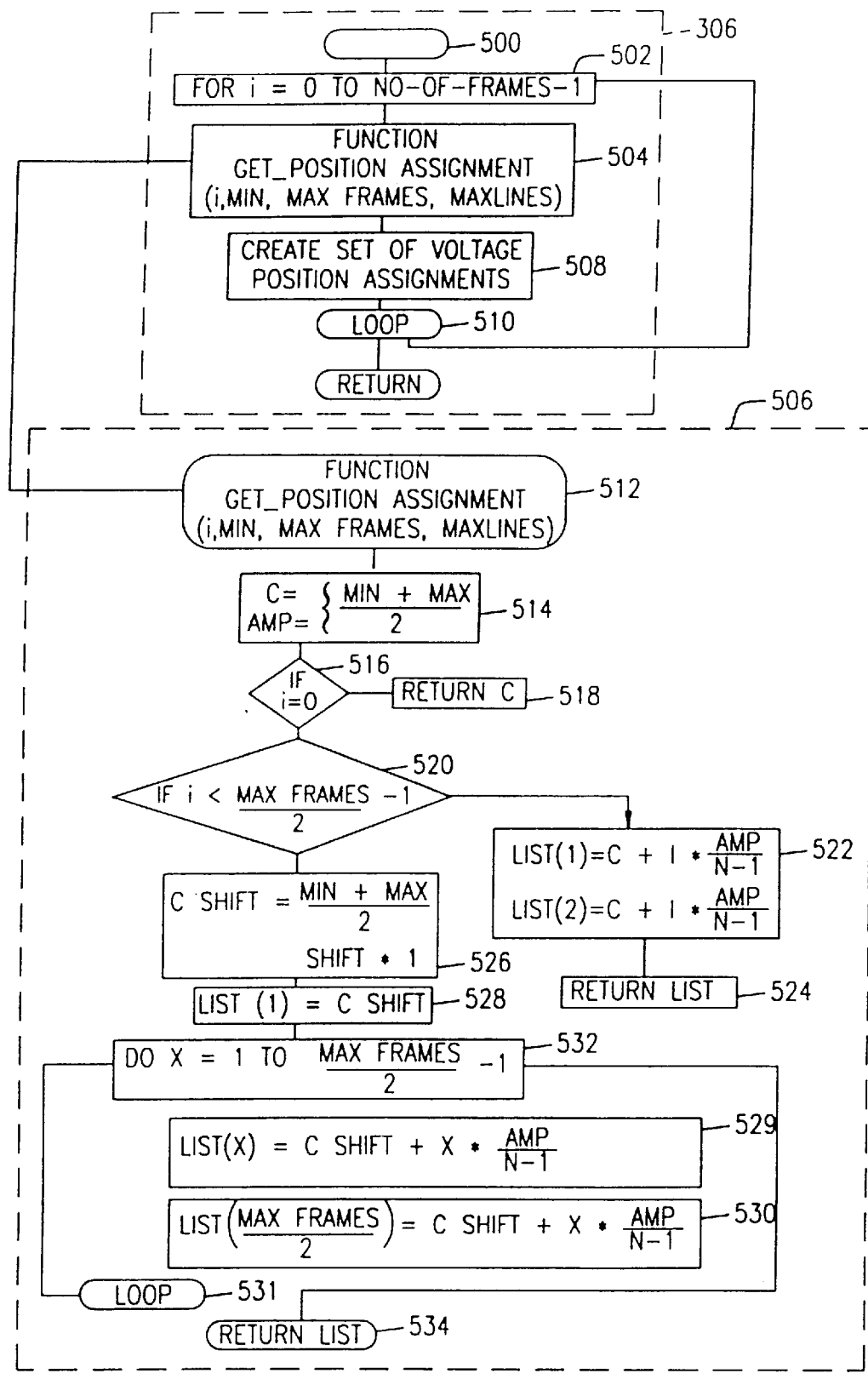
FIG. 6 Depicts an exemplary process flow of the program light position and get position assignment functions of the present invention, as configured for multiple line scanning.

Referring again to FIG. 4, the engine 200 in step 304 creates voltage position assignments according to a multiple line scheme by calling the program light position function 306. FIG. 6 depicts an exemplary process of the program light position function 306 for multiple line scanning. For this exemplary embodiment, it employs the multiple line generation technique depicted in FIG. 5b. The function 306 receives as parameters in step 500 the minimum and maximum screen position values and a value for the number of images that need laser position assignments (e.g., 10 fields).

In step 502 of the exemplary program laser function 306, the CPU 148 begins a processing loop to collect the position assignment values for each image. In step 504, the CPU 148 calls a get position assignment function 506. This function provides a list of position assignments for each image. As described more fully below, the get position assignment function will receive the current image number (i), a minimum and maximum position assignment value and a number of the maximum number of lines the system can generate. The CPU 148 returns from the function 506 in step 504 with a list of the voltage assignments for that image. The processing of the get position assignment function is described in detail below.

In step 508 the CPU 148 uses this list of position assignments to create a set of voltage assignments for one camera image producing cycle. In the exemplary embodiment, the image collector 118 has a frame producing cycle of approximately 60 fields a second. And during that ⅟60 second per image processing cycle, the camera shutter will be open for only ⅟100 of a second. As will be described in further detail below, the synchronization function 208 of the present invention synchronizes to the time of the camera's image producing cycles, not the actual shutter opening time. To ensure that the camera registers the multiple line pattern while the shutter frame is open, the program laser function 306 in step 508 creates a set of voltage assignment positions that will repeat the set of angle assignments many times during the time of an image production cycle. If the camera produces approximately 60 fields per second and the DAC 171 of the audio controller 170 can output 16,000 audio signal assignments per second, then the number of signal assignments that must be generated per field cycle is:

$$SPF = \frac{\text{Signals per second (e.g., 16,000)}}{\text{Camera speed (e.g., 60 fields/sec)}} = \text{appx. } 266$$

The program light position function 306 in step 508 creates a set of roughly 266 voltage assignments repeating the angle assignments to ensure that the multiple lines will be captured while the camera shutter is open. The voltage output assignments also take into account the speed of the positioner, which can, for example, position at a rate of 1000 positions a second. As the position values are generated, the computer writes them to the laser position buffer 213. In step 510, processing loops to step 502 and continues in this manner until the CPU 148 generates position assignments for each number N of images.

FIG. 6 also shows the processing of the get assignment function 506, mentioned above. In step 512 the process control comes to the function. In step 514 the CPU 148 calculates a centerline value taking the midpoint between the maximum and minimum position assignments. In step 516, if the current frame image is the first frame (i.e., i=0), then the CPU 148 proceeds in step 518 to return the midline assignment value. If, in step 516 the frame in question is not the first frame, then the CPU 148 computes the two line scan frame assignments for each next frame until the maximum number of lines has been achieved. For each two line scan images, the CPU 2 computes in step 720 the position assignments by parameters such as, for example:

assignment 1=center+step*frame_no.

assignment 2=center−step*frame_no.

where step can be an equal dividing of the image into intervals. Once the assignment values are collected, the CPU returns in step 524 to the engine process 200. If the maximum number of scan lines per frame has been reached in step 520, then the CPU 148, in step 526 begins the process of creating shifted assignment positions. In step 526 the CPU 148 calculates a new shifted centerline and adds it to the assignment list in step 528. Then the CPU 148 in step 532 begins a processing loop to create the shifted maximum line values for each line up to the number of maximum lines per frame permitted. The CPU 148 calculates two shift values for the two scan values and in steps 534, 536 adds them to the list. Once the list is completely calculated, the CPU 148 returns the list of angle assignments to step 504 of the program laser module 306. The processing steps 502–510 continues until the buffer has been loaded with position assignment values for each frame. Once that is done, the CPU 148 returns to step 304 (see FIG. 4) of the engine 200 process, and the engine 200 continues the further steps of the engine's overall process flow.

Referring again to FIG. 4, the CPU 148 continues the engine's 200 process of data collection. In step 307 the CPU 148 enables the frame grabber 173 by sending parameters to the video controller 172, such as the frame collecting speed of the camera (e.g., 60 fields per second) and information about the buffer 303 (e.g., size, image locations). Then, in the exemplary embodiment, the CPU 148 begins the process of collecting color information.

iii. Color Data Gathering

In step 308 the CPU 148 signals to turn on the light source 115 (if the user determined it would be necessary), the signal being sent via the third (e.g., parallel) port 156. In step 310 the CPU 148 invokes the color snap function 204 (of FIG. 3) which will execute the process of collecting color information. In step 312, the CPU 148 outputs a signal to turn off the light 115 and the engine will then begin the scanning process. The color information is useful, for example, for displaying a full color view of the object's image on the display device 158 of a computer. Although the process of color collection takes place at any point in the data collection phase (i.e., before or after laser scanning), in the exemplary embodiment, the present invention provides that the color snap function 204 execute before the scanning, at a time when the light is on (if necessary) and the lasers are off or off screen.

Figure 7:
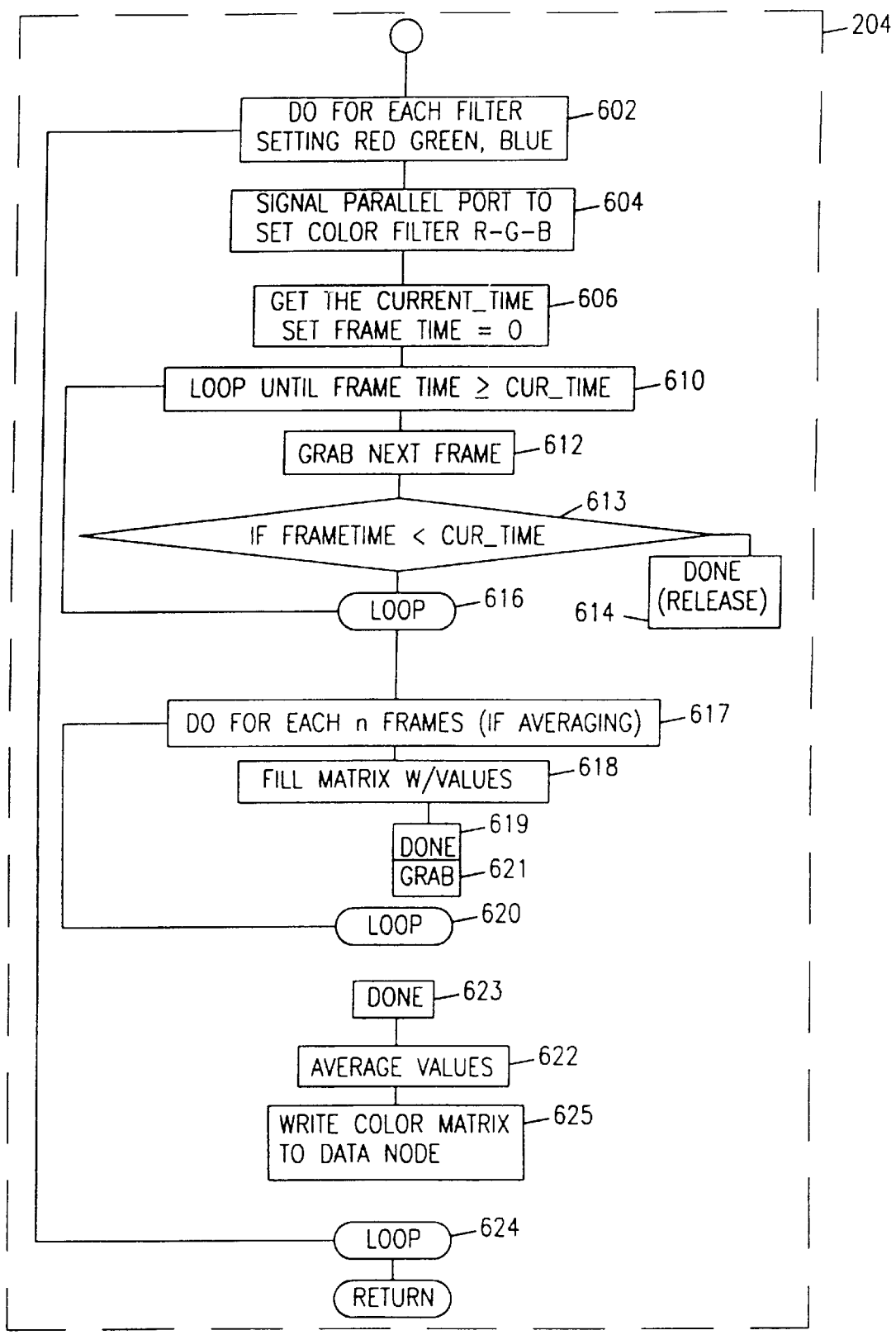
FIG. 7 Depicts an exemplary process flow for the color snap function of the present invention.

FIG. 7 depicts an exemplary process flow of the color snap function 204. In the exemplary embodiment, the image collector 118 is a black-and-white video camera fitted for color collection with an RGB filter 120. In step 602 the CPU 148 begins a processing loop for each of the possible color filter settings, e.g., red, green and blue. In step 604, the CPU 148 outputs a signal through the port 156 (e.g., parallel port) to set the RGB filter 120 to a first setting, e.g., red, green or blue. From the time of that setting, it will now be possible to collect information in the filter for that color. In step 606, the CPU 148 gets the current time and also sets a frame time variable to zero.

Before collecting the color information, the CPU 148 first executes a loop in step 610 to ensure that the next image is a frame or field of the correct color filter setting. The loop of step 608 will continue until the time stamp of the frame or field is greater than the time obtained in step 606. This comparison ensures that the color collection steps are synchronized with the correct filter setting. In step 612 the CPU 148 invokes a function to grab the next frame. This function signals the frame grabber 173 to direct that the next frame be written to a location in memory buffer 303 by DMA transfer. If time stamp of the frames is less than the time the filter is set, the CPU 148 will skip the frame in step 614 by releasing its location in the memory buffer 303. If the current frame is a frame containing correct color information, then the CPU 148 in step 618 saves the frame location and then loops in step 620 to step 617 to collect other frames of values to average. It will return to step 618 and repeat steps 617–620 until the frames to average are collected. After, in step 622 the CPU 148 will average the pixel values for the frame, create a color composite matrix for the color, and in step 623 write the values to matrix 222 in the storage node 216 (FIG. 3). In step 624 the CPU 148 returns to step 602 and continues the process for the next filter setting (e.g., green, then blue). Once the color snap function 206 completes this processing, the CPU 148 in step 628 signals the frame grabber 173 of the video controller to stop the DMA transfer process, and returns to the engine process of FIG. 4 and turns off the light in step 312 (FIG. 4).

iv. Ambient Light Gathering

In the exemplary embodiment, the next step in the scanning process is to obtain an ambient light reading in the scanning area. Referring to FIG. 4, the CPU 148 in step 314 invokes the ambient light function 206 (of FIG. 3) which will collect ambient light readings for the scanning area. In processing, the ambient light 206 function proceeds in a way similar to the color snap function 204. In a first step the CPU 148 will turn off the laser. In an alternative embodiment, the CPU 148 can output an assignment to move: the laser to an off screen position. Then the CPU 148 signals the RGB filter 120 to the black-and-white (filter off setting). After, the CPU 148 obtains the current time (time of the filter setting) and loops until the next frame time stamp is greater than the current time reading of the filter setting. Then the CPU 148 proceeds to collect either a single frame or a group of frames to average. The frame (or the average values for a number of frames) will be collected in the ambient light matrix 220 (FIG. 3) and stored in the data node 216. When the ambient light function 206 completes its processing, the CPU 146 returns to the engine 200 processing function in FIG. 4.

V. Synchronization Process

Once the ambient light has been collected, the process of scanning using either the single-line and multiple line light positioning methods can begin. To execute this scanning process the present invention provides that the laser positioning process be synchronized to the image collection process of the image collector 118. In the embodiment using a video camera, the camera outputs image fields at roughly 60 fields per second. For the engine 200 to provide either single line or multiple line scanning, the engine 200 must know which given N camera fields of information correspond to the carefully directed N light position assignments of the multiple line or single line scanning techniques. Referring to FIG. 3, the exemplary engine provides the sync function 208 for this purpose. Referring to FIG. 4, the CPU 148 in step 318 invokes the sync function 208. The sync function 208 will synchronize the engine's control of the light movement with the shutter speed of the camera.

After the sync step 318, it is guaranteed that the next N frames captured will correspond to the N frames of position assignments generated by the engine 200.

The sync function 208 works according to the principle that a camera will output images in a certain fixed but determinable rate and that the output of the laser positioning can be linked to that fixed rate, so that a given N frames will contain the prescribed N frames-worth of line assignments. Although it is possible to incorporate a specialized control with specialized circuitry to hardwire the camera's shutter signals to the laser controllers, in an exemplary embodiment, the sync function 208 presented provides a system and method by which an ordinary, commercially available camera can be incorporated into the system.

Figure 8:
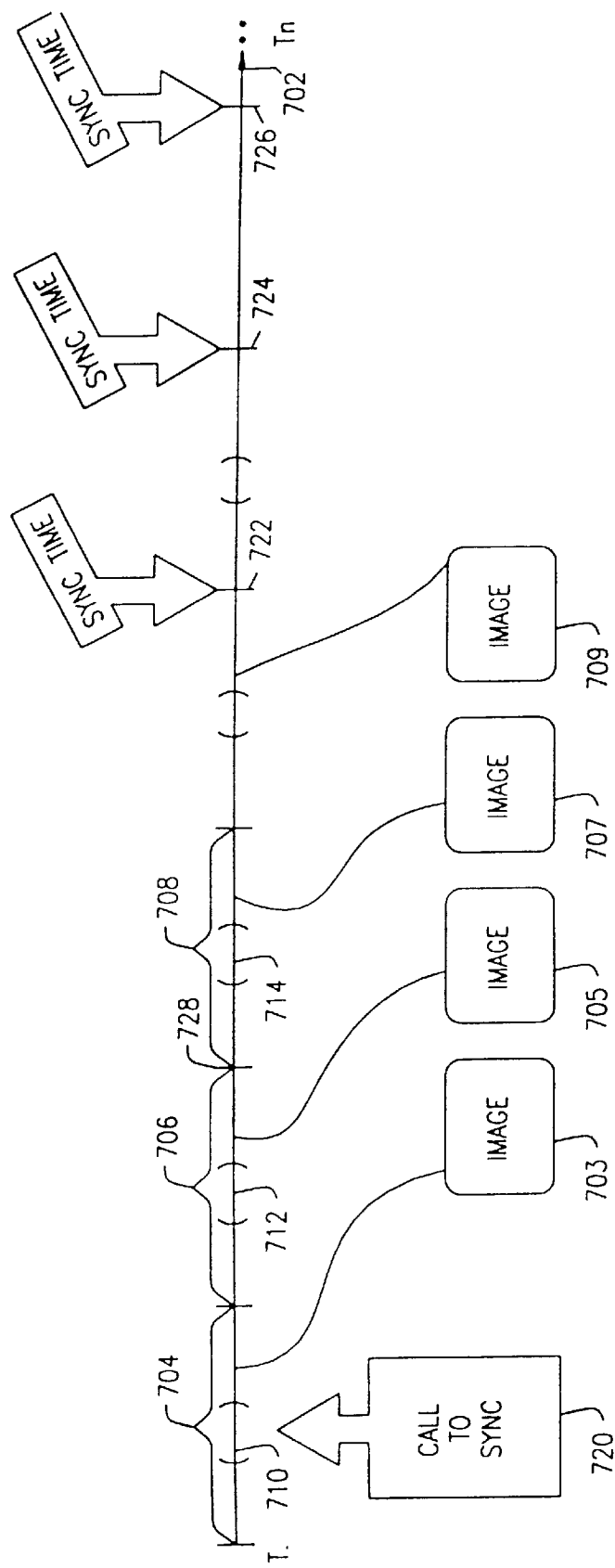
FIG. 8 Depicts an exemplary timing sequence of the synchronization function of the present invention.

FIG. 8 provides an explanation of the basic workings of the sync function. In FIG. 8, time is depicted as a line 702 progressing in a left to right direction from $T_0$ to $T_n$ seconds. In the exemplary embodiment, the image collector 118, a video camera, outputs images at a rate of 30 frames a second or 60 fields per second. Thus, during one second of time on the time line 702, the camera will operate to output approximately 60 fields of data in a regimented, fixed cyclical fashion. The regular nature of this process from start of cycle to output means that a second of time can be partitioned into roughly sixty $1/60$th second intervals. The intervals 704, 706 and 708 are sample partitions in FIG. 8. Moving from left to right they show a beginning of an image taking sequence and, at the end, an output. Within each interval, the camera's frame will open and close to collect an image of light as it reflects from the object. Within each interval, the shutter is typically not open for the full $1/60$ of a second; instead, the shutter is open for a lesser time, such as, for example, $1/100$ of a second. In FIG. 8 shutter intervals 710, 712 and 714 depict the time the shutter is open within each image producing interval.

A call to the sync function 208 could occur at anytime during the frame taking sequence of the camera, as for example, the sync call at time step 720. If the sync function 208 outputs all laser position assignments at this point, there would be no guarantee that the next N frames would contain the laser assignments for the N scan frames. The. job of the sync function 208 is to determine the rhythm of the camera output sequence and then plan for a future time where the laser positions can be aligned with the image taking procedure, such as at time 722, 724 or 726. Once that time has been correctly determined, the buffer of light position assignments can be output to direct the positioning of the scanner.

Figure 9:
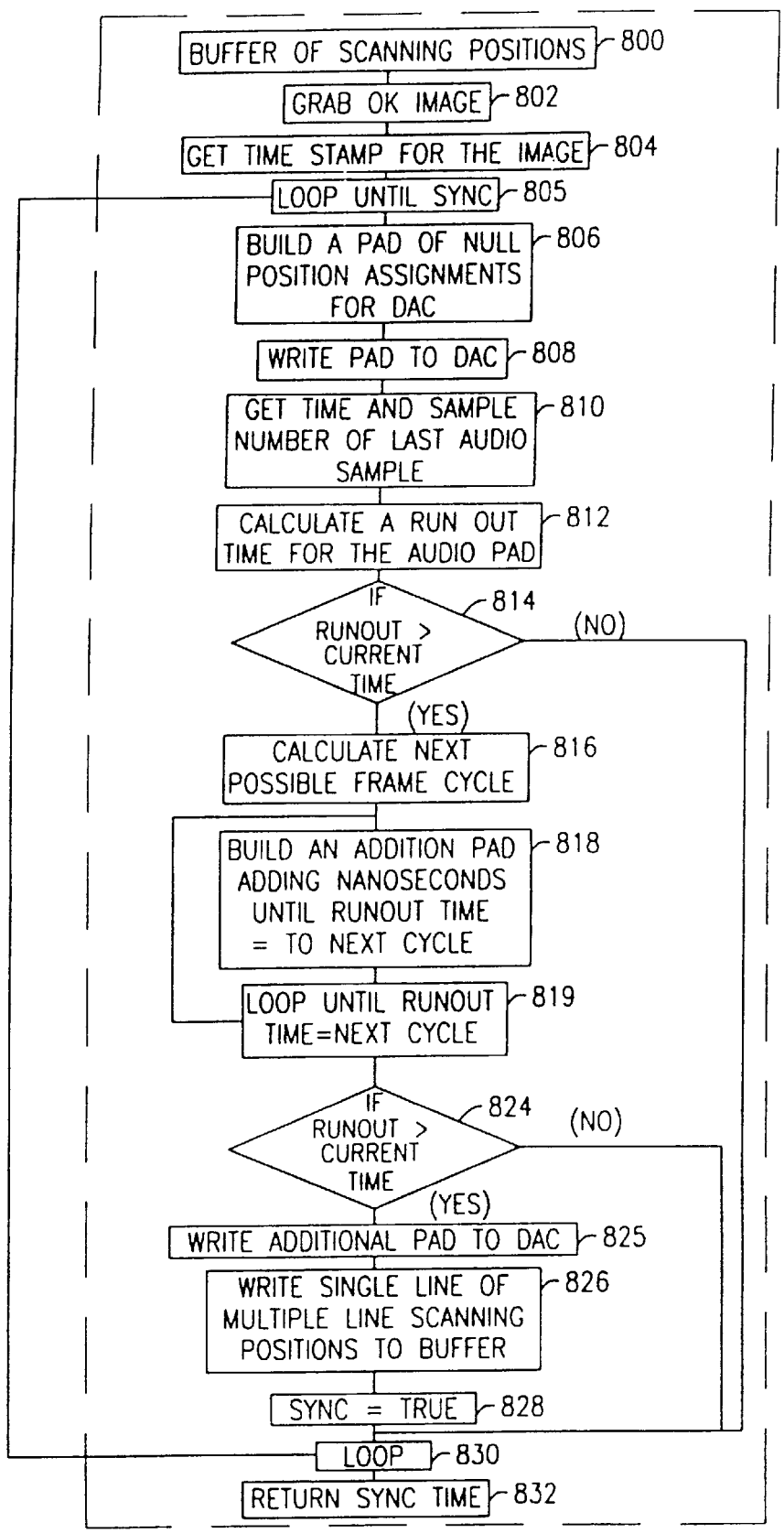
FIG. 9 Depicts an exemplary process flow of the sync function of the present invention.

FIG. 9 depicts an exemplary process flow to implement the synchronizing function 208 of the present invention. As input, the sync function 208 receives in step 800 the memory buffer 303 location containing the laser position assignments. Processing begins in 802 as the CPU 148 signals to grab the next frame by sending a signal to the frame grabber 173 of the video controller 172 directing it to send the next available frame (either arriving or arrived) to a location in the memory buffer 303. As the incoming frame arrives with time stamp information, the CPU 148 obtains in step 804 the time stamp for that frame. Referring to FIG. 9, the time stamp obtained in step 804 will be an accurate indication of the point in time when the image collector 118 last completed the image taking sequence, such as (in FIG. 8) at time point 728. The CPU 148 will use this time stamp to plan an eventual synchronization point (e.g., 722, 724, 726) a few fields ahead. To get to the sync time, the CPU 148 outputs to the audio controller 170 a set of voltage pad values. The pad values are a set of laser voltage position assignments, having null or non-specific position values, however, the set is of a definite, specific size, such that, when output, the pad values will control the light positioners for a known and specific time. The audio controller 170 will output these pad values, and they will be determined to end at a designated time. As stated above, when a camera is the image collector 118, the camera outputs approximately 60 fields every second. As the audio controller 170 outputs signals to the scanner at a rate of 16,000 signals per second, then during the camera's field taking cycle the DAC 171 will output 16,000/60 signals per field (SPF)—approximately 266, as described above. In the exemplary embodiment, the pad will consist of one, two or three fields worth of null values (SPF * x frames). In step 806, the CPU 148 builds a pad of voltage position assignments, and in step 808 writes those pad values to the audio controller 170 for output by the DAC 171.

The pad creates a run out time value for the audio controller 170 which the CPU 148 will calculate and use to synchronize further output with the upcoming cycles of the camera. In step 810, the CPU 148 obtains from the audio controller 170, the sample number and time that the last pad value position assignment was output. That sample number corresponds to some one value in the sequence of assignment values in the pad. By knowing the sample number and the time of its output, the CPU 148 in step 812 can calculate when the pad of value assignments will run out. Depending upon the processing load of the system, this run out time could be a value in the past or in the future. If the run out time is in the past, the CPU 148 will loop to step 830 and return to step 805 to generate new pad values and, again, direct them to be written to the audio port 154. In step 814, if the run out time is greater than the current time, then it will be possible to synchronize with an upcoming camera cycle. In step 816 the CPU 148 will calculate the beginning of the next possible image cycle after the run out time based on the time stamp information obtained from the field in step 804. Then, in step 818, the CPU 148 begins a loop to output nanoseconds of pad values to the audio controller 170. Those values make up the difference between the run out time and the next available frame cycle. In step 818 the CPU 148 builds the additional pad and then in step 819 loops until the extra values are created. Then in step 824, if the current time is still less than the run out time, the CPU 148 will direct the new pad values to be output by the DAC 171 of the audio controller 170. At this point, the audio controller 170 will run out of pad values exactly at the same time that the camera will end a cycle of field output (e.g., time 722 in FIG. 8). Now, the audio controller 170 is in a position to synchronize its output with the image collection cycle of the camera.

At this point, the CPU 148 can write the set of laser stripe position assignments for single line or multiple line scanning (previously stored in buffer 213) to the audio controller for output to the light positioners 106, 112 (FIG. 3). The sync function guarantees that the next N camera images will contain the careful sequence of position assignments generated for single line or multiple line scanning. In step 826, the CPU 148 writes the laser position buffer 213 to the audio controller 170 which will output these specific positions in synchronization with the image collecting cycle of the camera.

In outputting the laser position assignments, the present invention also provides a method to insure that each position assignment for a given field will be captured by the camera while its shutter is open. As described above with reference to FIG. 8, the present invention synchronized its position output with the beginning and end of the camera's image producing cycle. However, within that cycle the shutter of the camera will open at an unspecific time. To ensure that the laser stripe position assignments will be properly exposed, the present invention provides, as described above, a method which repeats the position assignments to ensure that each position assignment will be exposed to an open camera shutter.

Figure 10:
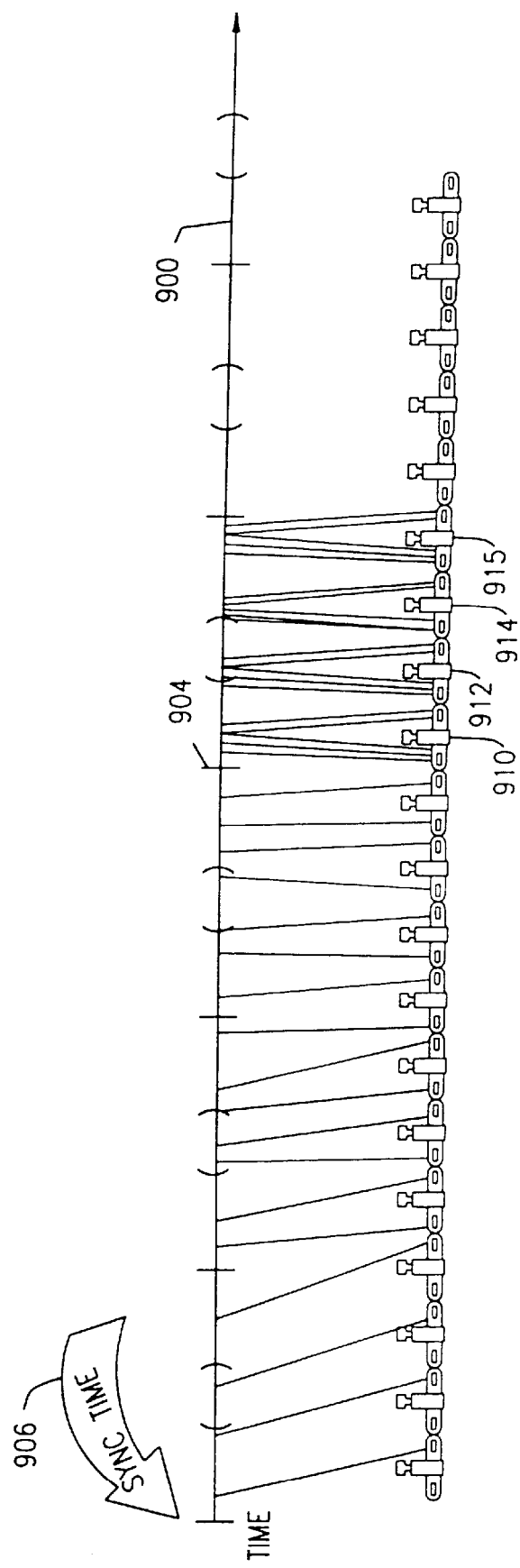
FIG. 10 Depicts an exemplary timing sequence of the synchronized output of position assignments according to the present invention.

FIG. 10 depicts an exemplary timing sequence for the position assignments, after synchronization. FIG. 10 depicts a time line 900 progressing from left to right. The time line 900 is partitioned into intervals representing the camera's image capture cycle. After synchronization 906, the CPU 148 begins to output position assignments previously computed by the program laser position function 202. As stated above, during the processing cycle of each field, the DAC 171 of the audio controller 170 has the capability of outputting roughly 16,000/60 signals per field (SPF). Given this extremely high positioning capability, the present invention ensures that the position assignments for a given frame will be exposed by repeating each angle assignment as many times as possible during the image capture cycle. For example, in FIG. 10, the angle position assignments for an image capture sequence 904, which has 5 laser positions, will have SPF/5 repetitions as denoted by repetitions 910, 912, 914 and 915. The output buffer built during the program laser position process 306, contains enough position assignments to repeat the values of the assignment as needed. As the computer can generate position assignments at speeds faster than the image collection speed of the camera, it is possible that the CPU 148 can repeat the position assignment many times. This ensures that the scan lines will be generated and captured in an image.

Referring to FIG. 9, in step 832 the sync function 208 will return a sync time value to the engine process of FIG. 4. This time value will be used by the data gathering process to collect the N fields of scan line information. Referring again to FIG. 4, the CPU 148, after the sync function call in step 318, can now proceed in step 320 to collect the N frames of scan information. Each of the N frames will contain laser data collected either by the single line or multiple line generating technique of the present invention. To process these frames, the CPU 148 in step 320 calls the data gathering process 210 (of FIG. 3). As will be described below, the data gathering process 210 works to collect the laser data points in each frame that has come to locations in the memory buffer 303 via DMA transfer.

vi. Data Gathering Process

The data gathering process 210, compresses the frame information (reducing the data only to laser intensity points), and computes the laser points to subpixel accuracy. The output of the data gathering process is a set of x,y pixel point matrices, one matrix for each set of data points corresponding to a given laser stripe with the x,y points computed to subpixel accuracy. The data gathering process 210 also associates each x,y pixel point to the specific voltage assignment which generated the laser stripe and created that point.

Figure 11:
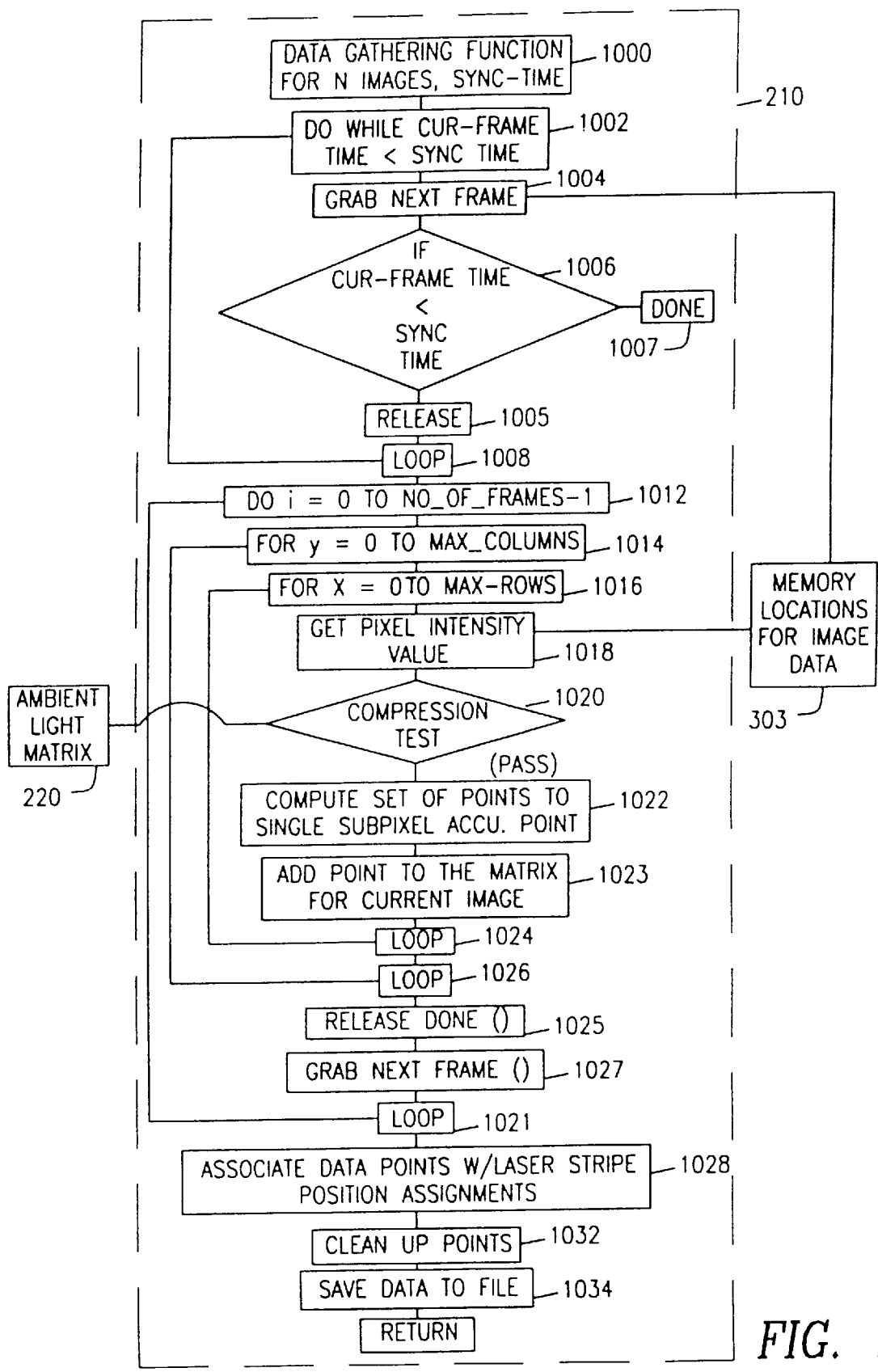
FIG. 11 Depicts an exemplary control flow for the data gathering process of the present invention.

FIG. 11 depicts the control flow of an exemplary data gathering process 210. In steps 1002 to 1008 the CPU 148 loops to locate the first frame of laser position information after synchronization. In step 1002 the CPU 148 begins the loop to grab the incoming frames and compare their time stamp values to the sync time. In step 1004 the CPU 148 grabs the next frame from a location in the memory buffer 303. In step 1006, if the time stamp of that frame is not greater than the sync time, the CPU .148 in step 1008 will loop and disregard the values. Because the field image was not received after the time of synchronization, its position in memory is released in step 1005 and in step 1008 the CPU 148 loops to step 1002 until a post-sync field is obtained. Once the first synchronized field is found the CPU 148 can move to step 1012 to grab the N images and process the pixel values.

Step 1012 begins a loop stepping through each collected field or frame. Step 1014 begins a second processing loop for the specific frame or field of information. For each y value (each horizontal pixel line in the frame or field), step 1014, and for each x value, step 1016, the CPU 148 begins data compression to find a set of laser intensity values and then reduces those values to a single location point computed to subpixel accuracy. In step 1018 the CPU 148 obtains the pixel to analyze it and in step 1020 the CPU 148 applies the test to compress the data. The invention provides a scheme to rapidly read each pixel value in each frame of information and determine whether a given pixel contains an intensity value created from laser reflection. If the pixel can be identified as containing laser intensity information, then the invention provides that the pixel signals the beginning of a set of laser intensity pixel points, (i.e., points containing laser information from a scan line). Those points will be refined to a single data point computed to subpixel accuracy. If the pixel does not contain laser information, it will be disregarded.

The present invention provides that a number of tests can be applied to determine whether a given pixel point contains laser intensity information, such as for example thresholding tests, largest gradient tests, window averaging tests or Gaussian averaging. In an exemplary embodiment, the threshold analysis identifies laser intensity values by comparing a given x,y coordinate to an intensity threshold value. If the coordinate surpasses the threshold, it contains laser information.

The present invention provides that for a given x,y pixel coordinate, the threshold values can be set based on corresponding x,y values in the ambient light matrix 220. As stated above the CPU 148 in step 314 created an ambient light matrix 220 containing ambient light intensity readings for a matrix of pixel values such as 640×480 matrix (see FIGS. 2,3). The CPU 148 uses those table values as threshold values for each pixel during compression. To decide by thresholding in step 1020 what is a laser data point and what is not, ambient light is subtracted from the point value. Those points having measured intensity readings over that subtracted threshold will pass the comparison test. Once a pixel value passes the test then, the present invention provides that the data gathering function has located a set of laser intensity points. In step 1022 the CPU next calculates to subpixel accuracy the exact location of the laser beam.

As stated above, an image of a laser beam can be three or so pixels wide, but the most intense portion of the beam will be located in only a portion of a pixel. The subpixel accuracy function (step 1022) refines the compressed data points to high accuracy by one of several possible interpolation techniques such as, for example, parabola fitting. In an exemplary embodiment, the present invention uses a technique to determine the center of mass for the group of pixels, based on the intensity values for each of the neighboring data points found on a given screen line.

After locating the location of the most intense laser image, the subpixel accuracy function (step 1022) returns an x location value for the pixel coordinate for the given y, that x position being computed to subpixel accuracy, such as to a fixed point decimal number. In step 1023, that point is written to a dynamically allocated storage matrix and will contain for each image, y pixel values. At each y value, there would be a list of found x pixel location points, the x value computed to subpixel accuracy.

In the scan node 216 (FIG. 3), a set of storage arrays 214 collect data points, one storage array for each camera image (frame or field). In an exemplary embodiment, each storage array is a matrix, y lines long, and in those y values there would be a set of x screen pixel values containing the data points collected by a captured camera frame image. For a single line scan there will be only one x value per y in the matrix. In the multiple line scanning situation there could be many x values associated with a y for a given image. In step 1023 the CPU 148 writes the computed x location value to the appropriate y line entry for the corresponding camera image. In step 1024, the process loops to compress the data and compute the data points to subpixel accuracy. The loop will continue processing in steps 1016 through 1024 until all the x values for a given y screen line are processed. Then the CPU 148 in step 1026 loops to step 1014 to get the next y screen line of information. This process moves by pixel following the steps of 1010 to 1026 until the CPU 148 processes the entire field or frame of information.

The next data gathering process step 1028 provides the step of associating laser stripe position assignments to the collected points. In the laser stripe position association step 1028, the CPU 148 moves to associate specific laser stripe position assignments to each pixel point. As stated above, a line position assignment is necessary by the triangulation technique to generate a three-dimensional X,Y,Z object coordinate for any x,y pixel point. For a single line scan, line position association can be quickly done, because there is only one laser stripe generated per frame. Thus, as each pixel is generated in a given frame (or field), that frame (or field) will have a laser position assignment associated with it. In an embodiment using the galvanometric scanners, that assignment corresponds to a specific angle.

Figure 12:
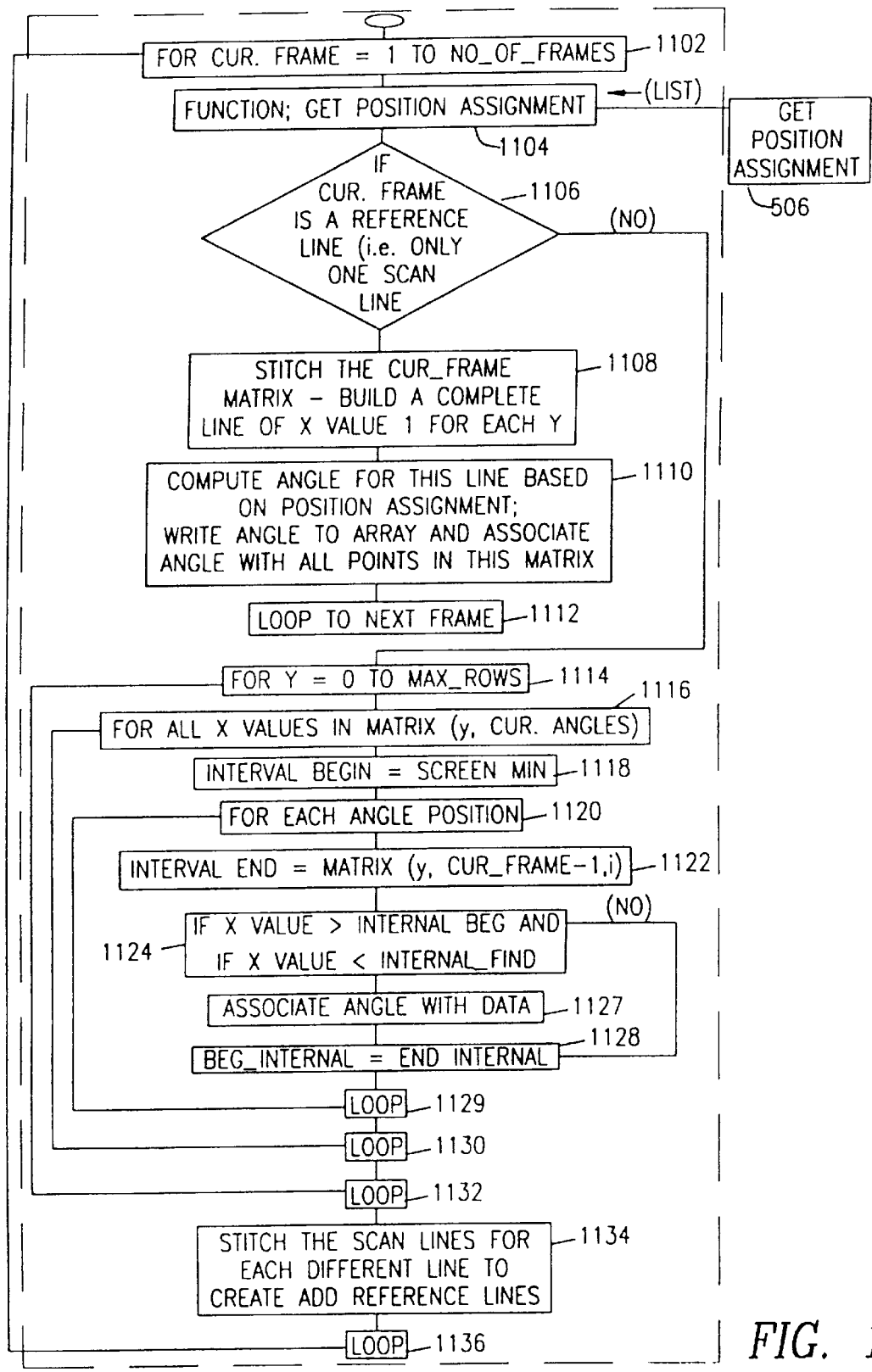
FIG. 12 Depicts an exemplary control flow for the angle association function of the present invention, as configured for multiple line scanning.

For a multiple line scan, the angle position association process is more complex. FIG. 12 depicts the process of angle association in an exemplary embodiment. In step 1102 the CPU 148 begins a processing loop for each frame of laser (x,y) coordinates. In step 1104 the CPU 148 generates again the specific voltage position assignments for this particular frame or field. To do that in this exemplary embodiment, the CPU 148 calls the get assignment function 506 (see FIG. 6) and regenerates a list of angle assignments used in the scan. The get assignment function 506 is the same function used when generating position assignments in the program light position process 202. It will generate the same assignments when called this second time. The first call to the get position assignment function returns the initial reference line. In step 1106 the CPU 148 determines whether the current frame is a reference line frame, and if so, the CPU 148 in step 1108 will use the collected data points from this frame to build the reference line by the process of "stitching". As stated above, the image collector does not collect a full, unbroken line of points from each projected laser stripe. Instead, data collection yields only a set of broker points which describe the contour of the object. In some instances, no x value will exist for a given y value in a scan line, due to noise, errors, etc. If no x value exists for a given y value, the CPU 148 invokes a stitching function to determine by interpolation the missing x,y values. In creating that missing x value at a given y, the CPU 148 interpolates using the x values above and below the given y. These computer generated points are used only for purposes of angle position association. They will not be saved with the set of raw data collected to describe the object. However, temporarily the stitch values are saved in the matrix for the given image. After calculating these x stitch values, the CPU 148 will then in step 1110 associate the laser stripe position assignment of the light plane which generated the reference line to each reference line point and compute the angle (e.g., 188, FIG. 2) associated with that position assignment. After the position assignments are associated to the reference line points, the CPU 148 loops in step 1112 and returns to step 1102 to gather the next frame of information.

In step 1102 the CPU 148 will again invoke the get assignment function to obtain the angle position assignments for this next image. As the next image is not a reference or guide frame, the CPU 148 continues in step 1116 to begin a processing loop to associate the line position with the points generated in a multiple line scanning frame.

The CPU 148 begins by going through the points in the data point matrix for that frame. For each y value (step 1114) the CPU 148 will loop for each x value (step 1116) and attempt to assign a line position by interval. In step 1118 the CPU 148 computes the beginning value of the interval (e.g., in the first case it is the minimum screen position (0)). In step 1120, the CPU 148 starts a loop to run through the possible intervals, comparing the location of the point to determine whether the point falls within a given interval. If the point does fall within the interval, the angle associated with the interval will be assigned to the point.

In step 1120 the CPU 148 begins a loop to find an interval for each one of the laser position assignments obtained by the get position assignment function (e.g., a position assignment starting from the minimum screen position), the CPU 148 computes an interval end for comparison in step 1122. That interval's boundaries for a given y value is determined by the x value of the data point found in the image immediately preceding the image being analyzed. In such an embodiment for any given frame the intervals is:

Interval_beginning  Interval_end = matrix (cur_frame-1, Y, X(n))

If the data point being analyzed falls within that interval, such that for x:

Interval_beginning<analyzed x<Interval_end,

Then, it is concluded that point falls within the interval, and a laser position assignment corresponding to that interval is associated. In step 1124, the CPU 148 determines whether the point falls within the interval. If so, the CPU 148 in step 1127 associates that line position assignment with the specific x,y value. If the point does not lie within the interval, the CPU 148 proceeds to loop to the next interval. In step 1128 the CPU 148 sets the current interval end to be the new interval beginning and then in step 1130 moves to the beginning of the loop in step 1120 to process a new interval and line position assignment. Processing continues in this fashion until each x value for a frame is assigned to an interval and a corresponding line position assignment.

After intervals are assigned, the CPU 148 next processes the data points that have been associated with a given line position assignment to fill in missing points by "stitching" to create new reference lines. In step 1134, the CPU 148 uses stitching to generate a full set of x values to create a new reference for the collected data point associated with a specific laser position assignment for each scan line. Using the x values associated to a given line position assignment, the stitch function will generate temporary x values for the y positions that lack data points. As described above, for a given y the stitch function generates those x values through interpolation of the x values that have the same line position assignment in neighboring y scan lines.

After the data points have been stitched, the CPU 148 in step 1136 loops to step 1114 to process another frame. The CPU 148 continues in this fashion until all the frames have been processed.

After the laser position assignments (and corresponding angles) have been associated to the data points in the collected frames, the CPU 148 again returns, as described above, to step 1028 in the data gathering process 210 (FIG. 11). The CPU 148 returns with a matrix of collected laser stripe data for each image.

The data gathering process 210 in step 1032 invokes a clean up routine. The clean up routine is directed by the observation inherent in 3D spatial relationships that for any given y, the angles and associated laser position assignments for a sequence of x coordinates should increase or decrease as x increases or decreases. Accordingly, the clean up step 1032 of the present invention provides a loop to run through the x,y values making comparisons according to this principle. The clean up step 1032 will remove from the matrices any data point which does not follow the principle. In addition the clean up step 1032 will remove from the matrices all the stitched points used for line position association. The result is a unified set of raw data which will be used in the 3D reconstruction phase to reproduce the object with high accuracy. In the final step of data gathering step 1034, the CPU 148 writes the collected data to a file 218. It saves a set of matrices containing the data points, each matrix containing a set of points associated with a specific laser position assignment and corresponding angle. The matrices as stored do not need to be organized according to the image or camera frame. Instead, they can now be arranged, such as by increasing position assignment. The color matrices for R,G, and B, the ambient light matrix and information used for triangulation are also stored. In writing the data to the file 218, an exemplary embodiment provides a compression/decompression engine 219 to reduce the matrices further for more compact storage. The file 218 can be located in the memory 150, or (if a secondary storage device, such as a hard drive, is attached to the CPU 148) to a location on that secondary storage device.

As the data gathering process 210 completes functioning, the engine's function is also complete and control returns to the controller module 224. The CPU 148 will next invoke post-processing phase processes.

vii. 3D Reconstruction 3D reconstruction is the process of computing a set of three-dimensional X,Y,Z values representing the spatial coordinates for the points on the object 101 for each set of pixel x,y values obtained in data collection. The 3D reconstruction process follows the triangulation method outlined above (see FIG. 2). In the exemplary embodiment using galvanometric scanners, the light position assignments correspond to an angle along the rotational axis of the scanner (e.g., angle theta 188) and using these values the three dimensional X,Y,Z values are determined using the equations set forth above.

viii. Data Simplification

As described above, the 3D reconstruction engine 226 (FIG. 3) further comprises a data simplification process 228 to remove redundant data points and provide significant compression to the set of 3D X,Y,Z coordinates, generally at level of order of magnitude compression for a given data set. As stated above, the process works on each generated set of laser stripe data points for a given line position assignment. As many of the collected point values along the set of y values are similar, the data simplification process creates a revised matrix for the image which eliminates redundant points, while retaining the points necessary for fine detail, such as, for example, removing many points concerning a person's cheek while retaining the detail points of the eyes and head. By eliminating generally similar points and still providing for deep detail, the simplification process provides a data set of comparable multi-resolution. Further, by removing the redundant points according to a tolerance criteria, the invention also provides for differing levels of resolution in the overall quality of the data set. This process reduces the data set substantially and aids in the building of models, such as an adaptive mesh.

The input to the data simplification process 228 is a list of points, such as a set of data points collected from each laser stripe. In each list of points for a given laser stripe position assignment, there are a set of coordinates found with sub-pixel accuracy by the data gathering process 210 described above and then generated to a 3D X,Y,Z point through 3D reconstruction. Each list of points taken for simplification are the 3D X,Y,Z values, ordered in Y, such as the points from the top to the bottom of the laser stripe.

The output of the data simplification process 228 is a revised matrix for a given laser stripe, each list having redundant points dropped, according to a tolerance criteria. The tolerance criteria is any discrimination technique that removes redundant points. The tolerance criteria can vary. In an exemplary embodiment, one tolerance criteria requires that a straight line be drawn between two end points of a line and that the points that fall within a certain distance to that straight line be removed. In addition, a further criteria in an exemplary embodiment requires that the length of this straight line not exceed some average distance between the points of the adjacent scan lines.

Figure 13:
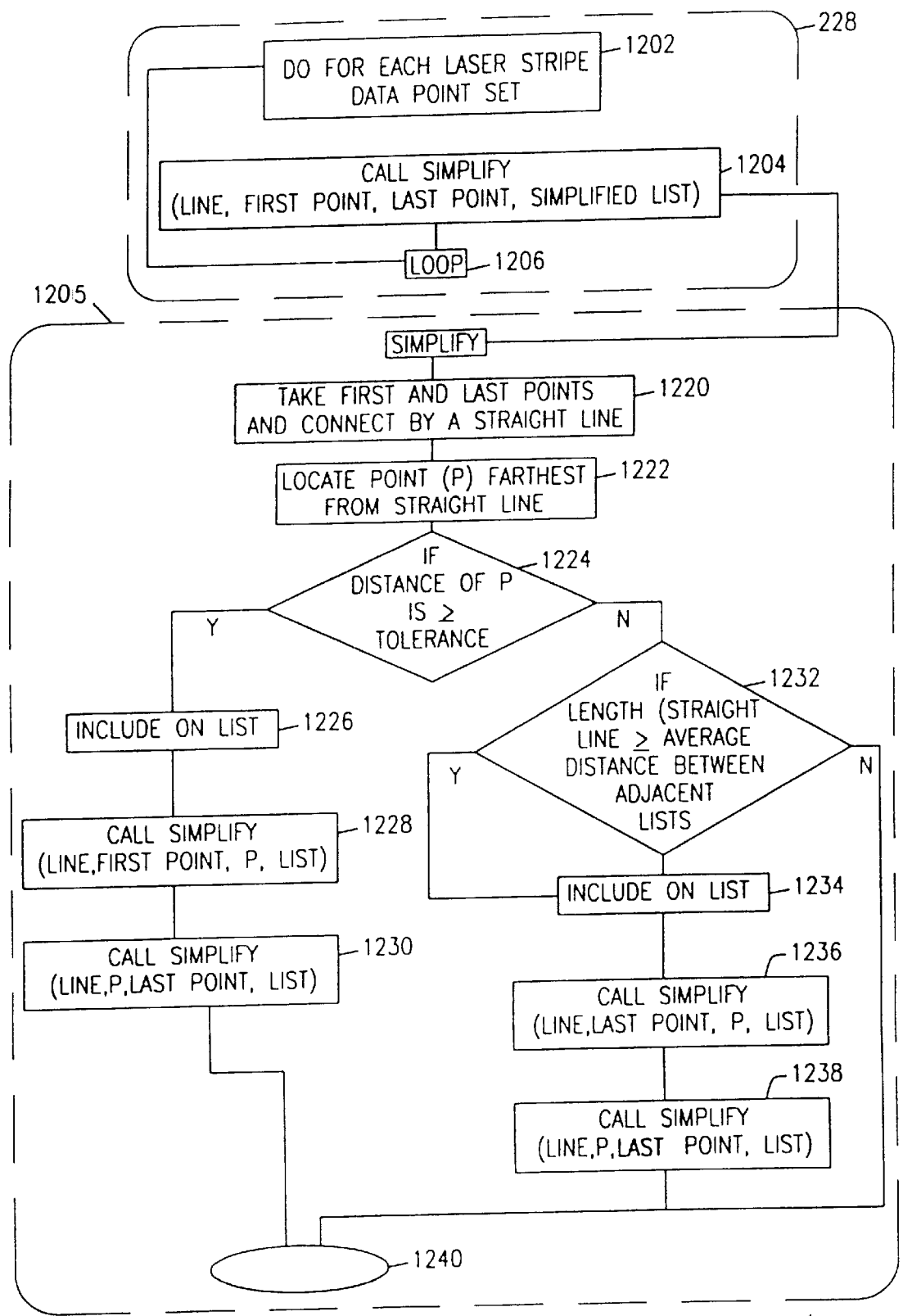
FIG. 13 Depicts an exemplary control flow for the data simplification process of the present invention.

FIG. 13 depicts an exemplary process for the data simplification process 228 of the present invention. In step 1202 the CPU 148 begins to process each laser stripe data point set. In step 1204 the CPU 148 calls a simplify function 1205, sending the first and last data point values along the laser stripe, the location of the matrix for the set of points for current laser stripe and a revised matrix to fill with the output of the simplification process. In step 1206 the CPU 148 returns to step 1202 until all laser stripe sets have been processed.

FIG. 13 also depicts an exemplary process flow of the simplify function 1205. In step 1220, the CPU 148 proceeds to take the first (F) and last (L) point of the laser stripe data point set, connecting them by a straight line, and, in step 1222, the CPU 148 proceeds to examine all the found points between first and last to determine, by direct calculation, which point (P) is the farthest point from the line. In step 1224, the CPU 148 makes a determination step, based on the predetermined tolerance criteria. In the exemplary embodiment, the tolerance criteria is a predetermined numeric value. If, in step 1224, the point P is far enough away from the straight line that it exceeds the tolerance criteria, then in step 1226 the point P is placed in the output list matrix. Then, in the exemplary embodiment, the CPU 148 calls the same simplify function 1205, recursively applying the function in steps 1228 and 1230 to both emerging parts of the data set (F . . . P) and (P . . . L) of the original input list.

In step 1224, if the point P does not surpass the tolerance criteria, it is deemed to be a redundant point. In a second test of the exemplary embodiment, the CPU 148 in step 1232 applies the additional criteria that the length of the straight line not exceed the average distance between the current set of points and the set of points associated with the next adjacent laser stripe position assignment. If the length of the line from first (F) to last (L) is longer than the average distance between the current and adjacent sets of points in step 1232, the CPU 148 places the point P in the output list matrix (step 1234) and in steps 1236 and 1238 again recursively calls the simplify function 1205 to process the parts of the scan line (F . . . P) and (P . . . L). If the length of the line from first to last is within the tolerance criterion, then the point being analyzed is considered to be a redundant point and excluded from the output list. After the recursive calls (either 1228 and 1230 or 1236 and 1238), the CPU returns the list in step 1240 to the calling function. When the list is fully processed the return in step 1240 will bring the CPU 148 to step 1204 of the data simplification process 228. The processing will continue until the CPU 148 has processed all the laser stripe data point sets.

The data simplification process 228 provides the removal of redundant points within the tolerance with the only computation involved being the computation of square of the distance between the point and the straight line. Following the data simplification process 228 the present invention can remove redundant points in areas such as the cheek of a human face but, at the same time, keep the points of detailed areas, such as eyebrows, nose, lips etc. Thus, the data simplification process provides a data set of multi-resolution quality.

ix. Mesh Generation Process

Once the redundant points are removed from the data set, the 3D reconstruction process of the present invention enables a model to be generated from the simplified data set, such as an adaptive mesh.

Figure 14:
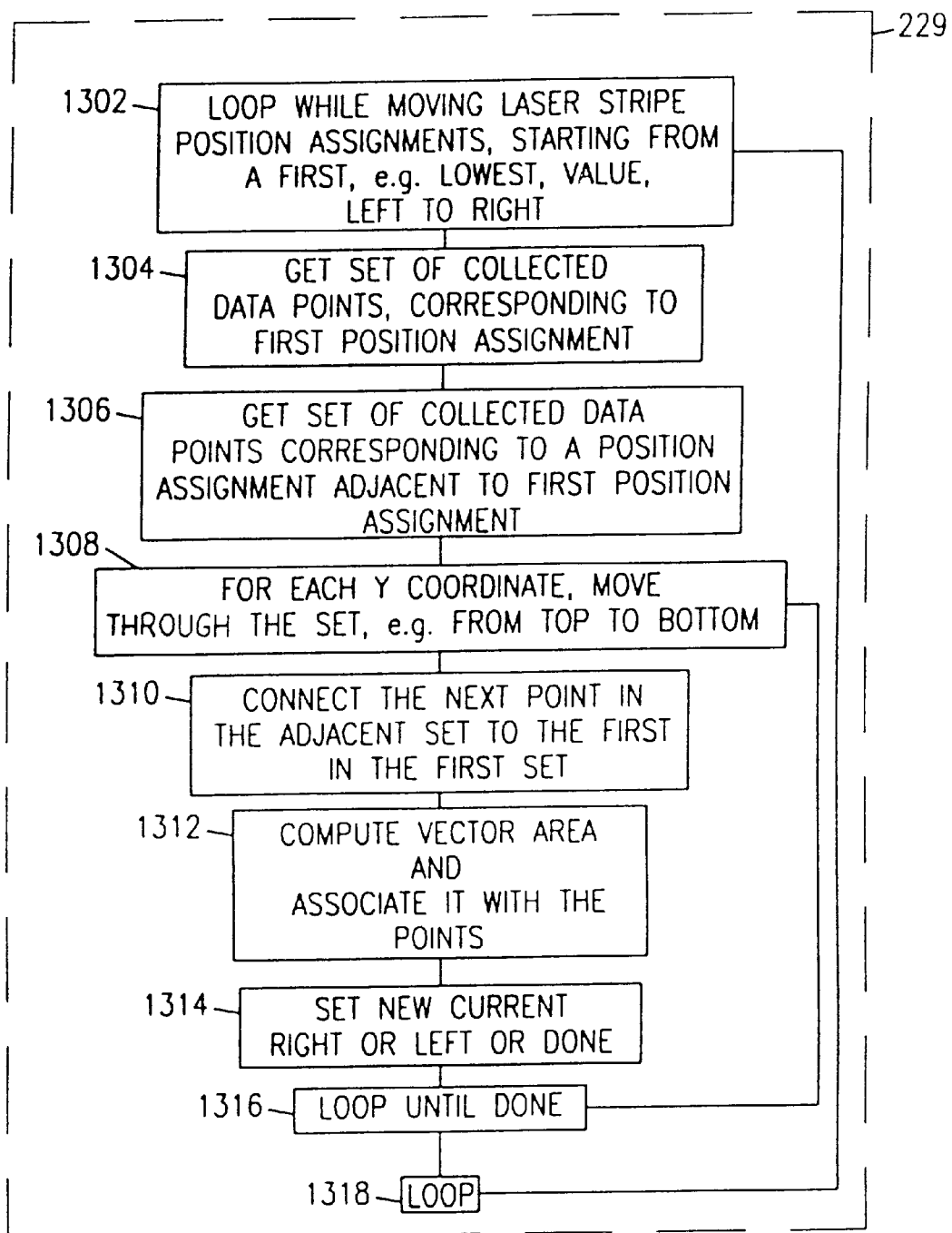
FIG. 14 Depicts an exemplary control flow for the mesh generation process of the present invention.

FIG. 14 depicts an exemplary process flow for the mesh generation process 229 of the present invention. The process begins by examining two adjacent laser stripe data point sets, a left laser stripe data point set and a right laser stripe data point set. In step 1302 the CPU 148 begins a loop to locate and process the left laser stripe data point set associated with the position assignments. In step 1304 the CPU 148 obtains the left laser stripe data set. In step 1306, the CPU 148 obtains the right, adjacent laser stripe data point set. In step 1308, the CPU 148 begins a loop to sweep through the Y coordinates starting, e.g., from the top of the two laser stripe data point sets (left and right) and working through to the bottom of the two lists. In this exemplary loop the CPU 148 creates triangles for the geometric meshing shape. In the exemplary embodiment described in FIG. 14, the CPU 148 in step 1306 creates triangles by examining four points (current-left, next-left, current-right, next-right) and using the following parameter: connect the next point in the left list to the current point in the right list or vice versa, depending upon the value of the Y coordinates of the four points examined. The decision is made in step 1310 such that the CPU 148 will first process the points where X values are the largest (i.e., closest to the top of the screen). In the exemplary embodiment, if the Y value for the next-left is greater than the next-right, the CPU 148 forms the triangle, current-left, next-left, current-right. Otherwise, it forms the triangle current-left, next-right, current-right.

In step 1312, the CPU 148 computes the vector areas of this triangle. As each laser stripe data set is stored in a matrix, each matrix is comprised of an additional location for each data point to store that vector area information. At the end of the complete algorithm, these locations will accumulate the total vector areas of the set of triangles, surrounding every point. These total vector areas, after the normalization to the unit vectors, are useful as they can be employed as the normal vectors in computer graphics shading algorithms.

Depending on which next point was used to complete the triangle, the CPU 148 will move in step 1314 to set the current value to be that next value, for example, if the triangle found was current-left, next-left and current-left, the CPU 148 in step 1314 will set current-left to now be the next-left. In step 1316 the CPU 148 loops to step 1308 to continue creating triangles within the two adjacent lists. In step 1314, when the CPU has reached the bottom of the list it will stop the triangulating process for the current laser stripe data point sets in step 1316 and loop in step 1318 to get a new set of adjacent scan lines in step 1302. When the list of scan lines is exhausted, the CPU 148 returns to the 3D reconstruction engine, having created a triangulated mesh covering the whole data set (with redundant points skipped).

In an alternative exemplary embodiment the present invention provides that a mixed mesh, comprised of triangles and quadrangles. To this end, the mesh generator 229 would be comprised to sometimes connect both the Next-Left and Next-Right points in addition to the CurrentLeft, Next-Right and Next-Left, CurrentRight.

This decision could be made based on the smoothness of the set of two adjacent triangles as compared to the bilinearly interpolated quadrangle, which quadrangle arises as a result of elimination the common side of these two adjacent triangles. As a smoothness criteria the present invention provides that it is possible to use the angle between normals of these two triangles: if this angle is small enough, the two triangles are chosen, otherwise, the common side is eliminated to produce a quadrangle.

In the exemplary embodiment, the mesh generating process is invoked after the collection of laser stripe data. As discussed above, the raw laser stripe data is stored in a file and never altered after it is collected, so that in 3D reconstruction it is possible to vary the tolerance criteria in the data simplification process and thus, vary the refinement of the subsequent mesh in the mesh generation process 229. This separation of raw data and separate subsequent mesh generation has distinct advantages. For example, the file could be sent by e-mail or transferred otherwise over a network of raw data. The mesh could be generated by a recipient at some later time and generated according to the tolerance criteria needed. A high quality mesh model might be required in a medical application, while a lower quality model would be sufficient and for the purpose of a computer animation project. The same set of data could be used for both purposes, with the mesh generating process of the present invention.

x. Data Use Phase Processing

In the data use phase, the present invention presents processes to use the collected data, such as for example to display a graphic image of the object on the computer. For example, the present invention provides a display module 232 which creates a full picture of the object. In displaying the image of the 3D object (or reproducing it), the computer invokes a procedure to "stitch" missing data points, using information from the known points. As the X,Y,Z coordinates represent only those refined points which were collected from laser scanning, there are points between the scan points that must be determined in order to create a realistic display. The "stitch" function provides those many data points, using an interpolation scheme. Other embodiments could also include a shaded and textured rendering process 236 and an animating renderer 234.

The system continues as described above, the controller can be reset in the data collection phase to scan, collect data by the single or multiple line scanning method of the present invention, compute the three dimensional X,Y,Z coordinates of the object in the 3D reconstruction phase and manipulate these data points, such as by displaying the graphic image, in the data use phase. The controller again uses the engine 200, 3D reconstruction engine 226 and the data engine 230 as described above.

xi. Calibration

As the invention presents a system for triangulation as depicted in FIG. 2, the present invention provides for the setting of initial scanning parameters through a calibration procedure described above. In calibrating the set of vectors n for every angle theta (e.g., 188) provide the only unknown quantities in the formulas set forth above. The present invention provides that all of those unknowns can be determined empirically in an auto calibration procedure. There is a standard vector (the initial plane 3D vector) $n_0$, corresponding to the zero angle (theta=0). The general vector is obtained from this standard vector by means of the rotation by the angle theta around the axis of the scanning motor.

For the calibration, the present invention provides calibration by scanning a flat reference surface (e.g., a wall covered by a white sheet of paper). This gives a collection of reference (x,y) points which the controller transforms to 3D coordinates by means of above formulas. There are the following unknowns:

z—the focal distance, (one parameter)

n0—the initial plane 3D vector (three parameters), nu—the unit 3D vector of the motor rotation axis (two unknown parameters).

The autocalibration function of the present invention finds these six unknowns by fitting the resulting collection of the 3D points into the plane equation $$(m.r)=1.$$

Namely, the calibration function obtains the above mentioned six unknown parameters together with the three parameters (mx,my,mz) by minimizing the target function $$F=Sum\{((m.r)-1)2\}$$

where the sum goes over all the 3D points obtained in the scanning process.

D. Alternative Embodiments

In addition, the present invention can be embodied in alternative configurations of hardware and software elements.

In one alternative embodiment it is possible that the present invention be implemented in a two computer platform embodiment to provide additional flexibility and portability.

As the present invention provides a system for data collection which requires minimal data storage requirements and requires few hardware connections between the camera and scanning device in an alternative embodiment. The present invention could be implemented such that the 3D data can be collected using a first computer with relatively low end capabilities and later manipulated or used on a second computer with higher capabilities. The data collection process of the present invention provides compacted data format which allows it to be easily transferred on a disk or over a communications or other network system, such as the Internet. As typically, graphic manipulation routines require more massive computing capabilities, it is possible by the system of the present invention to separate the environment of the data gathering function from the 3D reconstruction function to allow for a portable data collection system that can interface with higher computing power as needed.

Figure 15A:
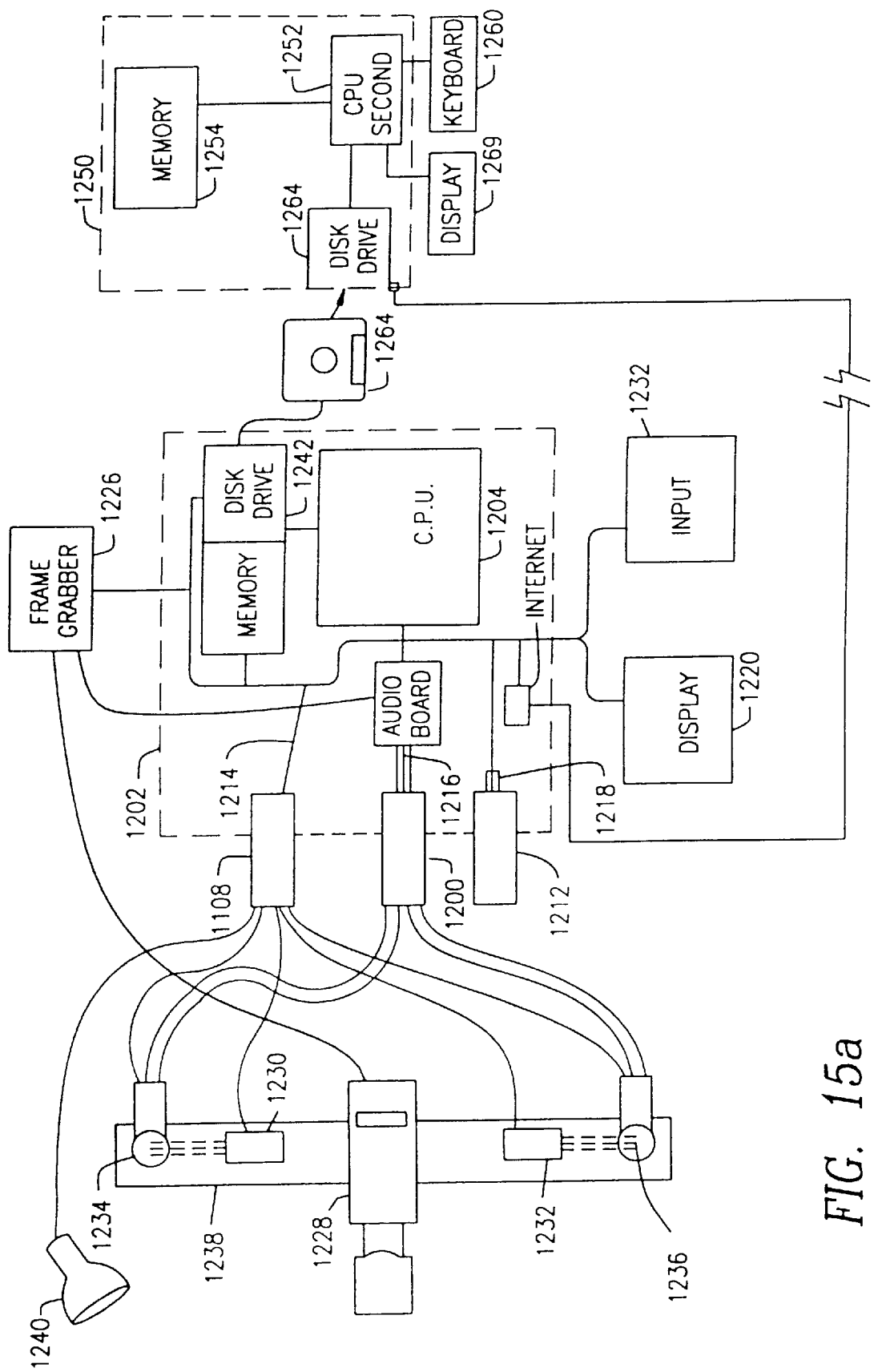
FIG. 15a Depicts an alternative, exemplary two processor configuration for the present invention.

FIG. 15a depicts the system of the present invention, configured in a multiple hardware environment system. The system comprises a first computer 1402, comprised as the controller 104 of FIG. 1. Comprised as such it has a first CPU 1404 which is coupled to a first memory 1406. The first CPU 1404 is further coupled to a plurality of scanner ports (1408, 1410, 1412), each port being an external connector on the first computer and used to couple the first computer 1402 to a peripheral device, each port being coupled to the first computer by a plurality of channels 1414, 1416, 1418. In an exemplary embodiment there is a video1 port (port 1412), an audio2 port (port 1410), and a parallel3 port (1408). In addition, the first CPU 1406 is coupled to a first display device 1420, such as a monitor, and a first input device 1422, such as a keyboard. The first CPU 1406 functions and controls the hardware elements by virtue of an operating system (which is incorporated within the first CPU 1406) and the further programmed elements described above. The first CPU 1406 further comprises and is coupled to a first clock device 1424, which accurately marks time. In an exemplary embodiment, a commercially available computer, such as the "PowerPC" brand computer sold by the Apple Computer Company or it would be possible to employ as the first computer a laptop computer with a small computer system interface, SCSI interface. Additionally, a laptop with an attached frame grabber 173 1426, coupled to the CPU would be suitable, such as an IBM ThinkPad, PC P5-133, constructed with a PCMCIA slotbin and capable of being connected to a frame grabber 173, such as the I/O magic-focus card manufactured by Quadrant International.

In addition, the first computer is coupled to a data collection device 1428, such as a CCD camera as described above. The first CPU 1404 will be coupled to the camera via the video1 port (i.e., first port 1412). One or a plurality of light generators 1430, 1432, such as the diode laser stripe generators described above are coupled to the computer via channels in the parallel1 port 1488. One or a plurality of light position devices 1434, 1436 are coupled to the computer using channels of the audio1 port 1410. The location and placement of the light generators and light position devices are as set forth according to their placement on a frame 1438. Further, there is a light source 1440 coupled to the CPU via the parallel1 port 1408. As configured, the first computer is comprised to collect data, generate a set of data points, save those data points to a file, reconstruct the data points and use the data points as described above in reference to the system depicted in FIGS. 1–14.

However, in the multiple platform configuration, the first computer 1402 is further comprised of a portable storage device 1442, such as a disk drive, which is coupled to the first CPU 1404. The first CPU 1404 is further coupled to a telecommunications transmission device 1444, such as an internet card protocol, which is, in turn, coupled to a telecommunications system.

A second computer 1450 is also coupled to the telecommunications system. The second computer 1450 is comprised of a second CPU 1452 which is coupled to a memory 1454 and a second telecommunications device 1458, such as an internet card protocol. The second CPU 1452 is configured with an operating system such that it can communicate with the telecommunications system 1444 to receive and output data. The second CPU 1452 is further coupled to a second input device 1460, such as a keyboard and a second display device 1462, such as a monitor. The second computer 1450 is further coupled to a storage device 1464 such as a disk drive such that it can send and write information formatted by the first computer 1402. In an exemplary embodiment, the second computer 1450 could be a "high end" graphics workstation, such as the computer, manufactured by the Silicon Graphics Company and known as the "Indigo2".

In such an exemplary embodiment, the second computer 1450 also comprises the programmed elements of the present system, in particular, the controller 224, 3D reconstruction engine 226 and the data use engine 230. In addition, the second computer comprises as additional programmed elements a set of "high end" graphic interface modules.

In function, the system of the present invention with the first computer 1402 works as the controller 104 described above. The controller 104 scans the object, collects the data, and saves it into a file (such as described above). At that point the first computer 1402 can save that file to a disk or output that file via the telecommunications system 1444 to the second computer 1450. The resulting file of data can be saved to a disk 1464 via the storage device 1442. The disk can be taken manually to the second computer 1450 and loaded into the second storage device 1464. At the second computer, the second CPU 152 can read the data file, and perform the processes of 3D reconstruction or data use as described above. Additionally, the second computer 1450 can be set to invoke the set of "high end" graphics or other manipulations by reading the file.

Figure 15B:
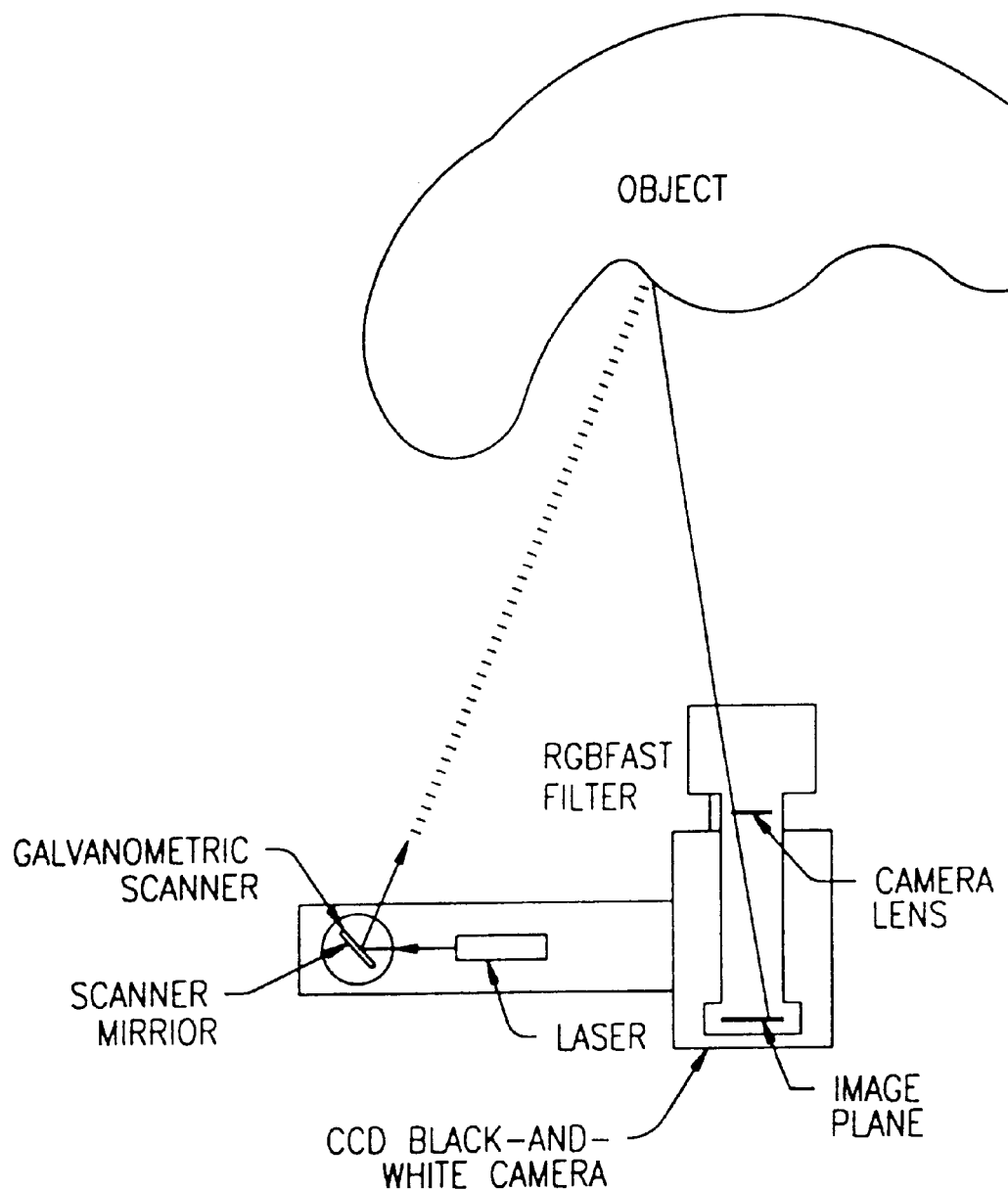
FIG. 15b Depicts an alternative, exemplary embodiment of the present invention, employing one light generator and one light positioner.
Figure 15C:
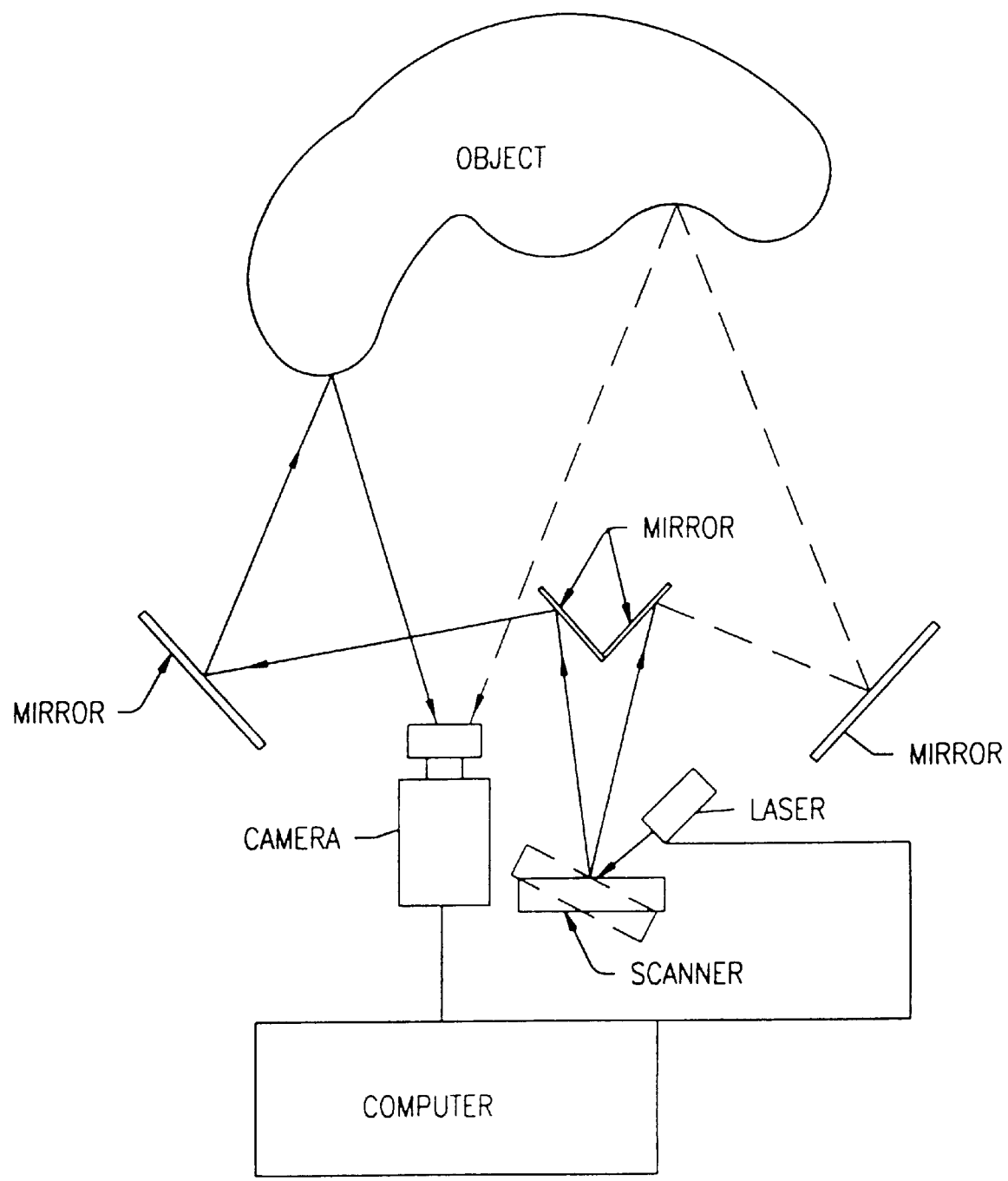
FIG. 15c Depicts an alternative, exemplary embodiment of the present invention, employing one light generator and multiple light positioners.

In addition to the multiple computer configuration of FIG. 15*a*, several different geometries are utilized for the various preferred embodiments of the present invention. Referring to FIG. 15*b*, the simplest configuration uses one image collector 118 and one positioner 106. Another preferred embodiment depicted in FIG. 15*c* utilizes one camera and one laser beam generator, but the laser beam is split into two by a system of mirrors, so that one laser image appears from the right side of the camera, while another one appears from the left side of the camera. The exemplary embodiment depicted in FIG. 1 has one camera in the middle of the system and two galvanometric scanners and lasers on the sides. The advantages of this configuration are smaller size and faster scanning for multi-line scanning protocol.

Figure 15D:
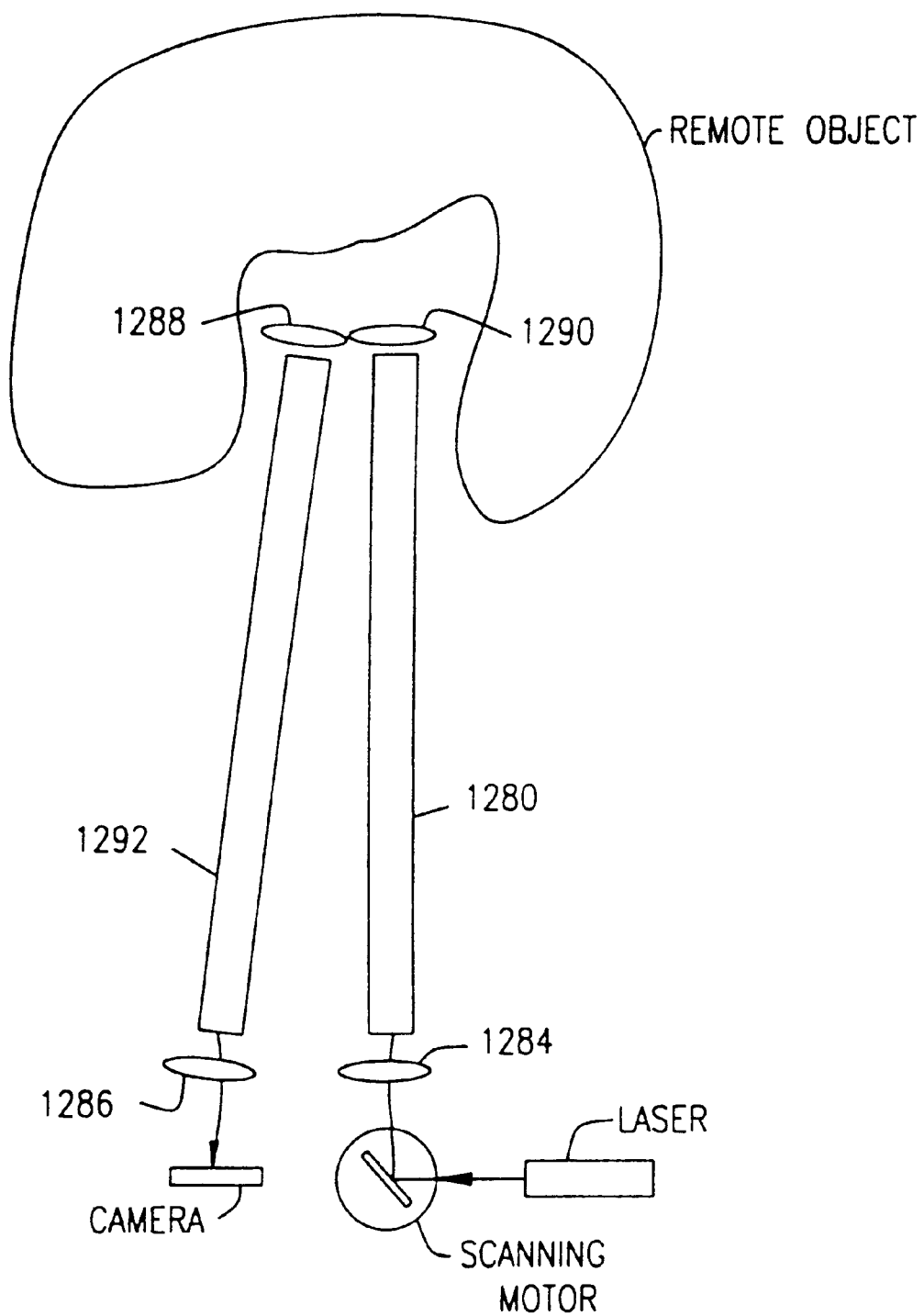
FIG. 15d Depicts an alternative, exemplary embodiment of the scanning system of the present invention, configured for scanning small objects.

FIG. 15*d* depicts yet another preferred embodiment of the present invention that is particularly adapted for scanning small objects in enclosed areas, such as teeth. The hardware configuration is substantially similar to the configuration shown above with the addition of a pair of boroscopes or fiberscopes 1480, 1482 and corresponding focusing lenses 1484, 1486, 1488, 1490 located at both ends of the boroscopes.

The invention continues as described above. The above described embodiment of the invention is meant to be representative only, as certain changes may be made therein without departing from the clear teachings of the invention. Accordingly, reference should be made to the following claims which alone define the invention.

We claim:

1. A system for measuring 3-D shape of an object by determining 3D X,Y,Z coordinates for the object, which comprises:

a light source for outputting a beam of light;

a light positioning device positioned relative to said light source for directing said beam of light toward said object, said light positioning device having variable orientation so as to direct said beam of light to a plurality of discernable positions about said object, said light positioning device further accepting as input signals to direct said light positioning device to achieve specific orientations;

an image capturing device for capturing a series of single frame images of information describing in 2-dimensional coordinates the location of a contour of said beam of light as reflected from said object and outputting said single frame images, each single frame image being captured in a predetermined image-capturing time period, said image capturing device being positioned at a location along a first line to said object for capturing direct views of said object and said single frame images of said beam of light as reflected from said object, wherein said light positioning device is positioned at a known distance from said image capturing device along a second line extending between said light positioning device and said image capturing device, said second line extending at a known angle from said first line and with the said beam of light from the said light positioning device forming an angle in relation to the first line at each of the variable orientations for use in triangulation;

a computer processor coupled to a memory, an input, and an output, said output being coupled to said image capturing device and said light positioning device, said input being coupled to said image capturing device, said computer processor outputting said signals to said light positioning device to control the orientation of said light positioning device so as to direct said beam of light from said light source to said plurality of discernable positions about said object within said image-capturing time period, said computer processor further outputting a signal to command said image capturing device to capture said series of single frame images of said beam of light as reflected from said object, the light positioning device further arranged to position the beam of light at a first location on the object and the image capturing device capturing a first image of the object with the light bream reflecting from said first location on the object;

the light positioning device further arranged to direct the beam of light so as to position the beam of light in a plurality of additional locations about the object in relation to the first location on the object with the imaging capturing device capturing a second image of the object showing the object with the beam of light reflecting at the plurality of additional locations as having been positioned by movement of the light positioning device during the image-capturing time period; and said computer processor accepting as input from said image capturing device said first and second images of said beams of light as reflected from said object with said computer processor processing the second image to determine the 3-D X,Y,Z coordinates of the reflections of the beams of light on the object based on the relative positions of the image collection device and the light positioning device, said angle of the beam of light from the light positioning device at the time of positioning and the information contained in the second image, with said angle of the beam of light, for use in triangulation, for one of the plurality of additional locations in the second image being identified based on the information concerning the location for the beam of light in the first image.

2. A system for reproducing 3D shape of an object, which comprises:

a light source for outputting a beam of light;

a light positioning device positioned relative to said light source for directing said beam of light toward said object, said light positioning device having variable orientation so as to direct said beam of light to a plurality of discernable positions about said object, said light positioning device further accepting as input signals to direct said light positioning device to achieve specific orientations;

an image capturing device for capturing a series of single frame images of said beam of light as reflected from said object and outputting said single frame images with each single frame image comprising a two-dimensional array of light intensity information, each single frame image being captured in a predetermined image-capturing time period, said image capturing device being positioned at a location along a first line to said object for capturing direct views of said object and said single frame images of said beam of light as reflected from said object, wherein said light positioning device is positioned at a known distance from said image capturing device along a second line extending between said light positioning device and said image capturing device, said second line extending at a known angle from said first line with the beam of light as positioned by the light positioning device having an associated angle based on the relationship between the first line and the second line;

a computer comprised of a processor coupled to a memory, an input, and an output, said output being coupled to said image capturing device and said light positioning device, said input being coupled to said image capturing device, said computer outputting said signals to said light positioning device to control the orientation of said light positioning device so as to direct said beam of light from said light source to said plurality of discernable positions about said object, said computer further outputting a signal to command said image capturing device to capture said series of single frame images of said beam of light as reflected from said object, said computer accepting as input from said image capturing device said single frame images of said light beam as reflected from said object;

wherein the processor outputs a first command signal directing said light positioning device to achieve a chosen orientation enabling the beam of light to be positioned at a first chosen position on said object, whereby said beam of light at said first chosen position divides the surface of said object into a first half and a second half, and wherein said processor accepts as input a first single frame image of said beam of light as it reflected from said first chosen position on said object, and wherein said processor outputs additional signals to direct said light positioning device's orientation such that the beam of light will be directed to a second chosen position in the first half and, based on the third signal, the beam of light will be directed to a third chosen position in the second half, wherein said processor accepts as input a second single frame image of said beam of light as it reflects from said second and third chosen positions on said object; and the processor further arranged to determine a plurality of three-dimensional coordinates representative of a three-dimensional profile of said object based on said signals representative of said detected contour line for each image frame by triangulation, by:
(i) identifying a 2D location coordinate for each signal that describes the reflection of the detected contour line the said first single frame image;
(ii) identifying a 2D location coordinate for the one of the signals that describes one of the reflections of the contour lines in the said second single frame image;
(iii) confirming the associated angle for the said 2D location coordinate in the second frame image by comparing the position of the 2D location coordinate in the said second single frame image to one of the coordinates of the 2D coordinates determined for the first single frame image; and
(iv) calculating a 3D X,Y,Z coordinate for the 2D location coordinate in the second single frame image, based on the associated angle confirmed in (iii) above.

3. A system for reproducing 3-D shape of an object, which comprises:

a light source for outputting a beam of light;

a light positioning device positioned relative to said light source for directing said beam of light toward said object in a plurality of discernable positions about said object, said light positioning device further accepting as input signals to direct said light positioning device to achieve specific orientations;

an image capturing device for capturing a series of single frame images of said beam of light as reflected from said object, each single frame image being captured during a predetermined image-capturing time period, said image capturing device being positioned at a location along a first line to said object for capturing direct views of said object and said single frame images of said beam of light as reflected from said object, wherein said light positioning device is positioned at a known distance from said image capturing device along a second line extending between said light positioning device and said image capturing device, said second line extending at a known angle from said first line with the beam of light as positioned by the light positioning device having an associated angle based on the relationship between the first line and the second line; and a processor coupled to a memory, a timekeeping device, an input, and an output, said output being coupled to said image capturing device and said light positioning device, said input being coupled to said image capturing device, said processor outputting said signals to said light positioning device to control the orientation of said light positioning device so as to direct said beam of light from said light source to said plurality of discernable positions about said object, said processor accepting as input from said image capturing device said single frame images of said beam of light as reflected from said object;

wherein said processor synchronizes operation of said image capturing device to the operation of said light positioning device by:
  i) outputting a signal to command said image capturing device to capture said series of single frame images;
  ii) noting the time first single frame image information arrives at said input of said processor;
  iii) determining when said image capturing device will next capture an image based on said predetermined image-capturing time period and a predetermined output travel time period from said image capturing device to the input of said computer;
  iv) outputting a signal directing said light positioning device to change its orientation so as to direct said beam of light to a first position about said object within the time taken by the image capturing device for capturing a first images;
  v) outputting a signal directing said light positioning device to change its orientation so as to direct said beam of light to a second and a third position on said object within the time taken by the image capturing device for capturing a first image; and
said processor accepting as input from said image capturing device said first and second single frame images of said beam of light as reflected from said object, with said processor processing the second single frame image to determine the 3-D X,Y,Z coordinates of the reflections of the beams of light from the object based on the relative positions of the image capturing device and the light positioning device, the said angle of the beam of light from the light positioning device at the time of positioning and the information contained in the second single frame image, with said associated angle of the beam of light for one of the plurality of positions in the second single frame image being identified based on the information concerning the location information for the beam of light the first image.

4. A system for reproducing 3-D shape of an object, which comprises:
  a light source for outputting a beam of light;
  a light positioning device positioned relative to said light source for directing said beam of light toward said object in a plurality of discernable positions about said object, said light positioning device further accepting as input signals to direct said light positioning device to achieve specific orientations;
  an image capturing device for capturing a series of images of said beam of light as reflected from said object, each image being captured during a predetermined image-capturing time period, said image capturing device being positioned at a location along a first line to said object for capturing direct views of said object and said images of said beam of light as reflected from said object with each image comprising a two-dimensional array of light intensity information, wherein said light positioning device is positioned at a known distance from said image capturing device along a second line extending between said light positioning device and said image capturing device, said second line extending at a known angle from said first line with the beam of light as Positioned by the light positioning device having an associated angle that is determinable from the relationship between the first line and the second line;
  a processor coupled to a memory, a timekeeping device, an input, and an output, said output being coupled to said image capturing device and said light positioning device, said input being coupled to said image capturing device, said processor outputting said signals to said light positioning device to control the orientation of said light positioning device so as to direct said beam of light from said light source to said plurality of discernable locations about said object during said predetermined image-capturing time period, said processor further outputting a signal to command said image capturing device to capture said series of images of said beam of light as reflected from said object, said processor accepting as input from said image capturing device said images of said beam of light as reflected from said object;
  wherein operation of said image capturing device is synchronized to operation of said light positioning device by said processor, the processor:
    i) outputting a first command signal directing said light positioning device to assume a chosen orientation enabling said beam of light to be positioned at a first chosen location on said object at a position having an associated angle of X degrees, where X is a number between 0 and 180 degrees;
    ii) outputting a signal to said image capturing device to direct said image capturing device to capture said series of images;
    iii) accepting as input a first image of the beam of light as reflected from said first chosen location on said object;
    iv) storing the time said first image information arrived at said input of said processor;
    v) determining when said image capturing device will next capture a second image based on the predetermined image-capturing time period and a predetermined output travel time period from said image capturing device to said input of said computer; and
    vi) outputting a second and third command signal to direct said light positioning device's orientation during time period when said image capturing device captures said second image such that the light positioning is arranged to position said beam of light at two locations, each location having associated angles that are smaller than and greater than the associated angle for the stripe of light at the first location, wherein the angle associated with the stripe of light in the second location having R degrees, where R is a number which is D degrees smaller than the angle X associated with first light location such that R=X−D, and the angle associated with the stripe of light in the third location having X+D degrees signal, the beam of light will be directed to a;
    vii) accepting as input a second image of the beam of light as reflected from said second and third chosen locations on said object; and
  said processor further arranged to process the second image to determine the 3-D X,Y,Z coordinates of the reflections of the beams of light on the object based on the relative positions of the image capturing device and the light positioning device, the said angle of the beam of light from the light positioning device at the time of positioning and the information contained in the second image, with said angle of the beam of light for one of the plurality of positions in the second image being identified based on the information concerning the location information for the beam of light the first image.

5. An apparatus for measuring 3-dimensional contour of an object, said apparatus comprising:

a light-source unit for projecting a stripe of light onto said object and creating a luminous contour line at an intersection of said stripe of light and said object, said light-source unit being adapted to rapidly reposition said stripe of light relative to said object to create a plurality of luminous contour lines depicting the contours of the surface of the object;

an image-detecting device trained on the object along a line of focus for detecting said plurality of luminous contour lines in an image frame with each image frame comprising a two-dimensional array of light intensity information and with each image frame having first and second boundaries along a Y axis, said image-detecting device producing signals representative of two-dimensional coordinates of the detected contour lines for each image frame;

the light-source unit further arranged in relation to the image-detecting device at a known distance along a second line extending between said light-source unit and said image-detecting device, with the light-source unit projecting the stripe of light in each position following a line that is associated with an angle, the associated angle being determinable from the relationship between the first line and the second line;

a processor arranged to output signals to the light-source unit to control the positioning of the stripe of light about the object and synchronize the movement of the light-source unit with the capturing of images by the image-detecting device;

the light-source unit further arranged to position said stripe of light at a location on said object at a position having an associated angle of X degrees, where X is a number between 0 and 180 degrees, for the position such that said image-detecting device records an image of the stripe of light reflected from the said luminous contour line positioned on said object in a zero-th image frame within the sequence of image frames;

wherein said light-source unit is further arranged to position said stripe of light at a plurality of additional locations on said object such that in the next frame the light-source unit positions the stripe of light in a plurality of locations during the time of image capture following the rule that the light-source unit positions the light in at least two positions for each positioning of the stripe of beam that occurred in the previous frame and also positions the beam in the next frame such that one of the two positions in each rule positioning combination has an associated angle that is less than the angle associated for one of the positions in the previous frame and one of the at least two positions in the rule positioning combination has an associated angle that is greater than the associated angle for the one of the positions of the previous frame in question with said additional plurality of positionings being recorded in an image frame that is the next image frame within the sequence of images;

said image-detecting device is further arranged to output 2n−1 contour lines following the rule above for up to n image frames and record in such (n)th image frame the reflection of 2n−1 contour lines on said object, each of which is positioned on said object between a first contour line recorded in an (n−1)th image frame and one of a second contour line recorded in the (n−1)th image frame; and the processor further comprised to calculate a 3D location coordinate for a signal that describes the reflection of a contour line in the nth image frame based on the angle associated with the contour line that created that signal, with the angle associated for that contour line in the nth image frame being confirmed by contour line image position information in the (n−1)th image frame.

6. The apparatus according to claim 6 further comprising:

the light-source unit is further arranged to position, in the time of image capture for the (n+1)th image frame, the stripe of light in the same number of positions as was output in the nth image frame, where each stripe of light for the (n+1)th image is shifted from its position in the nth frame by a predetermined number of degrees; and the processor further comprised to calculate a 3D location coordinate for a signal that describes the reflection of a contour line in the (n+1)th image frame based on the angle associated with the positioned contour line that created the signal, with the angle associated for that contour line in the (n+1)th image frame being confirmed by the contour line image information in the nth image frame.

7. The apparatus according to claim 5, wherein depth component of each of said three-dimensional coordinates is calculable by triangulation based on said associated angle of approach of said stripe of light from said light-source unit onto said object.

8. The apparatus according to claim 5 wherein said processor synchronizes said image-detecting device with said light-source unit.

9. The apparatus according to claim 8 wherein said data processing apparatus synchronizes said image-detecting device with said light-source unit based on time of receipt at the data-processing apparatus of signals representative of a reference image frame.

10. The apparatus according to claim 5 wherein n is an integer, and wherein each image frame in a second sequence of image frames beginning with a predetermined image frame of said first sequence of image frames has uniform number of contour lines.

11. The apparatus according to claim 5, further comprising:

a first light guide having a first end optically coupled to said light-source unit and a second end terminating near the vicinity of said object, said first light guide guiding said stripe of light onto said object;

a second light guide having a first end optically coupled to said image-detecting device and a second end terminating near the vicinity of said object, said second light guide extending substantially parallel to said first light guide, said second light guide guiding reflected light, corresponding to said contour lines detected in each image frame, from said object to said image-detecting device; and a data processing apparatus coupled to said image-detecting device for calculating, for each detected contour line, a plurality of three-dimensional coordinates representing a portion of said three-dimensional contour of said object;

wherein said second end of said second light guide is positioned at a known distance from said second end of said first light guide, and wherein depth component of each of said three-dimensional coordinates is calculable by triangulation based on angle of approach of said stripe of light from said second end of said first light guide onto said object and said signals representative of two-dimensional coordinates of the detected contour line produced by said image-detecting device.

12. An apparatus for measuring 3-dimensional contour of an object, said apparatus comprising:

a light-source unit for projecting a stripe of light onto said object and creating a luminous contour line at an intersection of said stripe of light and said object, said light-source unit being adapted to rapidly reposition said stripe of light relative to said object to create project a plurality of luminous contour lines on to the object;

an image-detecting device trained on the object along a line of focus for capturing a series of images of said plurality of luminous contour lines positioned on the object, said image-detecting device producing two-dimensional images of the luminous contour lines reflecting from the object, the images each comprising a two-dimensional array of signals that describe the detected light for each luminous contour line that appears in each image frame;

the light-source unit further arranged to project said stripe of light in various positions with the stripe of light in each position following a line that is associated with an angle equivalent to the angle formed by the intersection of the stripe of light and the line of focus;

a computer processor arranged to output signals to the light-source unit to control the positioning of the stripe of light about the object and synchronize the beginning of the movement of the light-source unit with the capturing of images by the image-detecting device;

wherein said computer processor outputs a signal to the light-source unit to positions said stripe of light at a locations on said object such that said image-detecting device detects an image frame which is the (n−1)th image frame of a sequence of image frames and records an image of the stripe of light reflected from the said luminous contour lines positioned on said object, and said computer processor outputs a second signal to the light-source unit to position said stripe of light at a location that is relative to the first position and the reflection of the contour line being recorded in an image frame that is the nth image frame of the sequence; and wherein the computer processor is further arranged to calculate a 3D X,Y,Z coordinate for a signal in the (n)th image that describes the reflection of a positioned contour line based on the angle associated with the positioned contour line, with the angle associated being confirmed by the contour line image information of the n−1)th frame.

13. The apparatus according to claim 12 wherein said computer processor synchronizes said image-detecting device with said light-source unit.

14. The apparatus according to claim 13 wherein said computer processor synchronizes said image-detecting device with said light-source unit based the data processing apparatus receipt of signals representative of the image-detecting device's capture of an image frame.

15. The apparatus according to claim 12, further comprising:

a first light guide having a first end optically coupled to said light-source unit and a second end terminating near the vicinity of said object, said first light guide guiding said stripe of light onto said object;

a second light guide having a first end optically coupled to said image-detecting device and a second end terminating near the vicinity of said object, said second light guide extending substantially parallel to said first light guide, said second light guide guiding reflected light, corresponding to said contour lines detected in each image frame, from said object to said image-detecting device; and a data processing apparatus coupled to said image-detecting device for calculating, for each detected contour line, a plurality of three-dimensional coordinates representing a portion of said three-dimensional contour of said object;

wherein said second end of said second light guide is positioned at a known distance from said second end of said first light guide, and wherein depth component of each of said three-dimensional coordinates is calculable by triangulation based on angle of approach of said stripe of light from said second end of said first light guide onto said object and said signals representative of two-dimensional coordinates of the detected contour line produced by said image-detecting device.

16. A method of measuring 3-dimensional contour of an object using a light-source unit for projecting and rapidly positioning a stripe of light on a plurality of locations on said object and an image detector trained on the object along a line of focus for detecting a series of image frames, each image frame being defined by a left boundary and a right boundary, said method comprising:

(a) projecting a stripe of light onto said object to create a first luminous contour line at an intersection of said stripe of light and said object, the light-source unit being arranged in relation to said image detector at a known distance along a line extending between said light-source unit and said image detector, with the light-source unit protecting the stripe of light in each position following a line that is associated with an angle, the associated angle being determinable from the relationship between the line of focus and the line extending between said light-source unit and said image detector, with the positioning of the said stripe of light at the first location with an associated angle for that s position;

(b) detecting said first contour line by means of said image detector such that said image detector records an image of the beam of light reflected from the said contour line positioned on said object in a zero-th image frame within the sequence of image frames;

(c) positioning said stripe of light at a plurality of additional locations on said object such in the next n−1 frames in a plurality of locations during the time of image capture of each frame following the rule that the light-source unit positions the light in two positions for each positioning of the light beam that occurred in the previous frame and also Positioning the beam in the next frame such that one of the two positions in each positioning combination has an associated angle that is less than the angle position for one of the positions in the previous frame and one of the two positions in the positioning combination has an associated angle that is greater than the angle for the one the positions of the previous frame in question, with said additional plurality of positionings being recorded in image frames that are the next n−1 image frames within the sequence of images;

(d) said image detector further arranged to output an amount of up to 2n−1 contour lines following the rule above for up to n image frames and records in such nth image frame the reflection of the up to 2n−1 contour lines on said object, each of which is positioned on said object between a first contour line recorded in an n−1)th image frame of said first sequence and one of a second contour line recorded in the (n−1)th; and (e) the processor further comprised to calculate a 3D location coordinate for a signal that describes the reflection of a contour line in the nth image frame based on the angle associated with the positioned contour line that created that signal, with the angle associated for that contour line in the nth image frame being confirmed by contour line image position information in the n−1)th image frame.

17. The method according to claim 16, further comprising:

for each detected image frame, generating signals representative of two-dimensional coordinates of the detected contour lines; and calculating by triangulation, for each detected contour line, a plurality of three-dimensional coordinates of said three-dimensional contour of said object based on said signals representative of two-dimensional coordinates of said detected contour lines and angle of approach from said light-source unit onto said object of said stripe of light corresponding to said detected contour line.

18. The method according to claim 16 further comprising, before step (a), the step of:

synchronizing the sequence of projecting said stripe of light onto said object to sequence of time intervals corresponding to respective image frames.

19. The method according to claim 18, wherein said synchronization is based on the time of receipt at the data-processing apparatus of signals representative of a reference image frame.

20. The method according to claim 16, wherein n is an integer, and wherein each image frame in a second sequence of image frames beginning with a predetermined image frame of said first sequence of image frames has uniform number of contour lines.

21. A method for measuring 3-dimensional contour of an object using a light-source unit for projecting and rapidly positioning a stripe of light on a plurality of locations on said object and an image detector trained on the object along a line of focus for detecting a series of image frames, each image frame being defined by a left boundary and a right boundary, said method comprising:

(a) projecting a stripe of light onto said object to create a first luminous contour line at an intersection of said stripe of light and said object the light-source unit being arranged in relation to the image-detecting device at a known distance along a line extending between said light-source unit and said image-detecting device, with the light-source unit protecting the stripe of light in each position following a line that is associated with an angle, the associated angle being determinable from the relationship between the line of focus and the line extending between said light-source unit and said image-detecting device, with the positioning of the said stripe of light at the first location with a first associated angle (X) for that position;

(b) detecting said first contour line by means of said image detector such that said image-detecting device records an image of the beam of light reflected from the said contour line positioned on said object in a zero-th image frame within the sequence of image frames;

(c) positioning said stripe of light at two locations having positions with associated angles that are smaller than and greater than the associated angle for the stripe of light at the first location, with the reflection of the light stripes from those second and third positionings being recorded in an image frame that is a first image frame within the sequence of images, the angle associated with the stripe of light in the second position having R degrees, where R is a number which is D degrees smaller than the angle X associated with first light position such that R=X−D, and the angle associated with the stripe of light in the third position having X+D degrees;

(d) positioning, in the time of capturing images in the second through nth frames the stripe of light in two positions having associated angles with the associated angle for the stripe of light at the different positions in the image frame incremented by the value of D such that in the nth image from the light detection device captures information concerning the light positioning of the stripe of light, wherein the position of the stripe of light at one location in the image has an associated angle having X+(n*D) degrees and the position of the stripe of light at the other location in the image has an associated angle having X−(n*D); and (e) calculating a 3D location coordinate for a signal that describe the reflection of a contour line in the nth image frame based on the angle associated with the positioned contour line that created the signal, with the angle associated for that contour line in the nth image frame being confirmed by the contour line image information in the said (n−1)th image frame.

22. The method according to claim 21, further comprising:

for each detected image frame, generating signals representative of two-dimensional coordinates of the detected contour lines; and calculating by triangulation, for each detected contour line, a plurality of three-dimensional coordinates of said three-dimensional contour of said object based on said signals representative of two-dimensional coordinates of said detected contour lines and angle of approach from said light-source unit onto said object of said stripe of light corresponding to said detected contour line.

23. The method according to claim 21 further comprising, before step (a), the step of:

synchronizing the sequence of projecting said stripe of light onto said object to sequence of time intervals corresponding to respective image frames.

24. The method according to claim 23, wherein said synchronization is based on the time of receipt at the data-processing apparatus of signals representative of a reference image frame.

25. The method according to claim 21, wherein n is an integer, and wherein said light-source unit positions said stripe of light at a plurality of locations on said object such that each image frame in a second sequence of image frames beginning with a predetermined image frame of said first sequence of image frames has uniform number of contour lines.

26. A system for replicating a 3-dimensional profile of a surface comprising:

a light-stripe projection unit for projecting and rapidly positioning a stripe of light at desired locations on said surface to create corresponding reflected stripes of light from said surface depicting contours of the surface;

an image detector trained on the surface along a line of focus for capturing a series of images of the light that reflects from said plurality of reflected stripes for detecting said reflected stripes in image frames, with each image frame comprising a two-dimensional array of light intensity information and with each image frame having a left and right boundary, said image detector detecting a sequence of image frames over time with each image being captured within a known time period, said image detector being located at a position relative to said light-stripe projection unit where a three-dimensional coordinate location profile of said surface is calculable by triangulation;

the light-stripe projection unit further arranged to project said stripe of light with the stripe of light in each position following a line associated with an angle determinable from the relationship between the line of focus and the relative positions of said light-source unit and said image-detecting device;

a processor arranged to output signals to the liqht-stripe projection unit to control the positioning of the stripe of light about the object and synchronize the movement of the light source unit with the capturing of imaged by the image detector;

the light stripe projection unit further arranged to project a stripe of light onto said object to create a first luminous contour line at an intersection of said stripe of light, with the positioning of said stripe of light at the first location having an associated angle for that position;

the image detector arranged to detect said first contour line capturing an image of the beam of light reflected from said first contour line positioned on said object in a zero-th image frame within the sequence of image frames;

the light stripe projection unit further arranged to position said stripe of light at a plurality of additional locations on said object such in the next n–1 frames in a plurality of locations during the time of image capture of each frame following the rule that the light-source unit positions the light in two positions for each positioning of the light beam that occurred in the previous frame and also positioning the beam in the next frame such that one of the two positions in each positioning combination has an associated angle that is less than the angle position for one of the positions in the previous frame and one of the two positions in the positioning combination has an associated angle that is greater than the angle for the one the positions of the previous frame in question, with said additional plurality of positionings being recorded in image frames that are the next n–1 image frames within the sequence of images; and the processor further comprised to calculate a 3D location coordinate for a signal that describes the reflection of a contour line in the nth image frame based on the angle associated with the positioned contour line that created that signal, with the angle associated for that contour line in the nth image frame being confirmed by contour line image position information in the n–1)th image frame.

27. The system according to claim 26, wherein said light-stripe projection unit comprises a laser source for projecting a laser stripe and a light-directing apparatus for rapidly positioning said laser stripe at desired locations.

28. The system according to claim 27, wherein said light-directing apparatus comprises one of a galvanometric scanner and an acousto-optical scanner.

29. The system according to claim 26, wherein n is an integer, and wherein said processor controls said light-directing apparatus to position said laser stripe such that each image frame in a second sequence of image frames beginning with a predetermined image frame of said first sequence of image frames has uniform number of images of reflected stripes.

30. A system for replicating a 3-dimensional profile of a surface comprising:

(a) a light-stripe projection unit for projecting and rapidly positioning a stripe of light at desired locations on said surface to create corresponding reflected stripes of light from said surface depicting contours of the surface;

(b) an image detector trained on the surface along a line of focus for capturing a series of images of the light that reflects from the said plurality of reflected stripes for detecting said reflected stripes in image frames with each frame comprising a two-dimensional array of light intensity information and with each frame having a left and right boundary, said image detector detecting a sequence of image frames over time with each image being captured within a known time period, said image detector being located at a position relative to said light-stripe projection unit where a 3D coordinate location profile of said surface is calculable by triangulation;

(c) the light-stripe projection unit further arranged to project said stripe of light with the stripe of light in each position following a line that is associated with an angle equivalent to the angle formed by the intersection of the stripe of light and the line of focus;

(d) a processor arranged to output signals to the liqht-stripe projection unit to control the positioning of the stripe of light about the object and synchronize the movement of the light-source unit with the capturing of images by the image-detecting device; and (e) the light-source unit further arranged to position said stripe of light at a location on said object at a position having an associated angle of X degrees, where X is a number between 0 and 180 degrees, for the position such that said image-detecting device records an image of the beam of light reflected from the said contour line positioned on said object in a zero-th image frame within the sequence of image frames; and (f) the light-source unit arranged to position said stripe of light at two locations having positions with associated angles that are smaller than and greater than the associated angle for the stripe of light at the first location, with the reflection of the light stripes from those second and third positionings being recorded in an image frame that is a first image frame within the sequence of images, with the processor further comprised to calculate a 3D location coordinate for each signal in the said first image array that describes the reflection of a contour line based on the angle associated with that positioned contour line, with the angle associated for that contour line in the first image frame being confirmed by the contour line image information in the said zero-th image frame.

31. The system according to claim 30, wherein said light-stripe projection unit comprises a laser source for projecting a laser stripe and a light-directing apparatus for rapidly positioning said laser stripe at desired locations.

32. The system according to claim 31, wherein said light-directing apparatus comprises one of a galvanometric scanner and an acousto-optical scanner.

33. The system according to claim 30, wherein n is an integer, and wherein said processor controls said light-directing apparatus to position said laser stripe such that each image frame in a second sequence of image frames beginning with a predetermined image frame of said first sequence of image frames has uniform number of contour lines, wherein in (f) above the angle associated with the stripe of light in the second position having R degrees, where R is n a number which is D degrees smaller than the angle X associated with first light position such that R=X−D, and the angle associated with the stripe of light in the third position having X+D degrees;

(1) the light-stripe projection unit is further arranged to position in the time of capturing a second image frame the stripe of light in fourth and fifth locations about the object with the image detector collecting the second image frame of the stripe of light as reflected from the object in both the fourth and fifth locations, with the angle associated with the stripe of light in the fourth position having X−2D degrees and the angle associated with the stripe of light in the fifth position having X+2D degrees;

(2) the light stripe projection unit is further arranged to position, in the time of the capturing images in the third through nth frames in the sequence the stripe of light in two positions following the procedure the paragraph (1), with the angle associated with the stripe of light at the different positions in the image frame incremented by the value of D such that in the nth image from the light detection device captures information concerning the light positioning of the stripe of light, wherein the position of the stripe of light at one location in the image has an associated angle having X+(n*D) degrees and the position of the stripe of light at one location in the image has an associated angle having X−(n*D); and (3) the processor further comprised to calculate a 3D location coordinate for a signal that describe the reflection of a contour line in the nth image frame based on the angle associated with the positioned contour line that created the signal, with the angle associated for that contour line in the nth image frame being confirmed by the contour line image information in the said n−1)th image frame.

34. An apparatus for measuring a 3-dimensional profile of an object, said apparatus comprising:

an image-detecting device trained on the object along a line of focus capturing a sequence of images from 0 to n, each image being captured during a time interval, each of said captured images being contained in an image frame comprising a two-dimensional array of light intensity information and having a left boundary and a right boundary;

a light-source unit for projecting a stripe of light onto one of a plurality of locations on said object and creating a luminous contour line at an intersection of said stripe of light and said object, said light-source unit positioning said stripe of light relative to said object to create at least one luminous contour line during said time interval the light-source unit further arranged to protect said stripe of light with the stripe of light in each position following a line that is associated with an angle equivalent to the angle formed by the intersection of the stripe of light and the line of focus;

wherein said light-source unit arranged to position said stripe of light at a plurality of locations on said object such that said image-detecting device detects a sequence of image frames in which an n−1)th image frame of said sequence contains an image of a luminous contour line which is positioned on said object and an nth image frame of said sequence contains an image of a luminous contour line which is positioned on said object solely between a position of a contour line recorded in an n−1)th image frame of said sequence and one of said left boundary and said right boundary;

wherein said image-detecting device is positioned at a location relative to said light-source unit where depth profile of said object is calculable by triangulation based on the position of the light-source unit, the image-detection device and the angle that is associated with the stripe of light as positioned in a given location; and a processor further comprised to calculate a 3D location coordinate for a signal that describes the reflection of the contour line in the nth image frame based on the angle associated with that positioned contour line, with the angle associated for that contour line in the nth image frame being confirmed by the contour line image information in the said (n−1)th image frame.

35. The apparatus according to claim 34, where in confirming the associated angle for the position of the stripe of light in the nth image frame, said processor generates a continuous line of two-dimensional coordinates representing the positioning of the contour line within said n−1)th image, and, in the nth frame, compares the 2D coordinate location of a signal representing a contour line within that frame to determine whether the x value of that said coordinate is greater than or less than the x value determined for the contour line of the n−1)th image frame having the same Y coordinate and determining an angle associated with said coordinate in the nth frame for the beam of light that generated its reflection.

36. The apparatus according to claim 34 wherein said processor synchronizes said image-detecting device with said light-source unit.

37. The apparatus according to claim 34 wherein said data processing apparatus synchronizes said image-detecting device with said light-source unit based on time of receipt at said data-processing apparatus of signals representative of a reference image frame.

38. The apparatus according to claim 34, wherein said light-source unit comprises a laser-stripe generator and a light-directing apparatus for positioning said stripe of light at desired locations.

39. The system according to claim 34, wherein said light-directing apparatus comprises one of a galvanometric scanner and an acousto-optical scanner.

40. A method of measuring a 3-dimensional profile of an object using an image-detecting device trained on the object along a line of focus for capturing an image during a time interval, a light-source unit for projecting a stripe of light onto said object at variable locations by moving the stripe of light with the stripe of light stripe of light in each position following a line that is associated with an angle equivalent to the angle formed by the intersection of the stripe of light and the line of focus, and a data processing apparatus, said method comprising:

synchronizing the beginning of the movement of the light-source unit with the capturing of images by the image-detecting device;

projecting said stripe of light onto a plurality of locations on said object to create a corresponding plurality of luminous contour lines at intersections of said stripe of light and said object, said light stripe being positioned relative to said object to create at least one luminous contour line during said time interval;

projecting, during the above step of sequentially projecting the stripe of light, the stripe of light during the capturing of a first frame so that it is positioned at a location having an associated angle of X degrees, where X is a number between 0 and 180 degrees, for the position;

projecting, during the above step of sequentially protecting the stripe of light, the stripe of light during the capturing of a second frame in at least two positions, the at least two positions having locations with associated angles that are smaller than and greater than the associated angle for the stripe of light at the first location captured in said first image frame;

capturing said sequence of images by means of said image-detecting device, including said first and second image frames each image being captured during a corresponding time interval, each of said captured images being contained in an image frame comprising a two-dimensional array of light intensity information and having a left boundary and a right boundary; and calculating, using said data processing apparatus, a plurality of three-dimensional coordinates representative of said three-dimensional profile of said object based on said signals representative of said detected contour line for each image frame by triangulation, by:

(i) identifying the 2D location coordinate for each signal that describes the reflection of the contour line in said first image frame;

(ii) using those identified coordinates to create a continuous line of 2D coordinates that describes a continuous contour of the object;

(iii) identifying a 2D location coordinate for a signal that describes one of the reflections of the contour lines in said second image frame; and (iv) confirming the associated angle for the said 2D location coordinate in the second frame by comparing the position of said second frame 2D coordinate to the position of a coordinate in the continuous line of 2D coordinates determined for the first frame.

41. The method according to claim 40, comprising the additional step:

calculating said a three-dimensional coordinate for the second frame coordinate location by triangulation based on said of approach on said object of said stripe of light corresponding to said detected contour line for said nth image frame.

42. The method according to claim 41, wherein said step of calculating processed two-dimensional coordinates representing said detected contour line for said $n^{th}$ image frame comprises:

comparing two-dimensional coordinates corresponding to said signals representative of said detected contour line for said $n^{th}$ image frame with a range of two-dimensional coordinates lying between processed two-dimensional coordinates representing the detected contour line for said $(n-1)^{th}$ image frame and one of said left boundary and said right boundary; and excluding extraneous coordinates of said two-dimensional coordinates corresponding to said signals representative of the detected contour line for said $n^{th}$ image frame when said extraneous coordinates lie outside said range of two-dimensional coordinates lying between processed two-dimensional coordinates representing the detected contour line for said $(n-1)^{th}$ image frame and one of said left boundary and said right boundary.

43. The method according to claim 40 further comprising the step of:

synchronizing the sequence of projecting said stripe of light onto said object to the sequence of time intervals corresponding to respective image frames.

44. The method according to claim 43, wherein said synchronization is based on the time of receipt at the data-processing apparatus of signals representative of a reference image frame.

45. A system for measuring 3-D shape of an object, which comprises:

an illumination source for projecting a beam of light onto the object at a plurality of angles of approach relative to said object;

a photographic device for detecting an image of the object including a reflection of the light beam from the object at one location about the object and along one angle of approach and generating a two-dimensional x,y coordinate array of electrical signals comprising pixel information representative of the image of the object and the reflected light beam;

a processor coupled to the photographic detecting device to receive the two-dimensional x,y coordinate array of electrical signals and identify in real time a group of those pixels within each x row of the array that contain information representative of the reflected light beam only; and a storage device coupled to the processor to receive and store pixel information representative of the reflective light beam;

the processor further arranged to, at a desired time, further process the information to locate with in each x row of said group of pixels the one pixel which represents the location where the light beam touched the object; and the processor further arranged to construct a continuous set of pixel assignments to describe a continuous contour line based on the x,y locations of each said one pixel which represents the location where the light beam touched the object and using the coordinates of said continuous contour line to associate information related to the assigned angle of approach for the pixel information the light positioned in a subsequent image.

46. A system for measuring 3-D shape of an object, which comprises:

an illumination source for projecting a beam of light onto the object at a plurality of angles of approach relative to said object;

a photographic device for detecting an image of the object including a reflection of the light beam from the object at one location about the object along one angle of approach and generating a two-dimensional x,y coordinate array electrical signals comprising pixel information representative of the image of the object and the reflected light beam, the pixel information comprising information for each of a plurality of individual pixels;

a processor coupled to the photographic detecting device to receive the electrical signals, identify in real time groups of pixels representative of the reflected light beam depicted in the one image, each group corresponding to a predetermined portion of the reflected light beam depicted in the one image and select a subgroup from each group to represent a corresponding predetermined portion of the reflected light beam that represents the location where the light beam touched the object;

a storage device coupled to the processor to receive and store the subgroups to represent the corresponding predetermined portions of the reflected light beam; and the processor further arranged to construct a continuous set of pixel assignments to describe a continuous contour line based on the coordinates the subgroup from each group of identified pixels and utilizing the coordinates of that continuous contour line to associate information related to the assigned angle of approach for groups of pixel information concerning positioned light in a subsequent image.

47. A method for storing information for a 3-D shape of an object comprising the steps of:

projecting a light beam against the object at a plurality of angles of approach relative to said object;

detecting an image of the object including a reflection of the light beam from the object at one location about the object and along one angle of approach and generating a two-dimensional x,y coordinate array of electrical signals comprising pixel information representative of the image of the object and the reflected light beam;

identifying pixel information representative of the reflected light beam within each x row of said array that contains information representative of the image of the object and the reflected light beam;

storing the pixel information representative of the reflected light beam;

at a desired time, locating within each x row of said array one pixel which represents the location where the light beam touched the object; and constructing a continuous set of pixel assignments to describe a continuous contour line based on the x, y locations of each said one pixel which represents the location where the light beam touched the object and using the coordinates of said continuous contour line to associate information related to the assigned angle of approach for the pixel information of the light positioned in a subsequent image.

48. A method for storing information for a 3-D shape of an object comprising the steps of:

projecting a light beam against the object at a plurality of angles of approach relative to said object;

detecting an image of the object including a reflection of the light beam from the object at one location about the object along one angle of approach;

using the image to generate electrical signals comprising an x,y coordinate array of pixel information representative of the image of the object and the reflected light beam, the pixel information comprising information for each of a plurality of individual pixels;

identifying groups of pixels, each group corresponding to a predetermined portion of the reflected light beam;

selecting a subgroup from each group to represent the corresponding predetermined portion of the reflected light beam that represents the location where the light beam touched the object;

storing the subgroups to represent the corresponding predetermined portions of the reflected light beam; and constructing a continuous set of pixel assignments to describe a continuous contour line based on the coordinates of the subgroup from each group of identified pixels and utilizing the coordinates of that continuous contour line to associate information related to the assigned angle of approach for groups of pixel information concerning positioned light in a subsequent image.

49. A system for measuring 3-D shape of an object, which comprises:

an illumination source for projecting a beam of light onto a plurality of locations on the object;

a photographic detecting device for detecting an image of the object including reflections of the light beam from said plurality of locations on the object during an image-capturing time period and generating electrical signals comprising pixel information representative of the image of the object and the reflected light beam;

a processor coupled to the illumination source to receive information in respect of angles between the illumination source and the object, and further coupled to the photographic detecting device to receive the electrical signals;

the processor associating the angle information to the pixel information;

the processor using the associated angle information and pixel information to determine three dimensional X, Y, Z coordinates for the object and eliminating certain X, Y, Z coordinates according to preselected redundancy criteria.

50. A method for measuring 3-D shape of an object, comprising the steps of:

projecting a beam of light onto a plurality of locations on the object;

detecting an image of the object including reflections of the light beam from said plurality of locations on the object during an image-capturing time period;

generating electrical signals comprising pixel information representative of the image of the object and the reflected light beam;

determining angles between the illumination source and the object;

associating the angle information to the pixel information;

using the associated angle information and pixel information to determine three dimensional X, Y, Z coordinates for the object; and eliminating certain X, Y, Z coordinates according to preselected redundancy criteria.

51. A system for obtaining data representative of 3-D shape of an object, which comprises:

an illumination source for projecting a light beam onto the object at a plurality of angles of approach relative to said object;

a controller for assigning each of said plurality of angles of approach relative to said object for said light beam, said controller generating information related to each of said plurality of angles of approach;

a photographic device for detecting a first image of the object including a first luminous contour line of the object generated by reflection of said light beam from the object and generating electrical signals comprising pixel information representative of the image of the object and the luminous contour line and a second image of the object including second and third luminous contour lines of the object generated by reflection of said light beam from the object and generating electrical signals comprising pixel information representative of the image of the object and the luminous contour lines;

a storage device coupled to the photographic detecting device and the controller to receive and store the pixel information representative of the first luminous contour line and the information related to the assigned angle of approach of said light beam associated with the luminous contour line; and a processor for constructing a continuous set of pixel assignments to describe a continuous contour line based on the stored pixel information representative of the luminous contour line and using the coordinates of said continuous contour line to associate information related to the assigned angle of approach for the pixel information representative of one of the second or third luminous contour lines.

52. The system according to claim 51, wherein said photographic detecting device detects a sequence of images of said object, each image including a luminous contour line, and wherein said storage device receives and stores, for each detected image, the pixel information representative of the luminous contour line and the information related to the angle of approach of the beam of light associated with the luminous contour line, said the processor for accessing and processing the stored pixel information representative of the luminous contour lines and the stored information related to the corresponding angles of approach of the beam of light associated with the luminous contour lines, said processor using the associated angle information and the pixel information to determine three dimensional X, Y, Z coordinates for the object.

53. A method for measuring 3-D shape of an object, comprising the steps of:

projecting a light beam onto the object at a plurality of angles of approach relative to said object;

detecting a sequence of images of the object, with a first image containing a luminous contour line of the object generated by a reflection of the light beam from the object, with the first luminous contour line having associated therewith an angle of approach of the light beam relative to the object and with subsequent images containing a plurality of luminous contour lines of the object generated by reflections of the light beam from the object, each subsequent luminous contour line having associated therewith an angle of approach of the light beam relative to the object;

for each image, generating electrical signals comprising pixel information representative of the image of the object and the luminous contour line;

for each luminous contour line, determining the angle of approach of the light beam relative to the object such that the angles of approach for the luminous contour lines contained within can be associated with particular image frames;

storing said pixel information representative of the luminous contour line and angle information representative of the angle of approach of the light beam associated with the luminous contour line;

at a desired time, accessing the stored pixel information and the angle information;

associating the angle information to the corresponding pixel information by constructing a continuous set of pixel assignments to describe a continuous contour line based on the stored pixel information representative of the luminous contour line in the first frame and using the coordinates of said continuous contour line to associate information related to the assigned angle of approach for the pixel information representative of one of the contour lines in the second frame; and using the associated angle information and pixel information to determine three dimensional X, Y, Z coordinates for the object.

* * * * *